Figure 1:
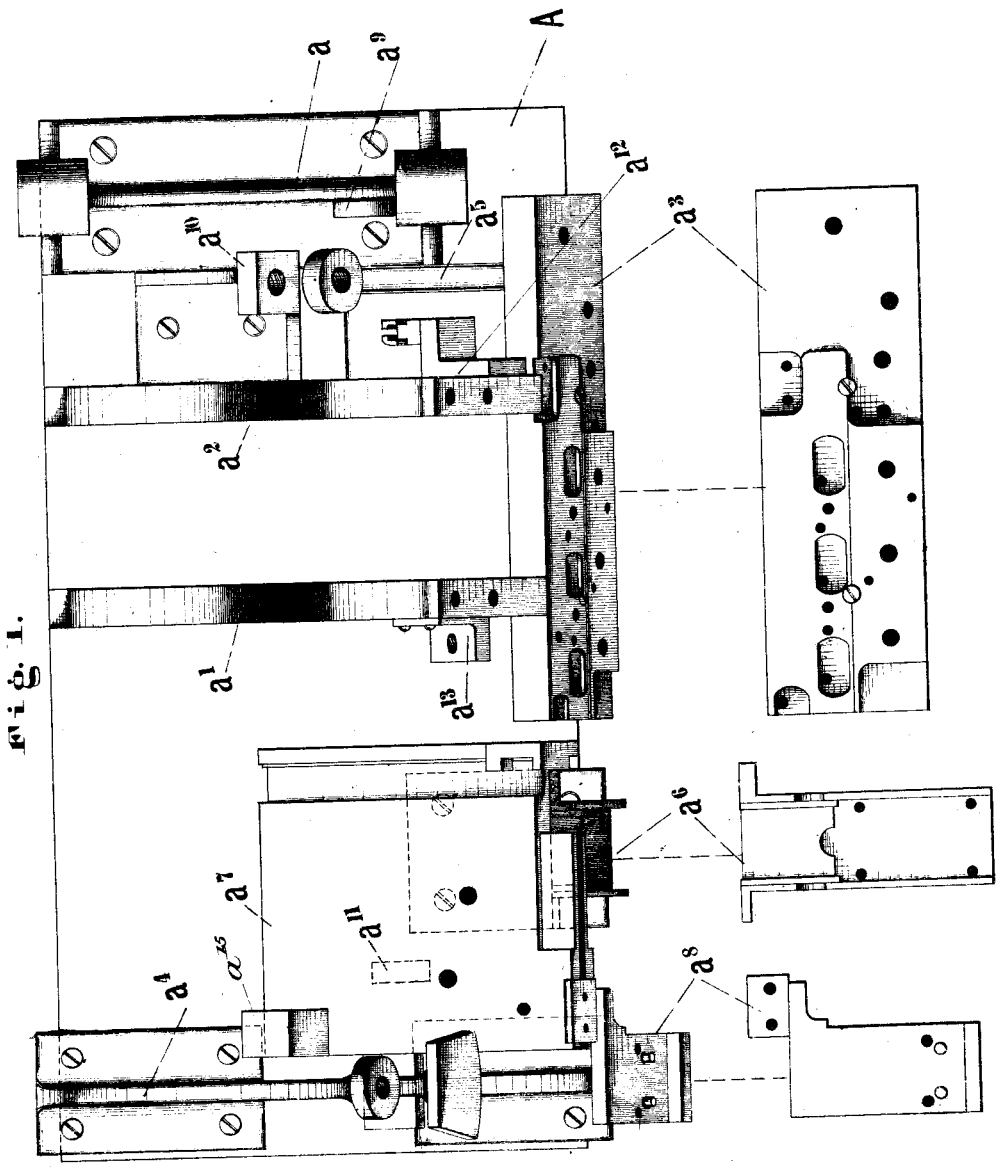

(No Model.) 31 Sheets—Sheet 1.

J. W. PAIGE.
MACHINE FOR SETTING, DISTRIBUTING, AND JUSTIFYING TYPE.

No. 547,859. Patented Oct. 15, 1895.

WITNESSES:
Fred G. Dieterich
J. G. Hinkel

INVENTOR:
JAMES W. PAIGE.
BY H. W. Beadle + Co.
ATTYS.

(No Model.)
31 Sheets—Sheet 2.

J. W. PAIGE.
MACHINE FOR SETTING, DISTRIBUTING, AND JUSTIFYING TYPE.

No. 547,859.
Patented Oct. 15, 1895.

WITNESSES:
Prul. G. Dieterich
J. G. Hinkel

INVENTOR:
JAMES W. PAIGE,
BY H. W. Beadle + Co.
ATTYS (No Model.)  
31 Sheets—Sheet 3.

J. W. PAIGE.
MACHINE FOR SETTING, DISTRIBUTING, AND JUSTIFYING TYPE.

No. 547,859. Patented Oct. 15, 1895.

WITNESSES:  
Fred G. Dieterich  
J. G. Hinkel

INVENTOR:  
JAMES W. PAIGE,  
BY H. W. Beadle & Co.  
ATTYS.

(No Model.) 31 Sheets—Sheet 4.
J. W. PAIGE.
MACHINE FOR SETTING, DISTRIBUTING, AND JUSTIFYING TYPE.
No. 547,859. Patented Oct. 15, 1895.
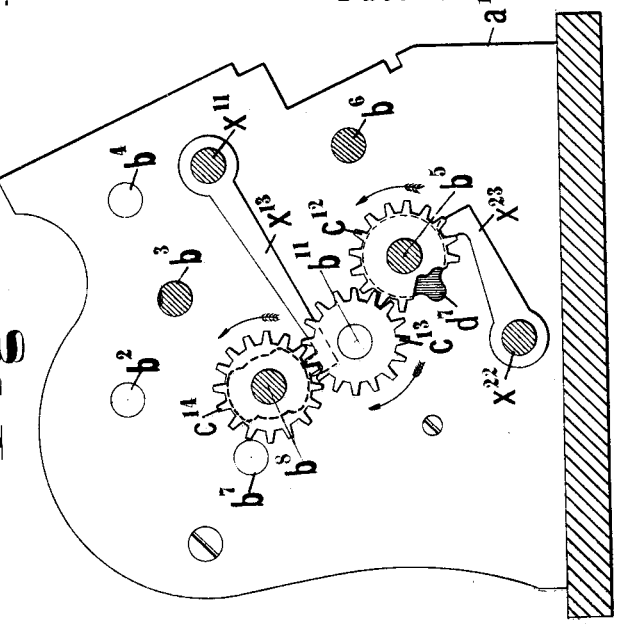
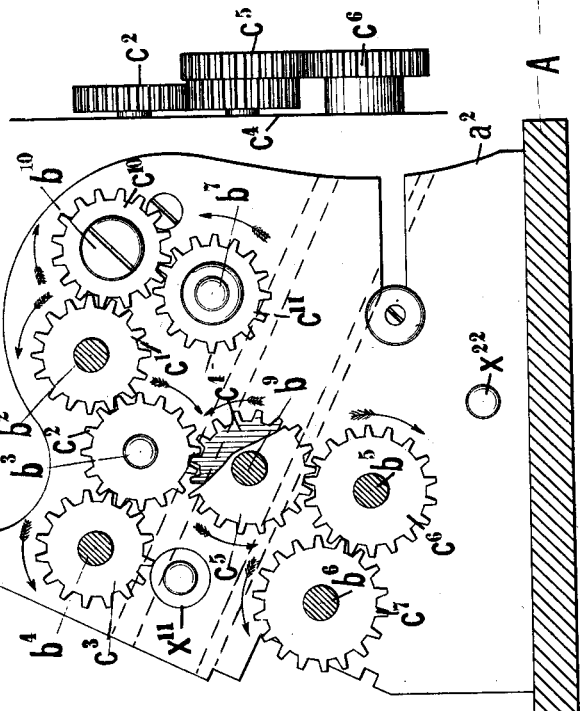
WITNESSES:
T. S. West
Wm. T. Emerson
INVENTOR:
JAMES W. PAIGE,
BY H. W. Beadle & Co.
ATTYS.

(No Model.)
31 Sheets—Sheet 5.
J. W. PAIGE.
MACHINE FOR SETTING, DISTRIBUTING, AND JUSTIFYING TYPE.
No. 547,859. Patented Oct. 15, 1895.
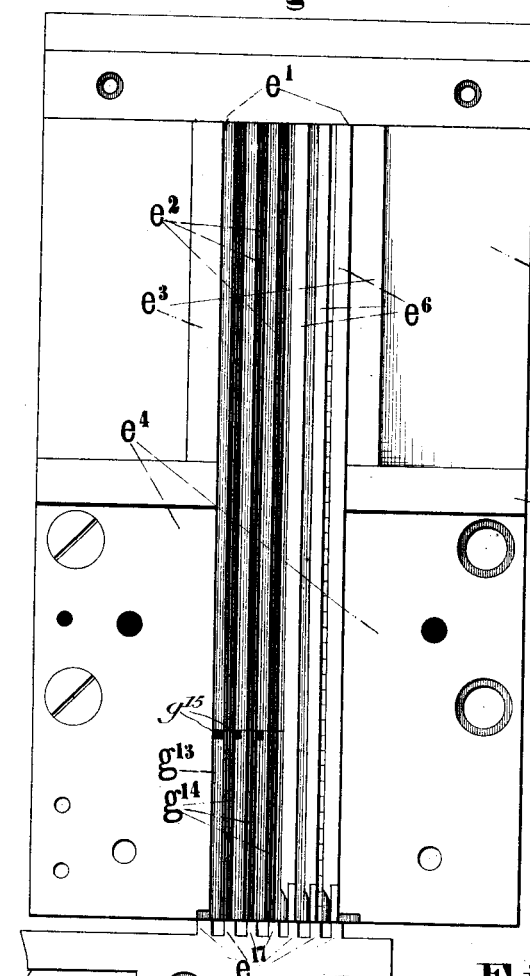
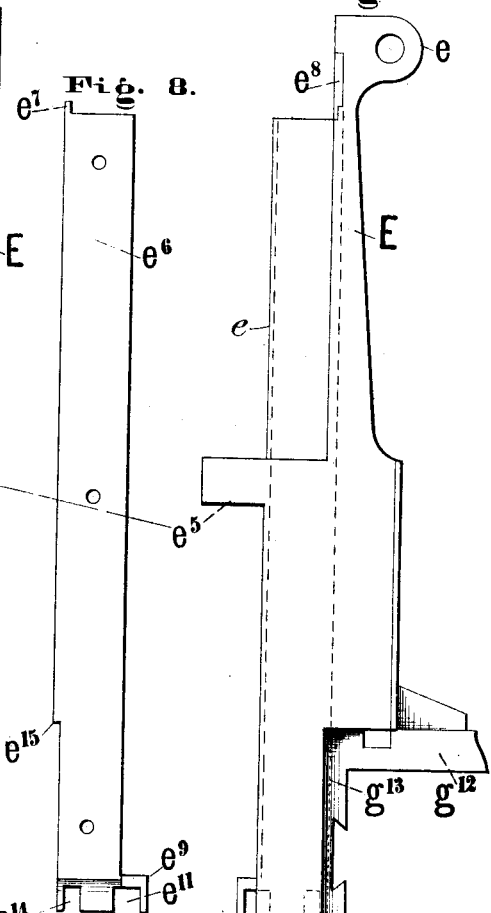
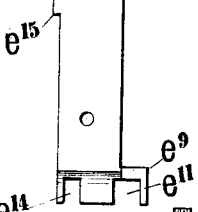
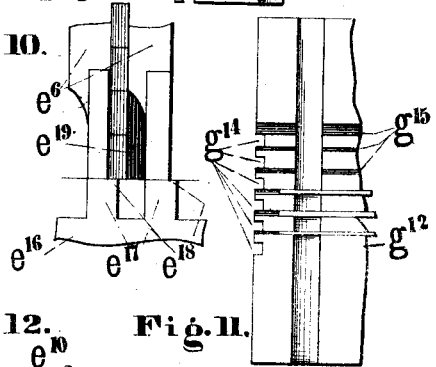
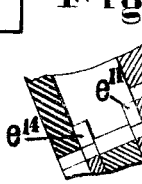
WITNESSES:
Fred G. Dieterich
J. G. Hinkel
INVENTOR:
JAMES W. PAIGE
BY H. W. Beadle & Co.
ATTYS.

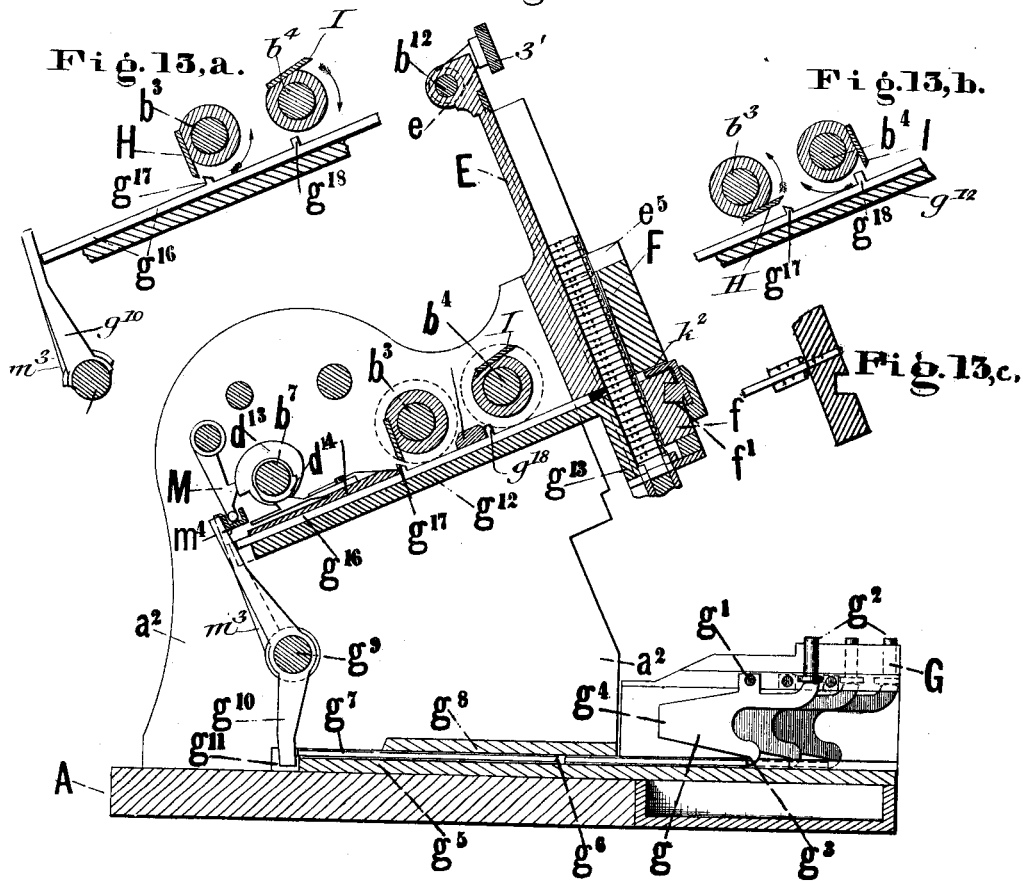

(No Model.)

J. W. PAIGE.
MACHINE FOR SETTING, DISTRIBUTING, AND JUSTIFYING TYPE.

No. 547,859.

31 Sheets—Sheet 7.

Patented Oct. 15, 1895.

WITNESSES:
Fred. G. Dieterich
J. G. Hinkel

INVENTOR:
JAMES W. PAIGE,
BY H. W. Beadle & Co.
ATTYS (No Model.) 31 Sheets—Sheet 8.

J. W. PAIGE.

MACHINE FOR SETTING, DISTRIBUTING, AND JUSTIFYING TYPE.

No. 547,859. Patented Oct. 15, 1895.

WITNESSES:
Fred. G. Dieterich
J. G. Hinkel

INVENTOR:
JAMES W. PAIGE,
BY
H. W. Beadle & Co.
ATTYS (No Model.)
J. W. PAIGE.
MACHINE FOR SETTING, DISTRIBUTING, AND JUSTIFYING TYPE.
No. 547,859.
31 Sheets—Sheet 9.
Patented Oct. 15, 1895.
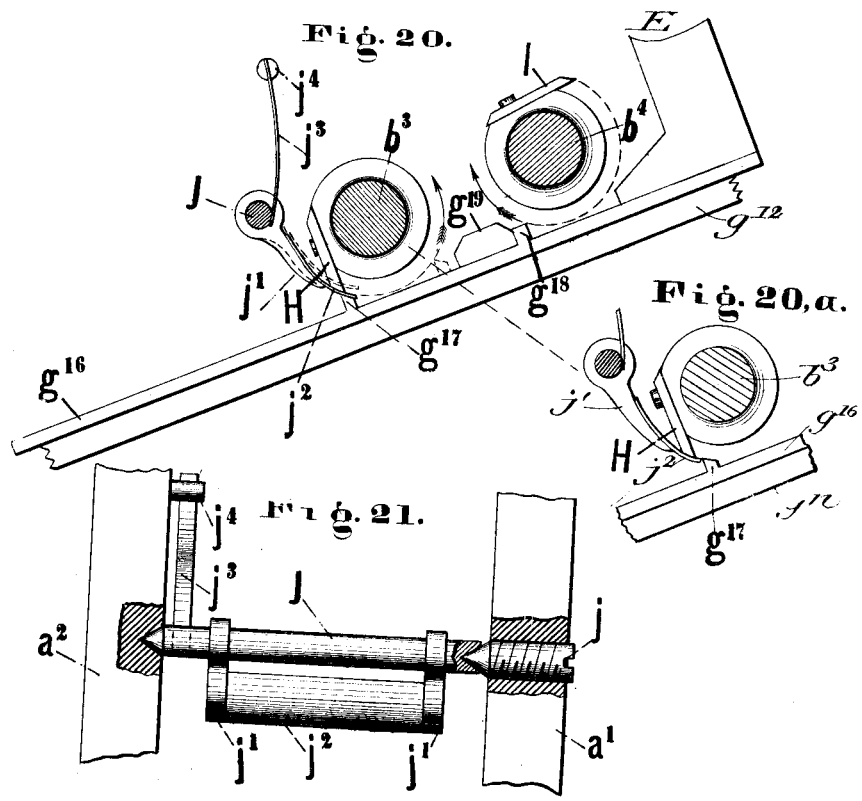
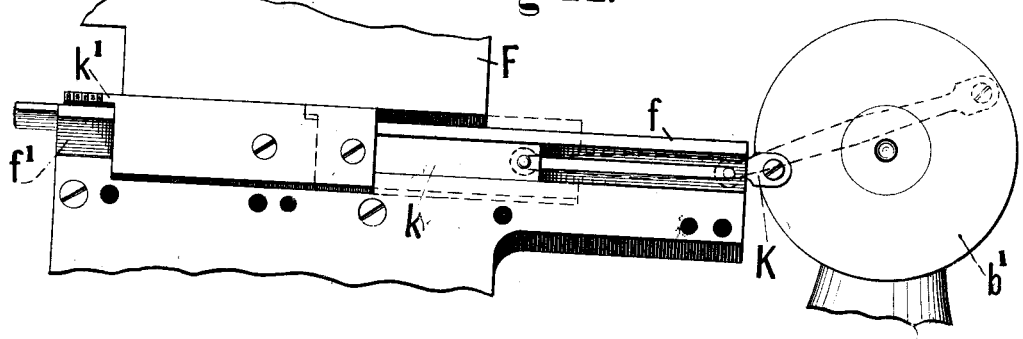
WITNESSES:
Fred G. Dieterich
I. G. Hinkel
INVENTOR:
JAMES W PAIGE,
BY H. W. Beadle + Co.
ATTYS (No Model.)

J. W. PAIGE.
MACHINE FOR SETTING, DISTRIBUTING, AND JUSTIFYING TYPE.

No. 547,859. Patented Oct. 15, 1895.

31 Sheets—Sheet 10.

WITNESSES:
Fred. G. Dieterich
J. G. Hinkel

INVENTOR:
JAMES W. PAIGE,
BY H. W. Beadle +Co.
ATTYS (No Model.)

J. W. PAIGE.

MACHINE FOR SETTING, DISTRIBUTING, AND JUSTIFYING TYPE.

No. 547,859.

Patented Oct. 15, 1895.

WITNESSES:

INVENTOR:
JAMES W. PAIGE,
BY
ATTYS

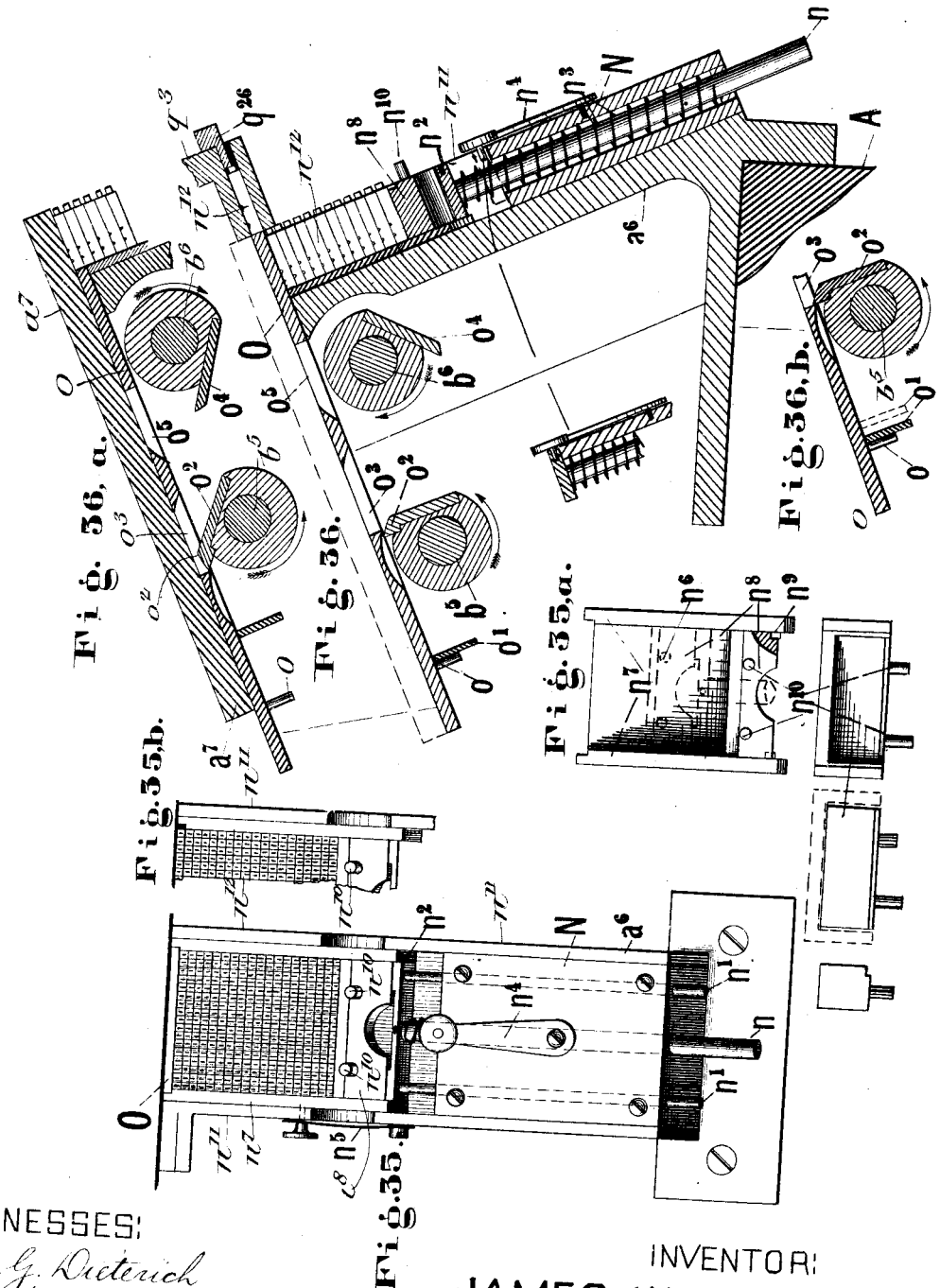

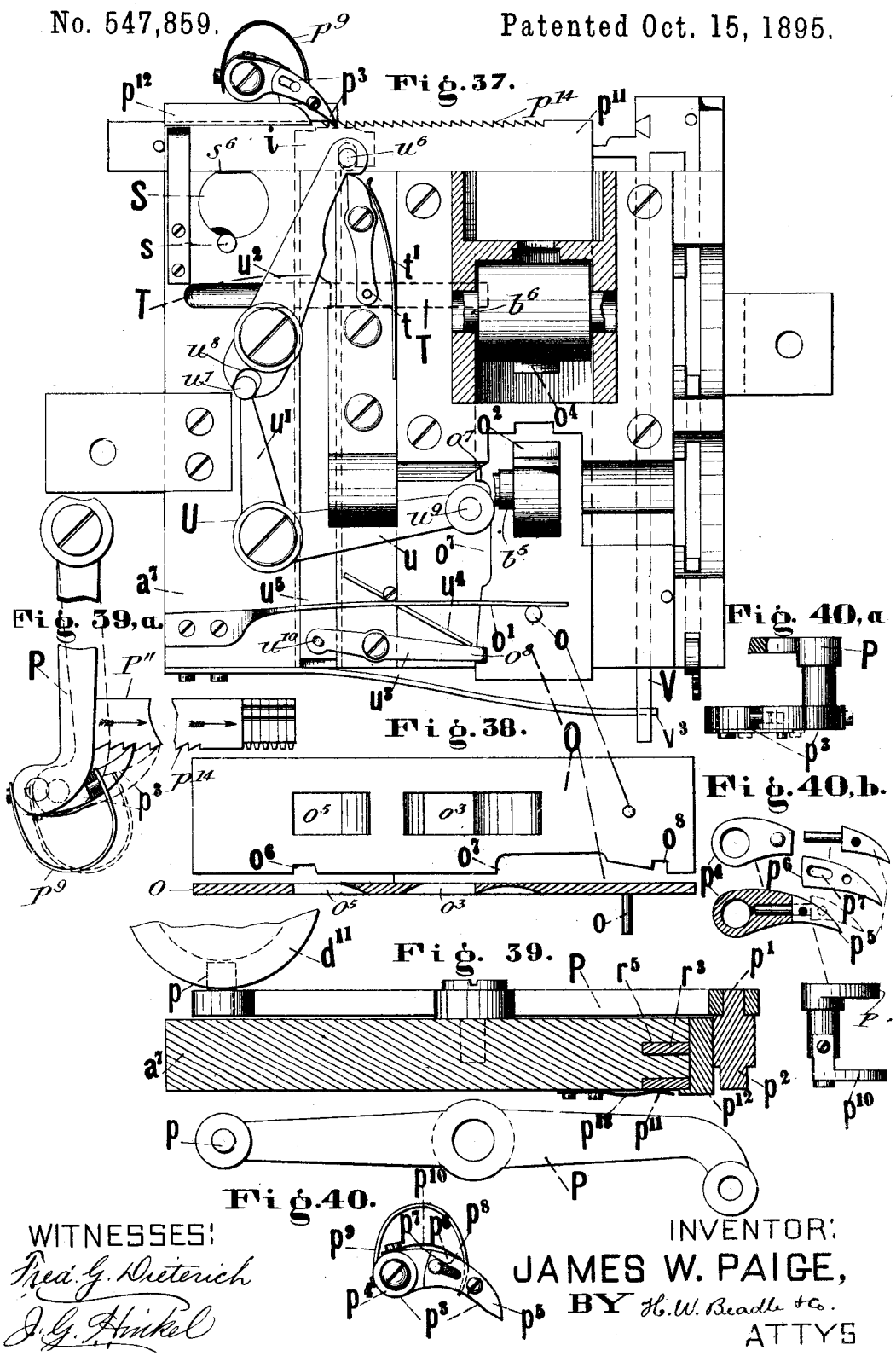

(No Model.)
J. W. PAIGE.
MACHINE FOR SETTING, DISTRIBUTING, AND JUSTIFYING TYPE.
No. 547,859.
31 Sheets—Sheet 14.
Patented Oct. 15, 1895.
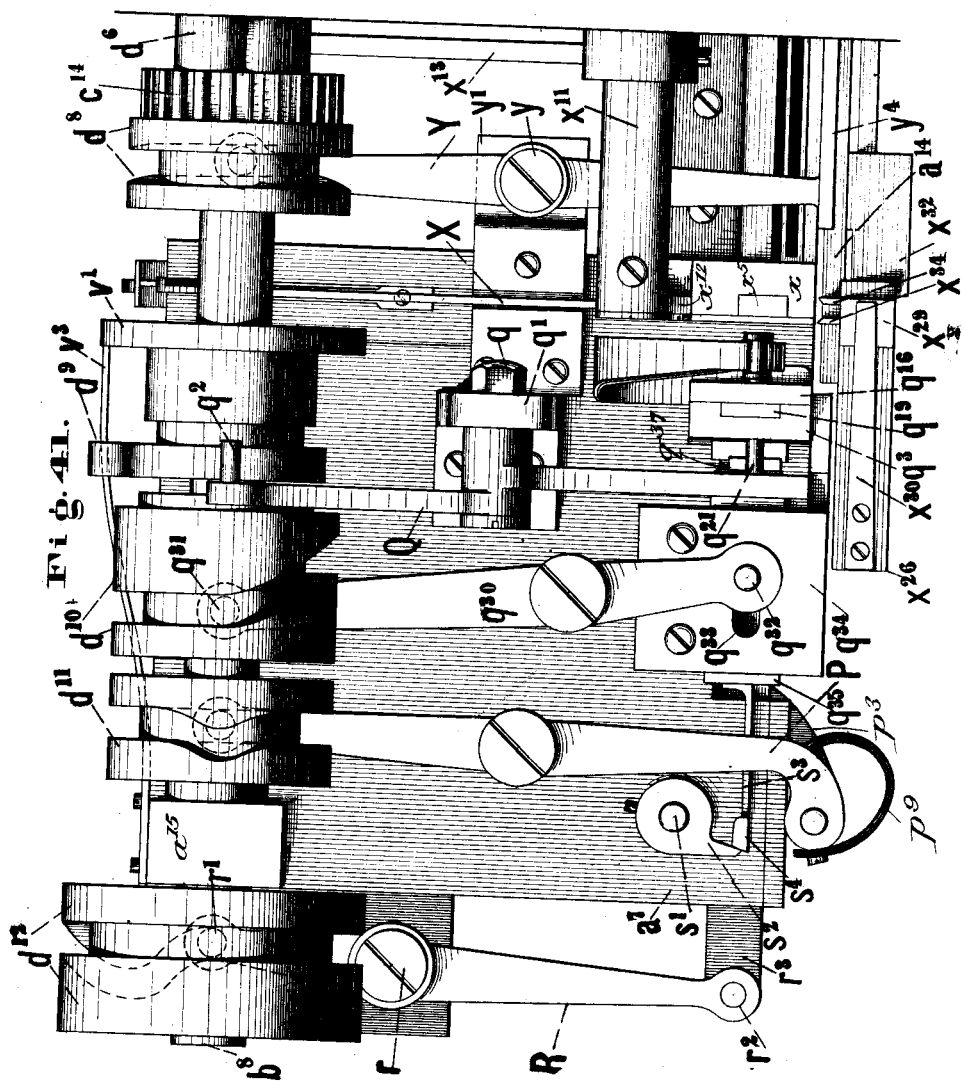
WITNESSES:
Fred. G. Dieterich
J. G. Hinkel
INVENTOR:
JAMES W. PAIGE,
BY H. W. Beadle + Co.
ATTYS.

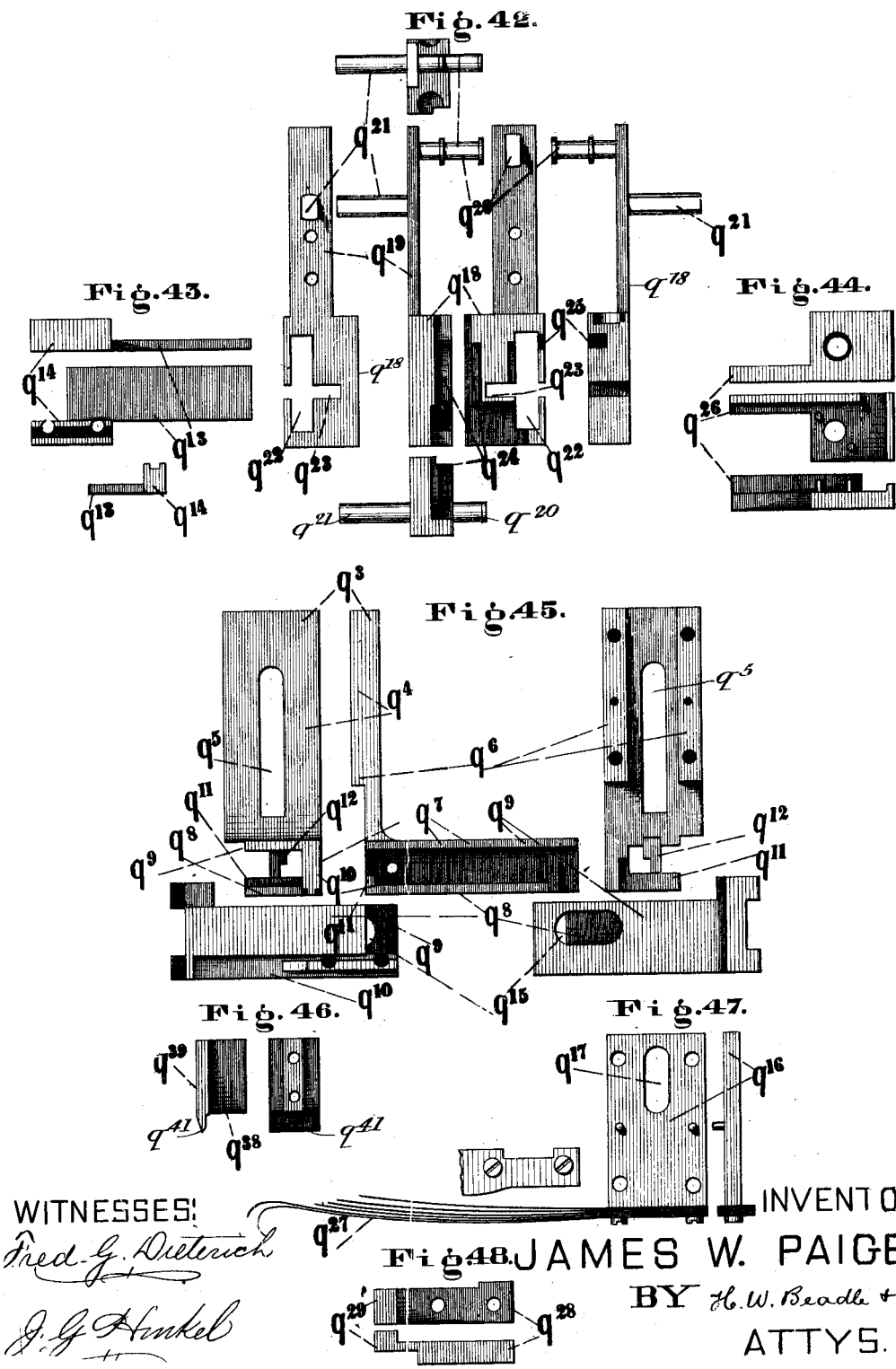

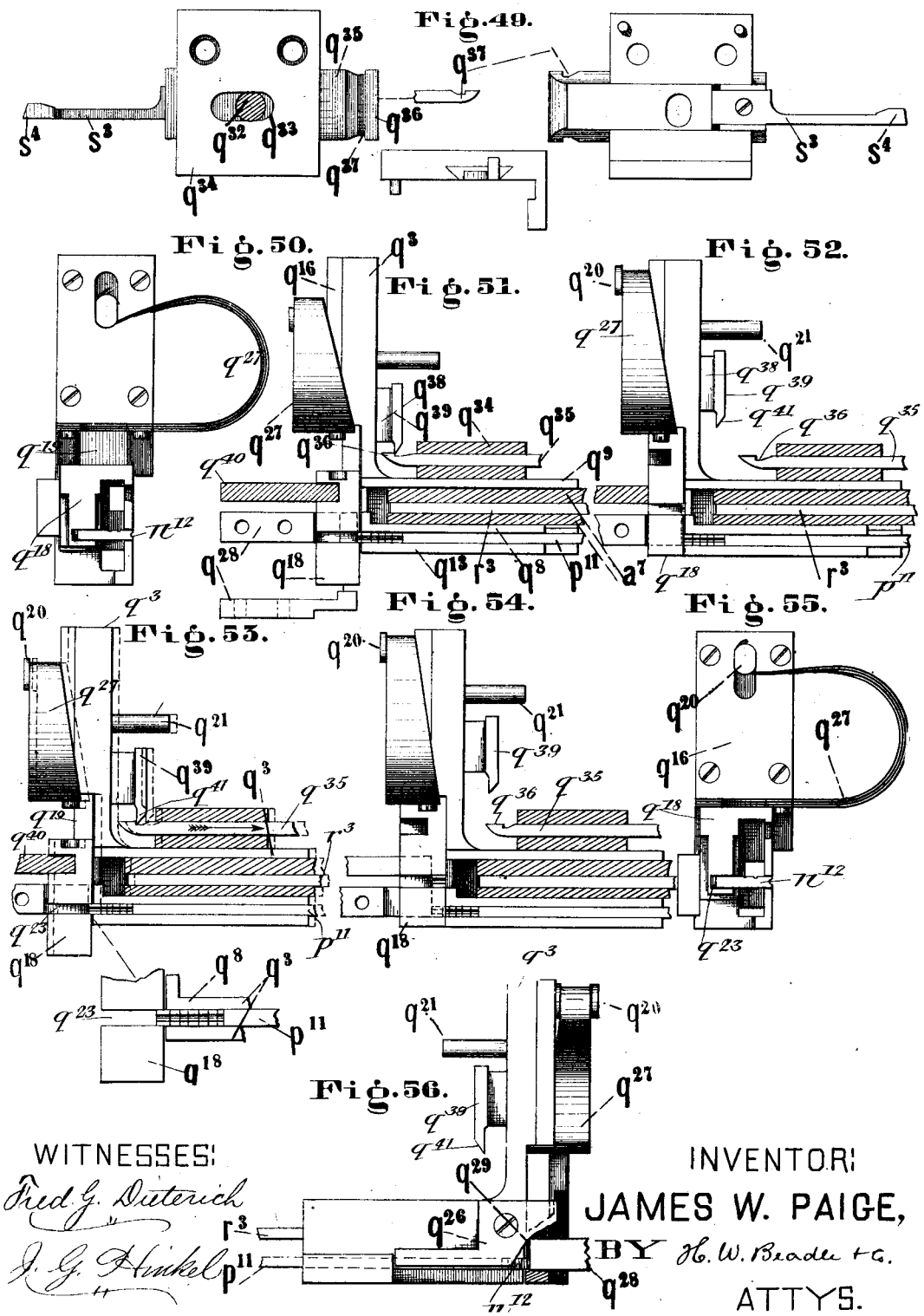

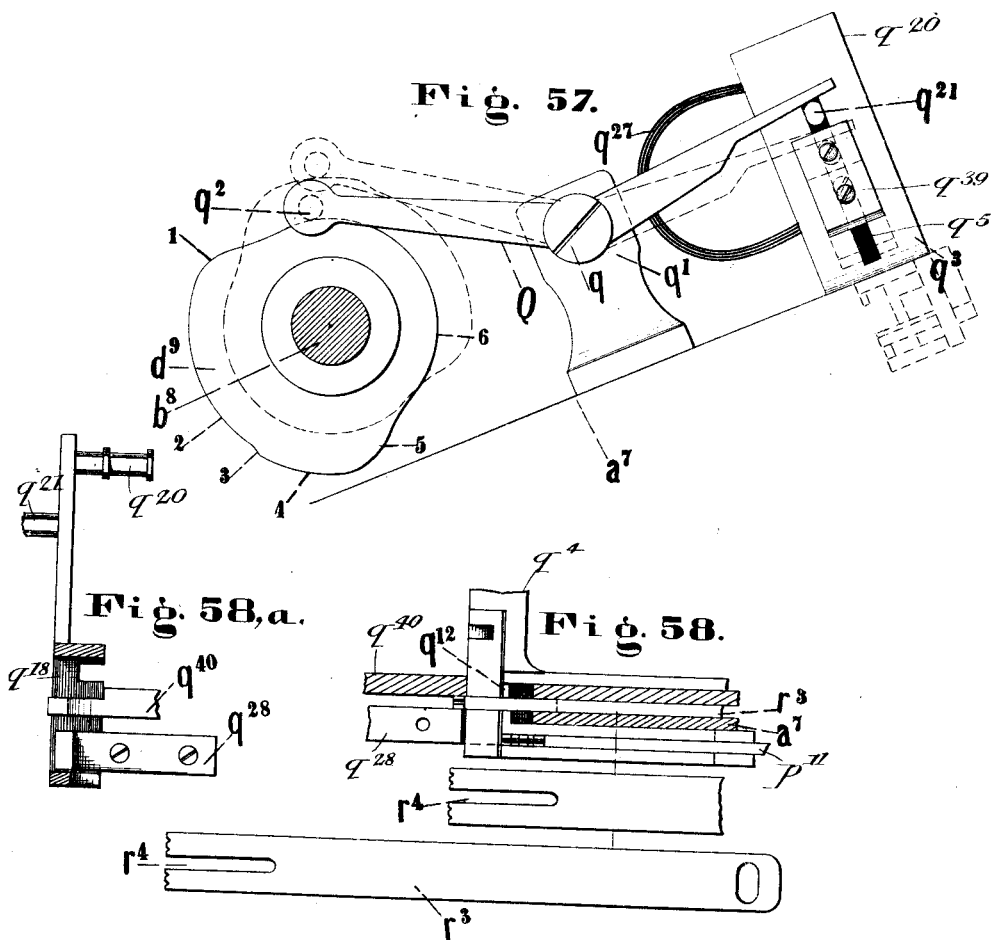

(No Model.)
J. W. PAIGE.
MACHINE FOR SETTING, DISTRIBUTING, AND JUSTIFYING TYPE.
No. 547,859.
Patented Oct. 15, 1895.
31 Sheets—Sheet 18.
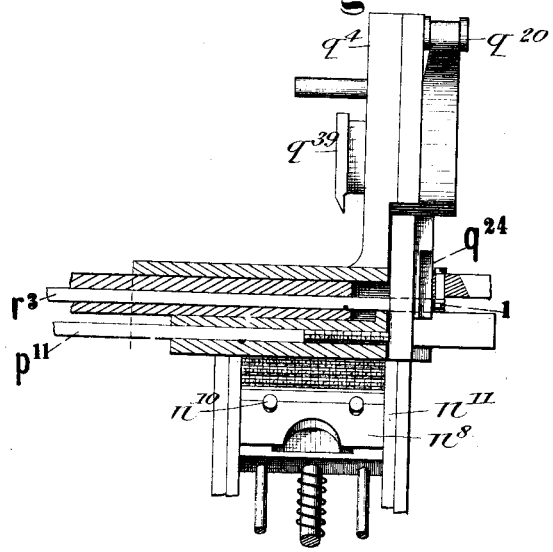
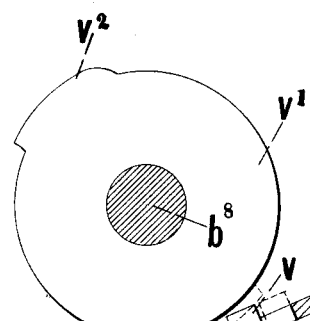
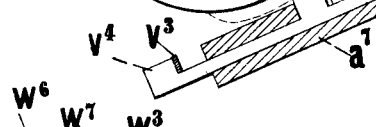
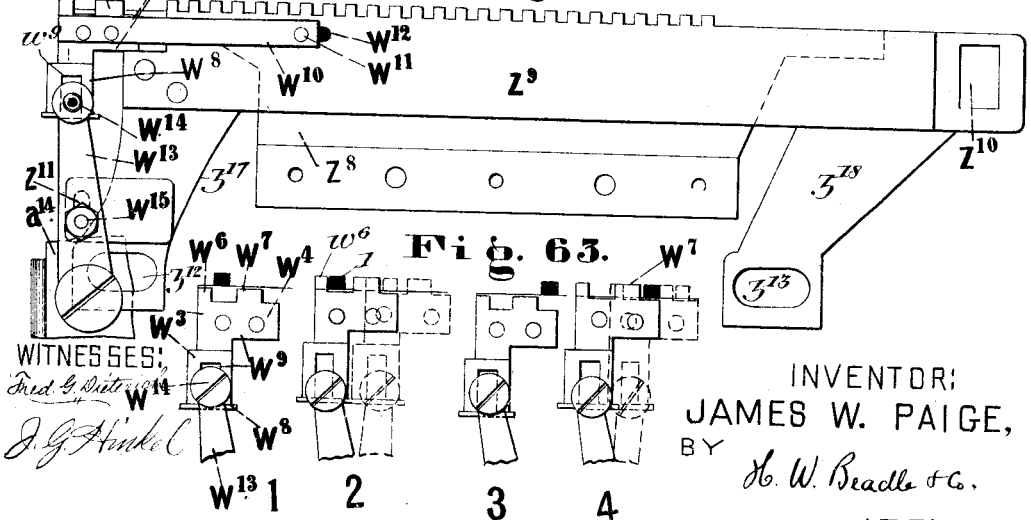
WITNESSES:
Fred G. Dieterich
J. G. Hinkel
INVENTOR:
JAMES W. PAIGE,
BY
H. W. Beadle & Co.
ATTYS.

(No Model.)
J. W. PAIGE.
MACHINE FOR SETTING, DISTRIBUTING, AND JUSTIFYING TYPE.
No. 547,859.
Patented Oct. 15, 1895.
31 Sheets—Sheet 19.
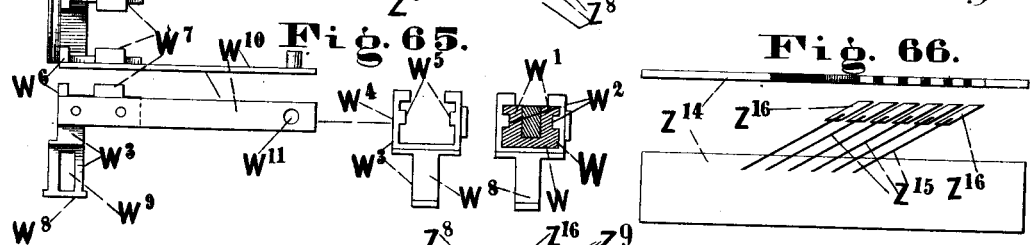
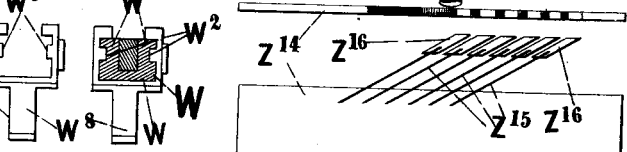
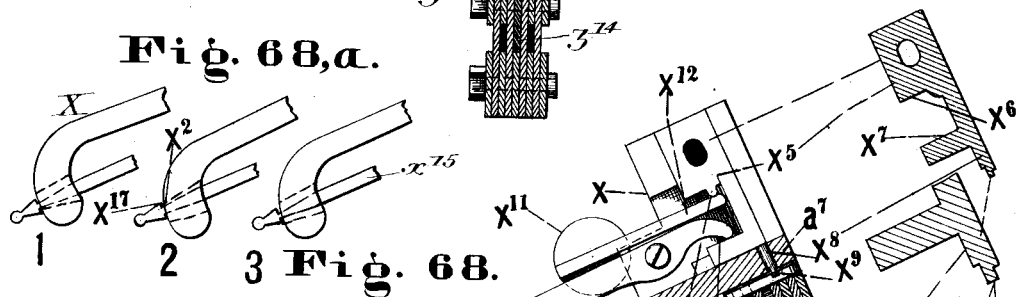
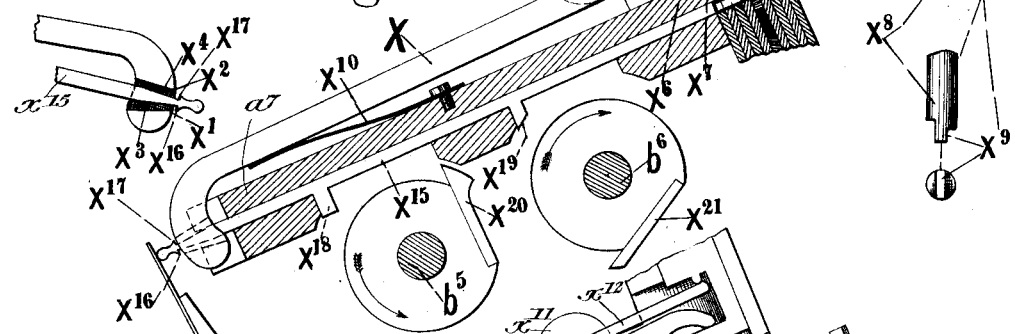
WITNESSES:
Fred G. Dieterich
J. G. Hinks
INVENTOR:
JAMES W PAIGE,
BY H. W. Beadle & Co.
ATTYS (No Model.) 31 Sheets—Sheet 20.
J. W. PAIGE.
MACHINE FOR SETTING, DISTRIBUTING, AND JUSTIFYING TYPE.
No. 547,859. Patented Oct. 15, 1895.
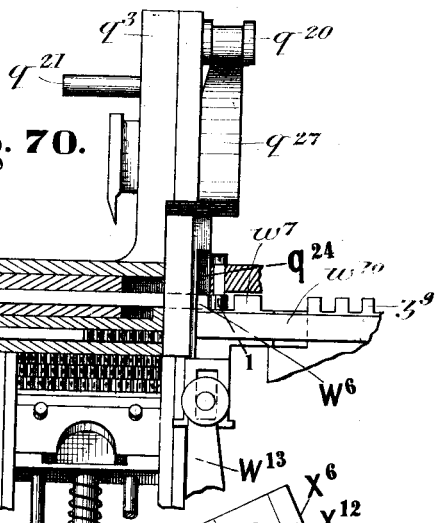
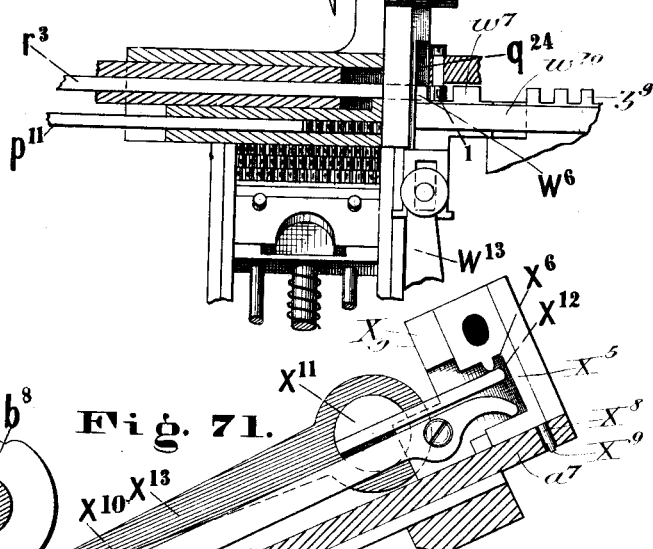
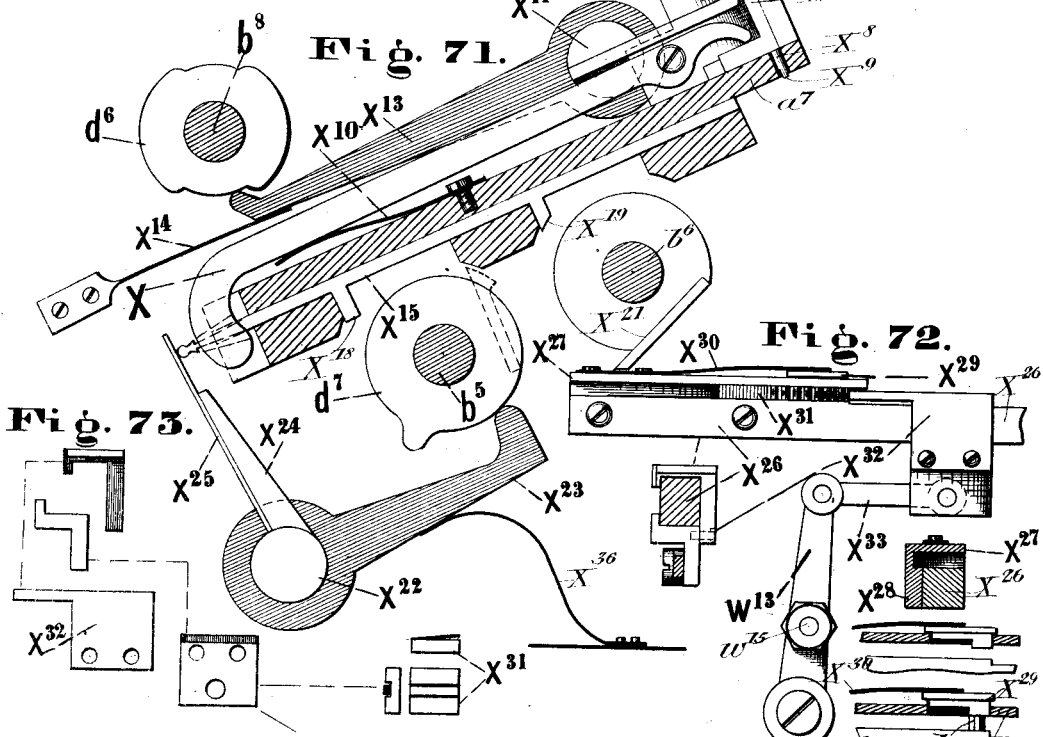
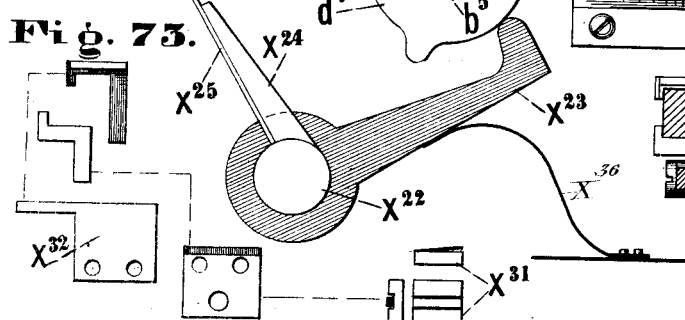
WITNESSES:
Fred G. Dieterich
J. G. Hinkel
INVENTOR:
JAMES W. PAIGE,
BY H. W. Beadle & Co.
ATTYS (No Model.) 31 Sheets—Sheet 21.
J. W. PAIGE.
MACHINE FOR SETTING, DISTRIBUTING, AND JUSTIFYING TYPE.
No. 547,859. Patented Oct. 15, 1895.
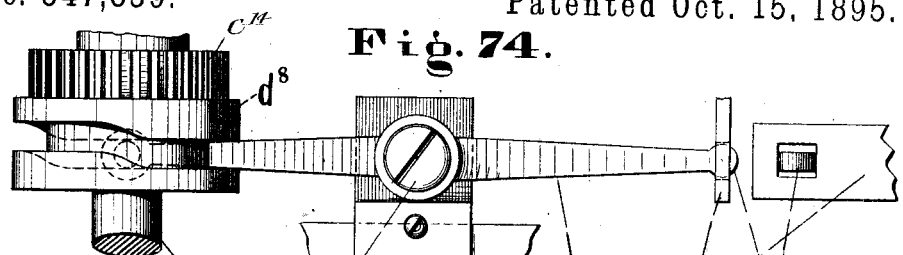
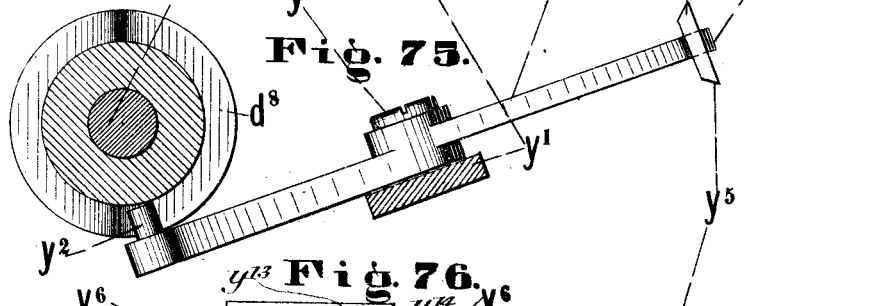
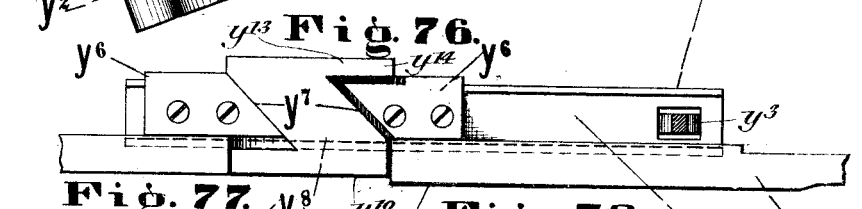
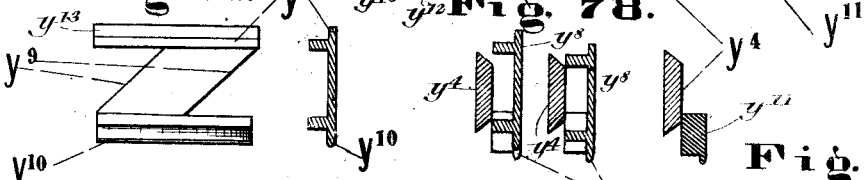
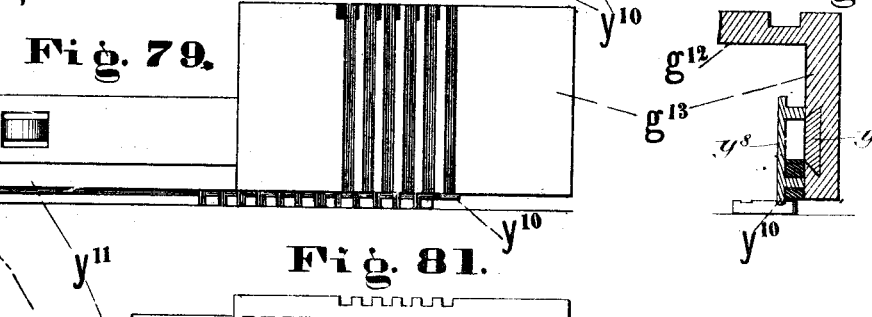
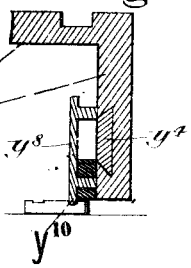
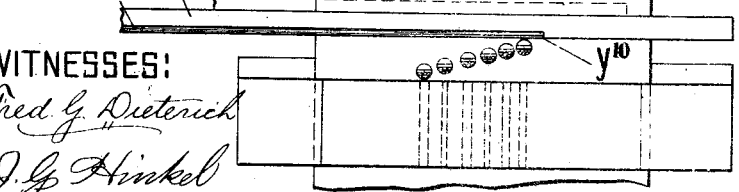
WITNESSES:
Fred G. Dieterich
J. G. Hinkel
INVENTOR:
JAMES W. PAIGE,
BY H. W. Beadle &c.
ATTYS.

(No Model.)

J. W. PAIGE.
MACHINE FOR SETTING, DISTRIBUTING, AND JUSTIFYING TYPE.

No. 547,859.

Patented Oct. 15, 1895.

31 Sheets—Sheet 22.

WITNESSES:
Fred. G. Dieterich
J. G. Hinkel

INVENTOR:
JAMES W. PAIGE,
BY H. W. Beadle & Co.
ATTYS (No Model.)
J. W. PAIGE.
MACHINE FOR SETTING, DISTRIBUTING, AND JUSTIFYING TYPE.
No. 547,859. Patented Oct. 15, 1895.
Fig. 83. Fig. 84.
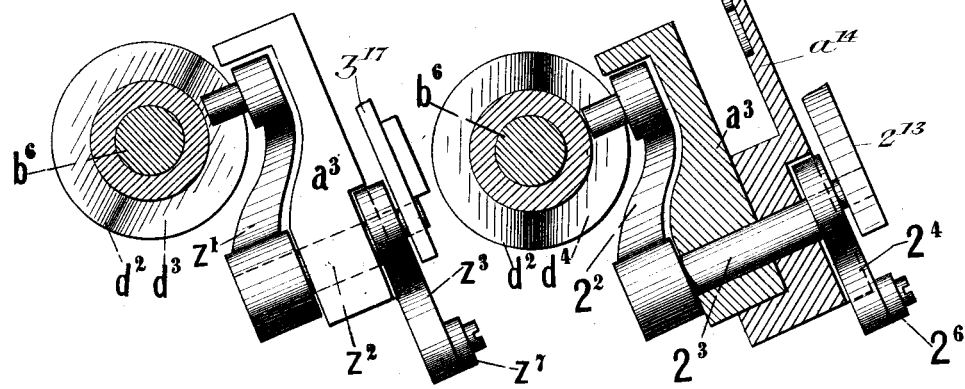
Fig. 85.
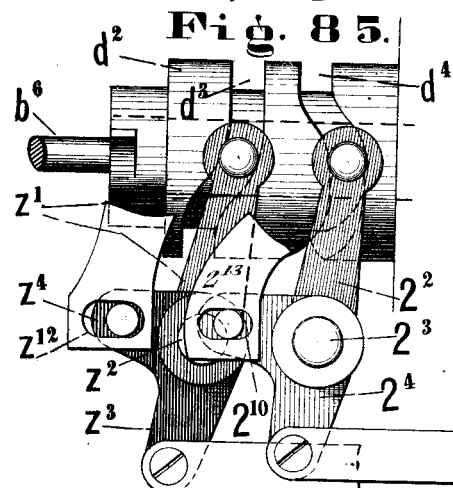
Fig. 86,a. Fig. 86. Fig. 86,b.
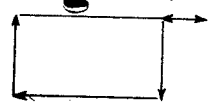 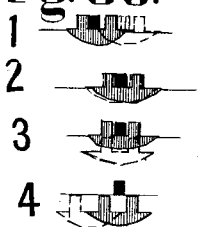 
WITNESSES:
Fred. G. Dieterich
J. G. Hinkel
INVENTOR:
JAMES W. PAIGE.
BY H. W. Beadle & Co.
ATTYS

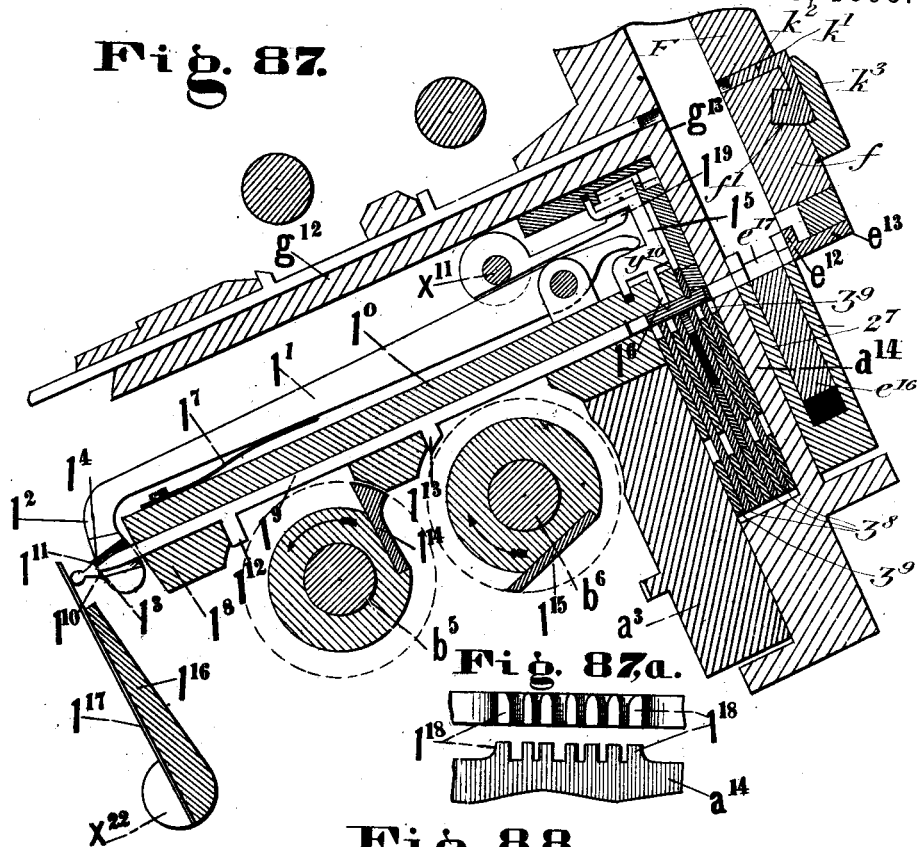

(No Model.) 31 Sheets—Sheet 25.
J. W. PAIGE.
MACHINE FOR SETTING, DISTRIBUTING, AND JUSTIFYING TYPE.
No. 547,859. Patented Oct. 15, 1895.
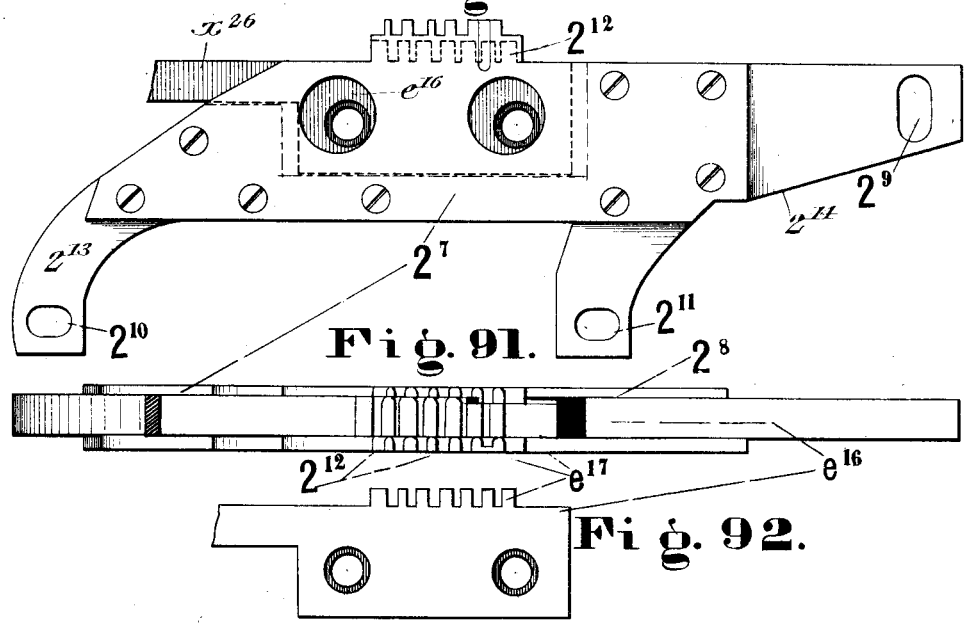
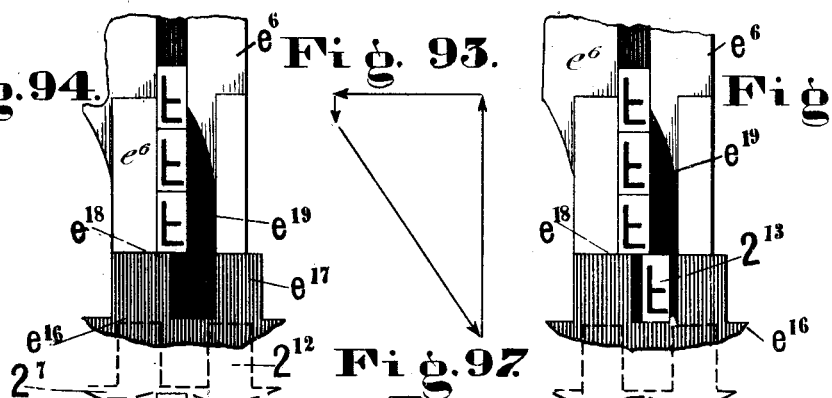
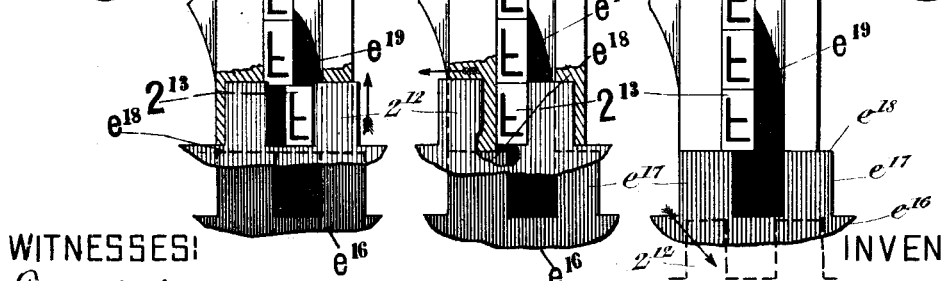
WITNESSES:
Fred. G. Dieterich
J. G. Hinkel
INVENTOR:
JAMES W. PAIGE,
BY H. W. Beadle & Co.
ATTYS (No Model.)   31 Sheets—Sheet 26.
J. W. PAIGE.
MACHINE FOR SETTING, DISTRIBUTING, AND JUSTIFYING TYPE.
No. 547,859.   Patented Oct. 15, 1895.
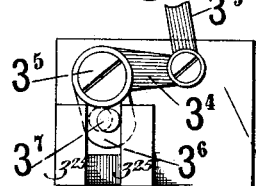
Fig. 99.
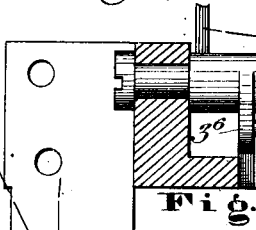
Fig. 100.
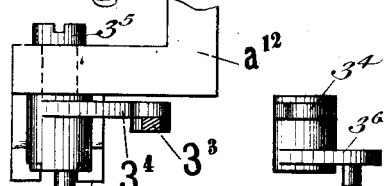
Fig. 101.
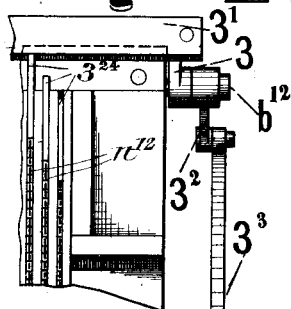
Fig. 102.
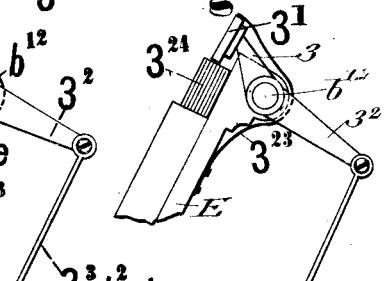
Fig. 103. Fig. 104.
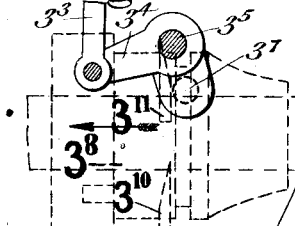
Fig. 103a.
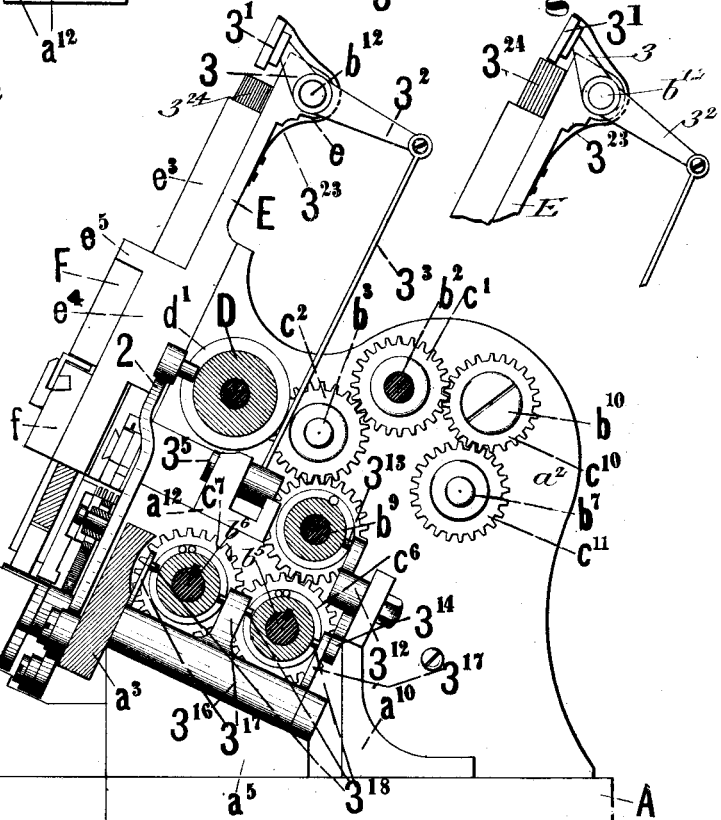
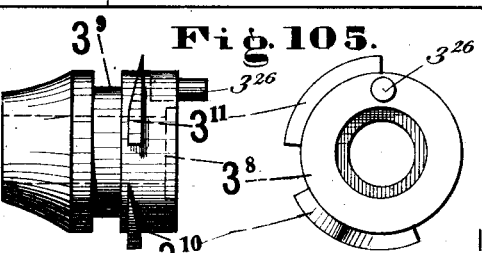
Fig. 105.
WITNESSES:
Fred. G. Dieterich
J. G. Hinkel
INVENTOR:
JAMES W. PAIGE,
BY H. W. Beadle & Co.
ATTYS (No Model.) 31 Sheets—Sheet 27.
J. W. PAIGE.
MACHINE FOR SETTING, DISTRIBUTING, AND JUSTIFYING TYPE.
No. 547,859. Patented Oct. 15, 1895
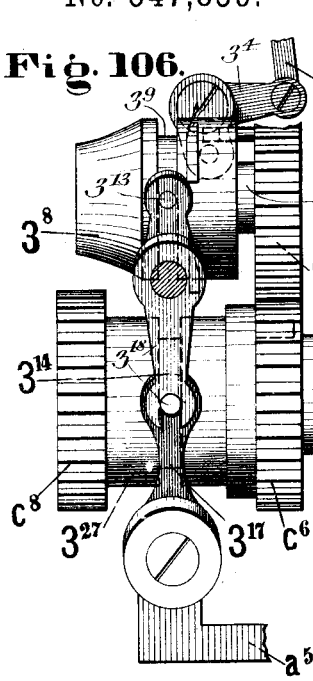
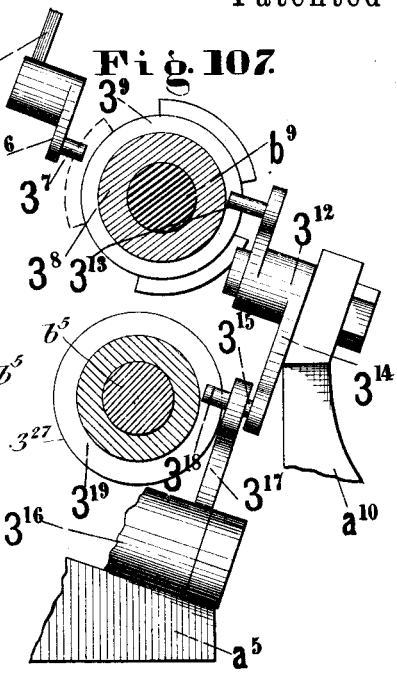
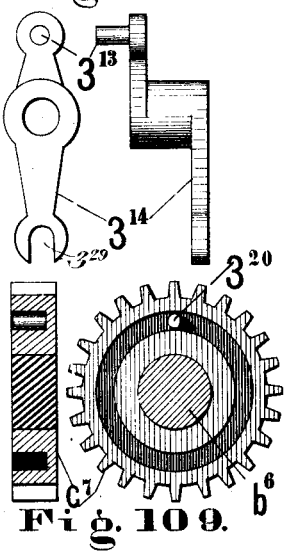
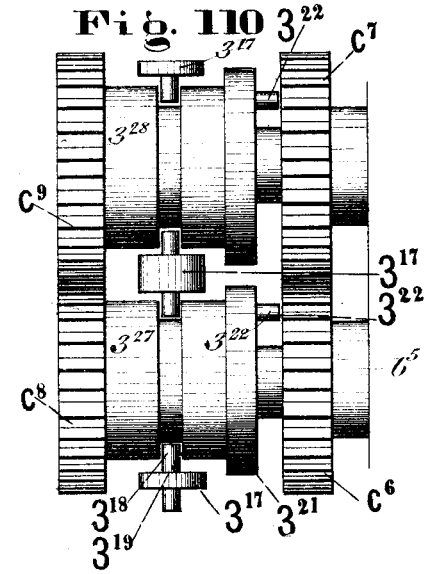
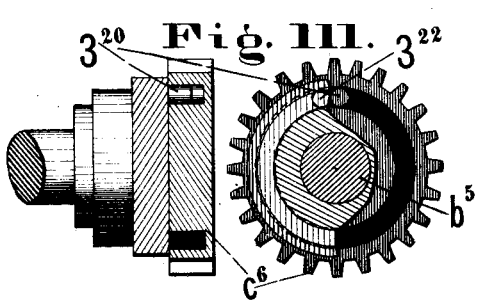
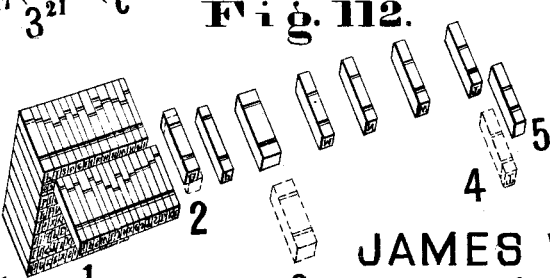
WITNESSES:
Fred G. Dieterich
J. G. Hinkel
INVENTOR:
JAMES W. PAIGE,
BY H. W. Beadle + Co.
ATTYS (No Model.) 31 Sheets—Sheet 28.
J. W. PAIGE.
MACHINE FOR SETTING, DISTRIBUTING, AND JUSTIFYING TYPE.
No. 547,859. Patented Oct. 15, 1895.
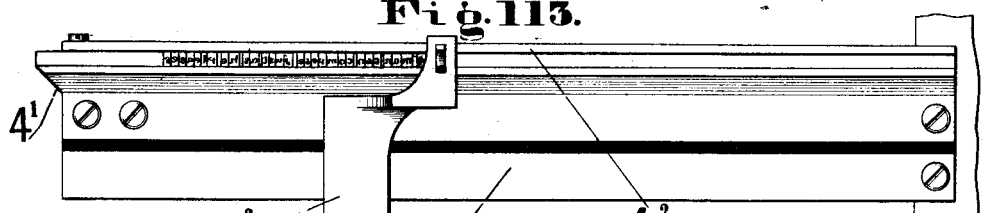
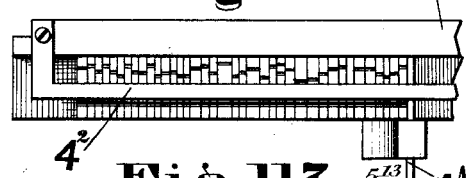
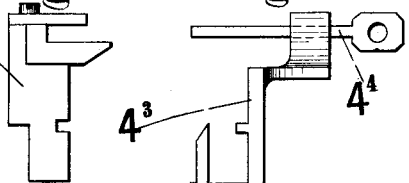
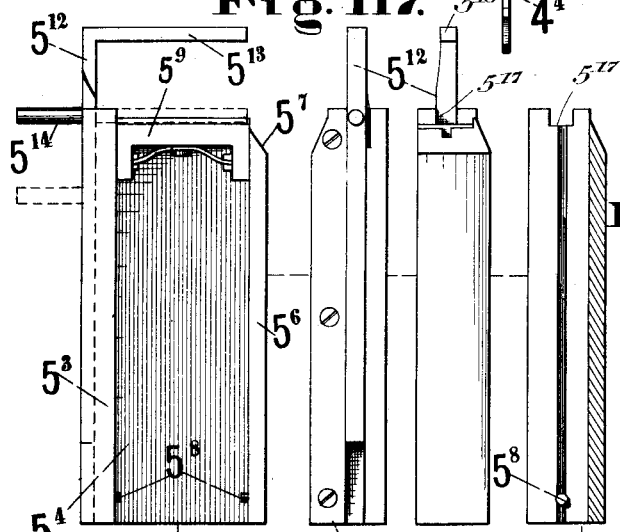
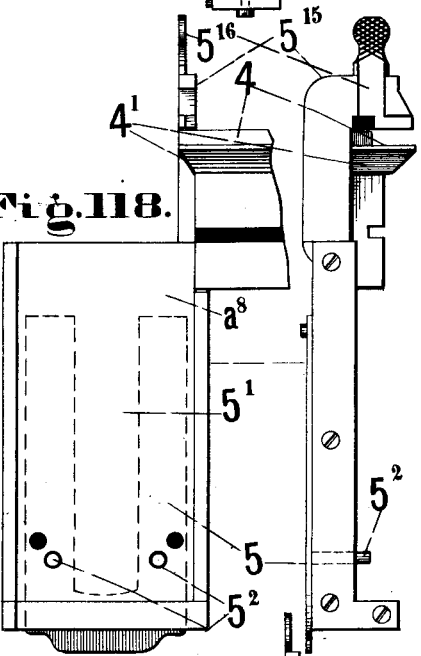
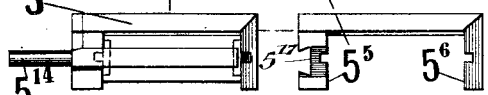
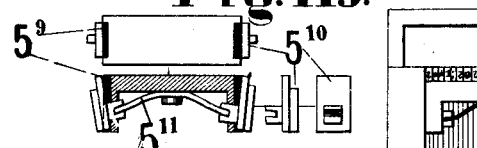
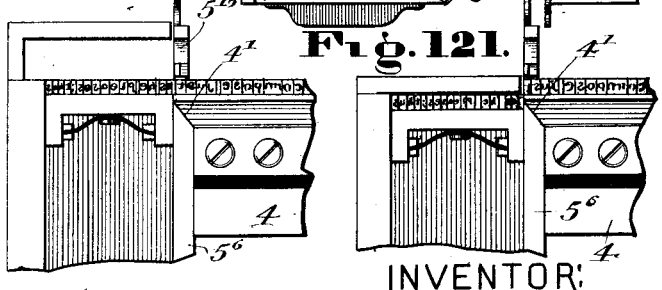
WITNESSES:
Fred G. Dieterich
J. G. Hinkel
INVENTOR:
JAMES W. PAIGE,
BY H. W. Beadle + Co.
ATTYS

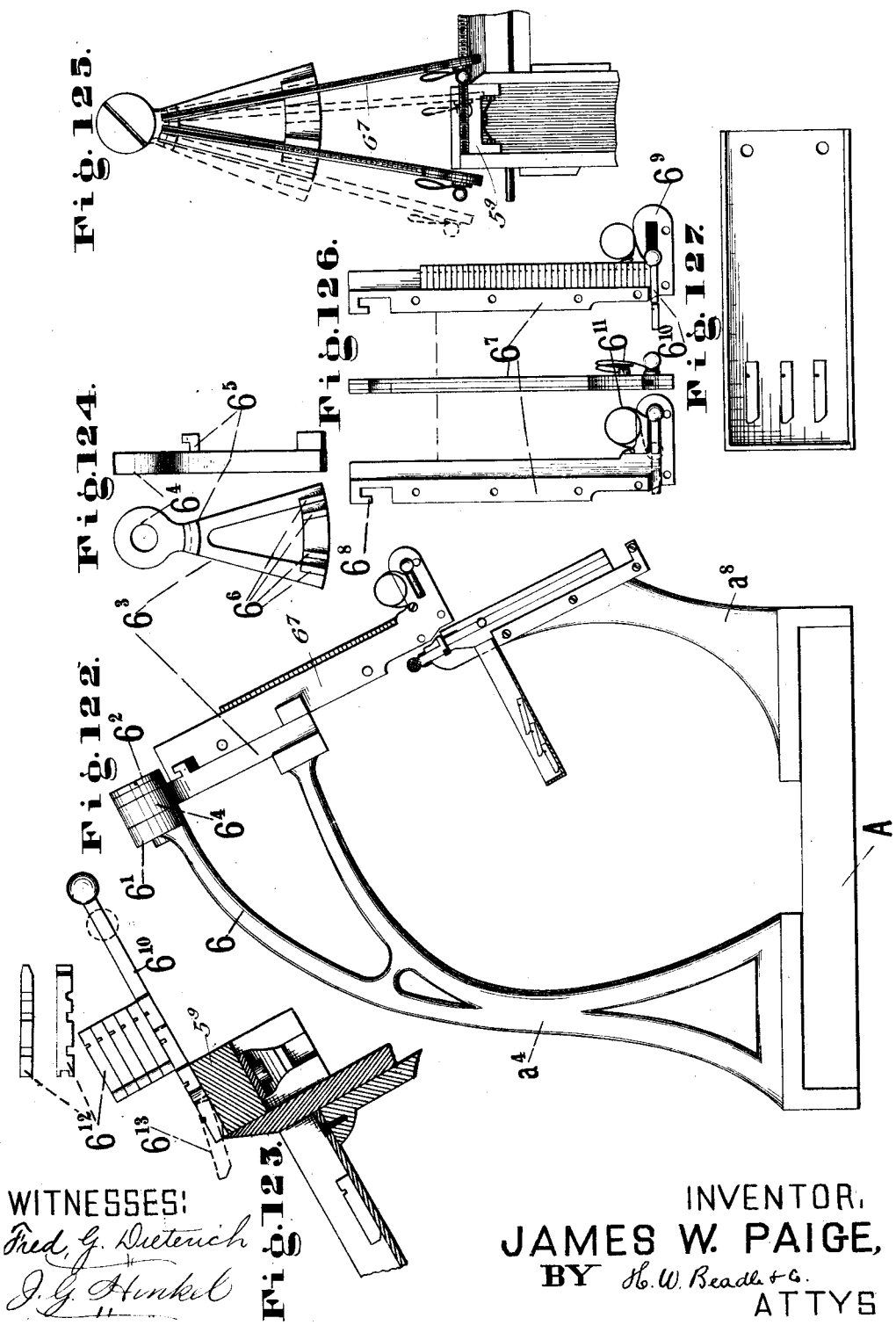

(No Model.)　　　　　　　　　　　　　　　　　　31 Sheets—Sheet 30.
J. W. PAIGE.
MACHINE FOR SETTING, DISTRIBUTING, AND JUSTIFYING TYPE.
No. 547,859.　　　　　　　　　　　　　Patented Oct. 15, 1895.
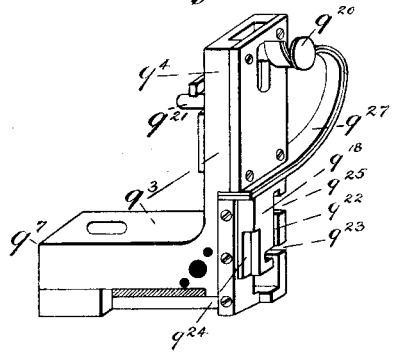
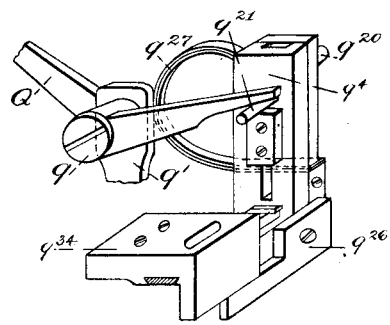
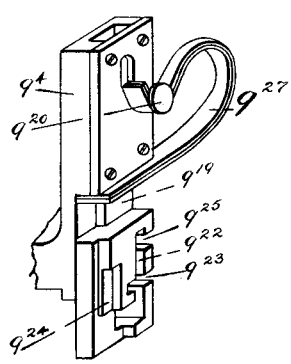
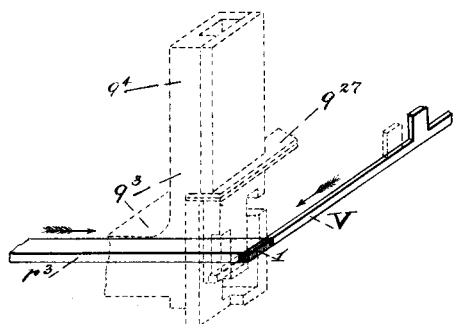

(No Model.)

J. W. PAIGE.
MACHINE FOR SETTING, DISTRIBUTING, AND JUSTIFYING TYPE.

No. 547,859.

31 Sheets—Sheet 31.

Patented Oct. 15, 1895.

WITNESSES:
T. S. West
Wm. H. Emerson

INVENTOR:
JAMES W. PAIGE,
BY H. W. Beadle & Co.
ATTYS.

UNITED STATES PATENT OFFICE.

JAMES W. PAIGE, OF HARTFORD, CONNECTICUT.

MACHINE FOR SETTING, DISTRIBUTING, AND JUSTIFYING TYPE.

SPECIFICATION forming part of Letters Patent No. 547,859, dated October 15, 1895.

Application filed December 5, 1882. Serial No. 78,527. (No model.)

*To all whom it may concern:*

Be it known that I, JAMES W. PAIGE, of Hartford, in the county of Hartford and State of Connecticut, have invented a new, useful, and Improved Machine for Distributing, Setting, and Justifying Type; and I do hereby declare that the following is a full, clear, and exact description thereof, reference being had to the accompanying drawings, forming a part of this specification, in which corresponding letters and numerals of reference in the different figures indicate like parts.

The primary object of my invention is to provide in one common organism a type-distributing and composing machine which may be so constructed as to utilize the "dead matter" in a distributing-galley as a direct source of supply for composition, the respective mechanism being arranged and combined to coact in such a manner that the distributing mechanism may serve as an automatic and positive feed for the setting mechanism, while provision may be made for a sufficient reserve of type to meet the demands of continuous composition should the class of characters or individual type needed at a given time vary from or exceed in number those found in the distributing-galley.

A further object is to render the entire mechanism subservient to a common source of power, each mechanism being in harmonious accord with the entire system as well as with that with which it directly coacts, so that the whole may be under the control and subject to the volition of a single operator, while at the same time all of the movements of the machine for the purpose of distributing and setting the type, other than the mere depression of the keys, may be automatic and wholly independent of the operator.

A further aim is to distribute and set a series of type by means of what I term a "single impulse" of the machine, during which one or more keys may be depressed in conformity to the arrangement of the keyboard and the channels of the type-case, type, if need be, being both distributed into and set from a given channel or channels during such impulse.

Moreover, it is my object to provide for an automatic compensating action between the distributing and setting mechanisms, whereby in the event that the distributing mechanism is allowed to feed the type into the case faster than they are withdrawn therefrom by the setting mechanism, or in case the number of type designated by a given character in the distributing-galley should exceed the requirements of composition at a given time, the movement of the distributing mechanism may be automatically arrested until it is desirable to cause it to again be brought into action, when it may be caused to resume its work as before.

Finally, I desire to provide improved means for transferring the type to and justifying the same in the galley.

To these ends my invention consists more specifically in the following novel features: first, in the employment in the distributing portion of the machine of novel mechanisms for removing a line of dead matter and advancing it intermittently to a suitable separator by means of a line-follower; second, in the employment in the distributer of novel mechanism for cutting off or separating the individual type from the line; third, in the employment of novel mechanism for adjusting the type longitudinally upon the raceway for the purpose of causing them to assume with absolute certainty the proper position for presentation to suitable selecting mechanism; fourth, in the employment of novel means for trying the type before feeding the same into the type-case and for ejecting special characters not provided for therein; fifth, in the employment of novel means for accurately guiding the type upon a raceway and providing for its introduction into the case without interference with the guiding mechanism; sixth, in the employment of novel means for conveying the type in its path toward the case and presenting the same to the selecting mechanism; seventh, in the employment of novel means for selecting the type and ejecting the same at the proper place from the conveying or forwarding mechanism to suitable lifting mechanism; eighth, in the employment of novel lifting mechanism for elevating the respective type into the type-channels; ninth, in the employment of novel automatic mechanism for arresting the movement of the distributer when any one of the type-channels is full; tenth, in the combination, with the type distributing and setting mechanisms, of a peculiarly-constructed type-case, common to both; eleventh, in the employment of novel means for ejecting the type from the type-case upon a raceway; twelfth, in the employment in connection with a main type-driver for gathering the type when ejected into the raceway of the auxiliary driver for removing them into the line of composition; thirteenth, in the employment of novel means for justifying the type, and, fourteenth, it consists, further, in the legitimate combinations of the features referred to with each other and with other features not yet alluded to, and also in numerous details of construction of these and other parts of the machine; all of which will be hereinafter more particularly described and claimed.

Figure 2:
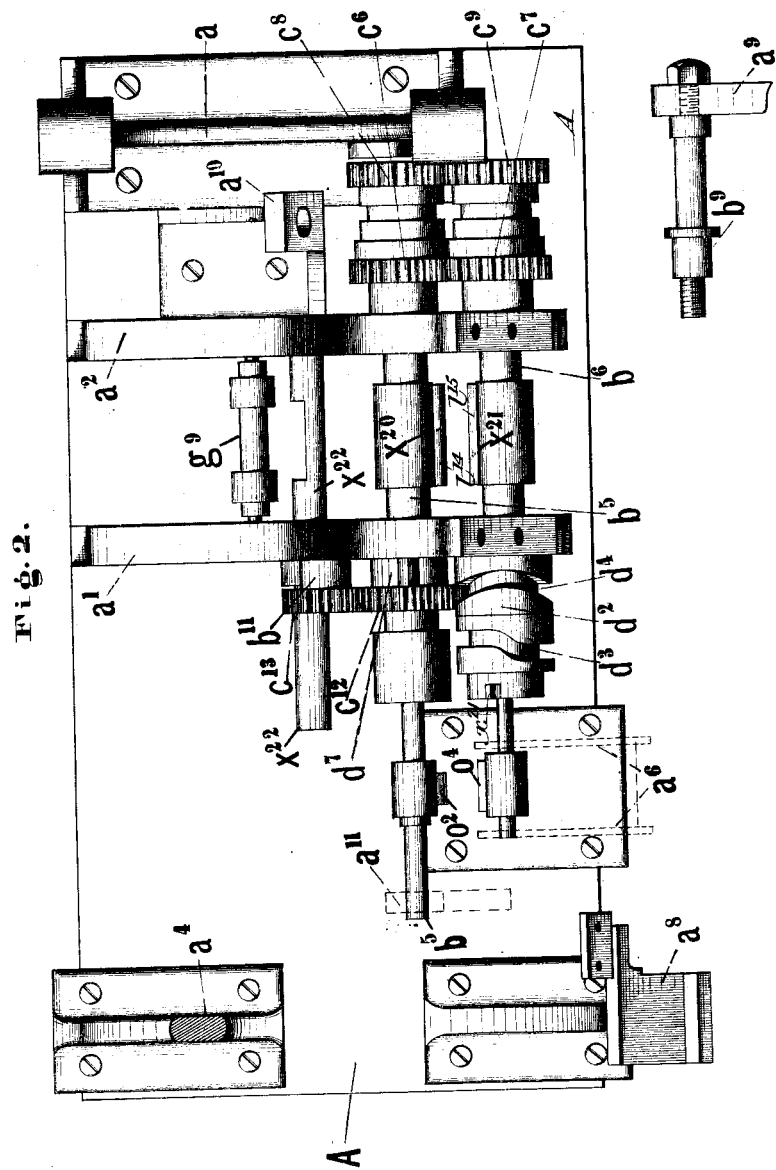
Figure 3:
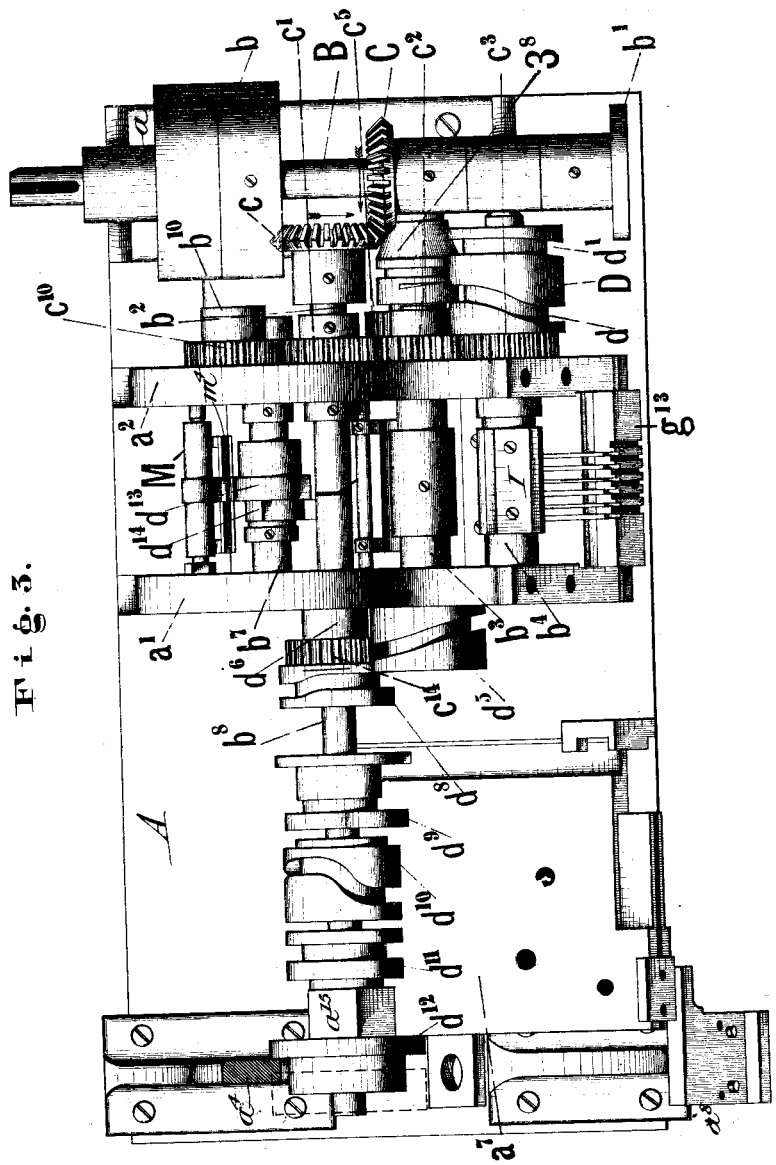
Figure 14:
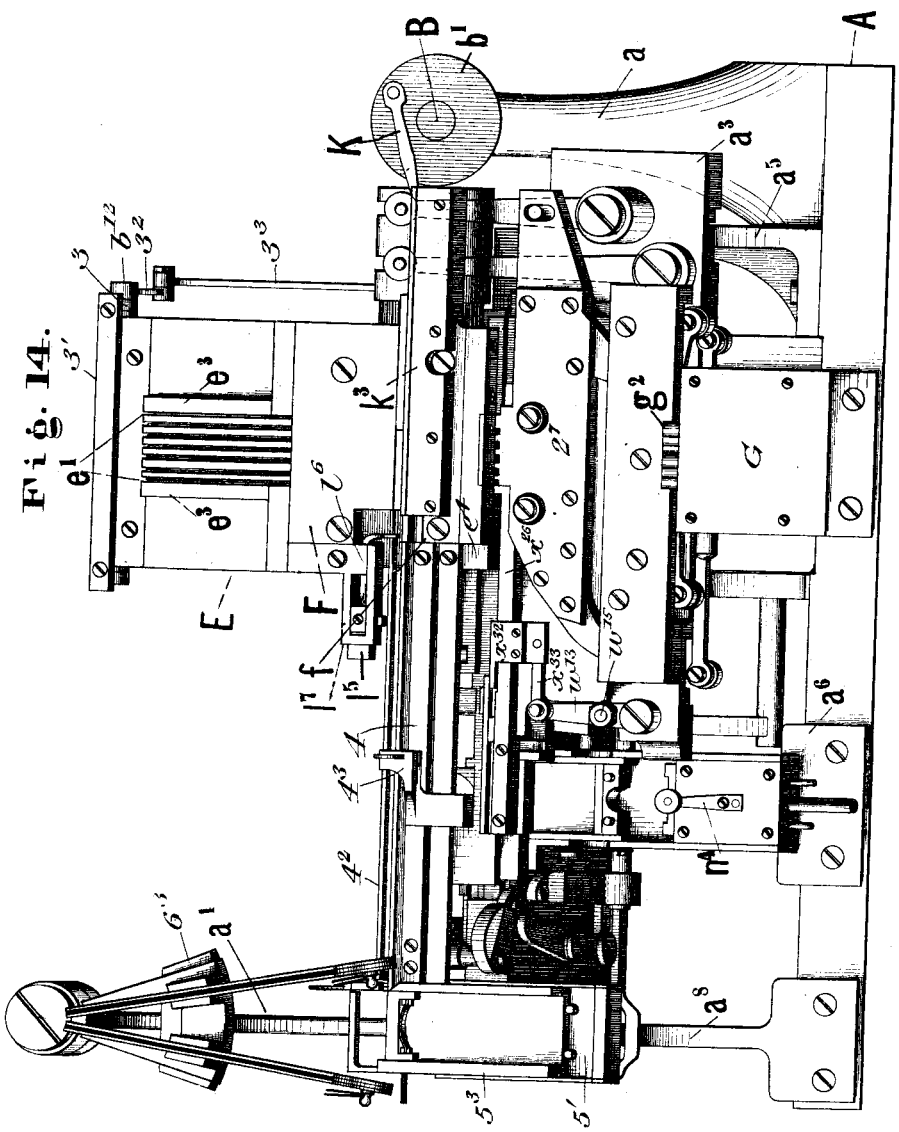
Figure 15:
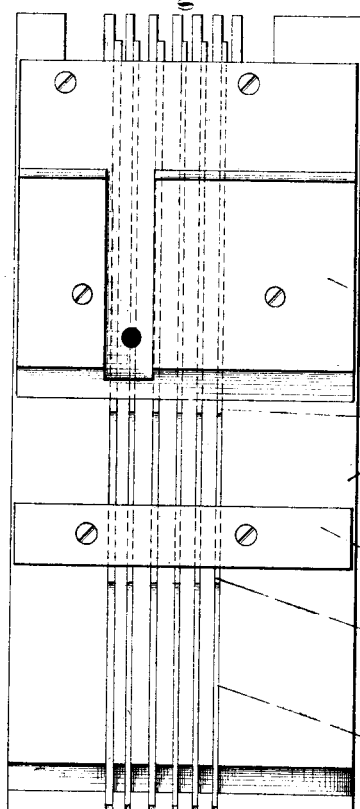
Figure 16:
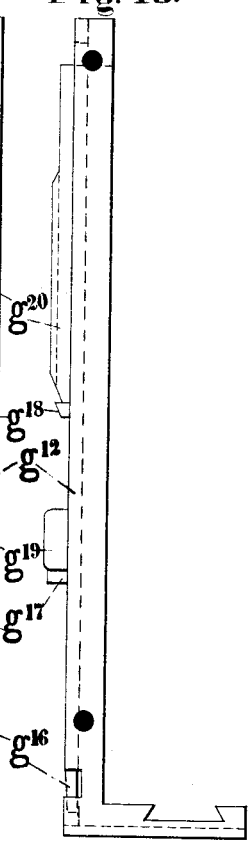
Figure 17:
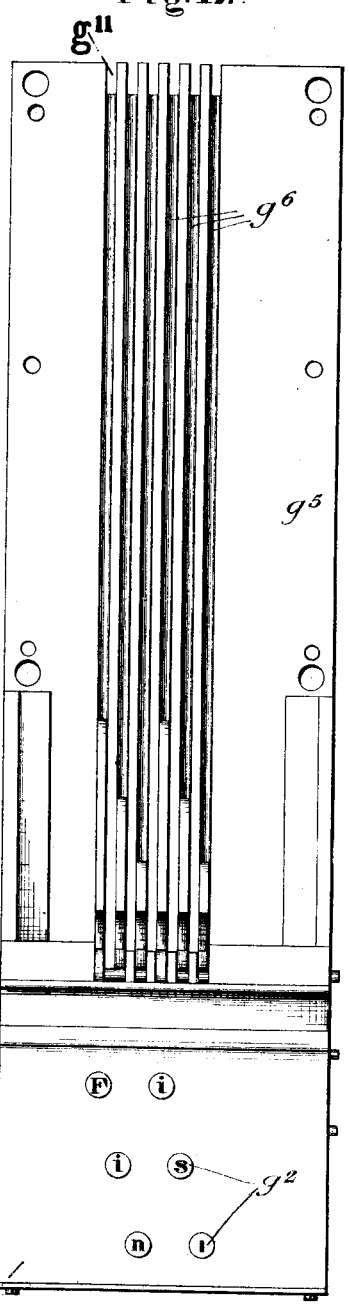
Figure 18:
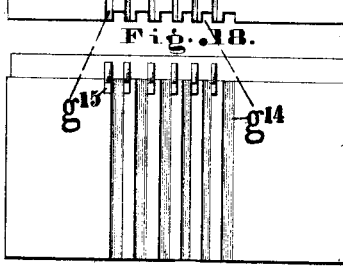
Figure 19:
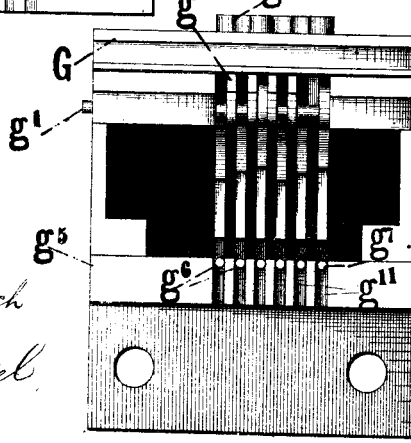
Figure 24:
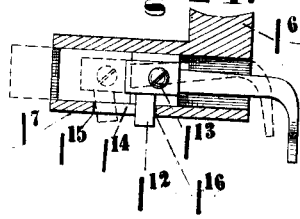
Figure 31:
Figure 32:
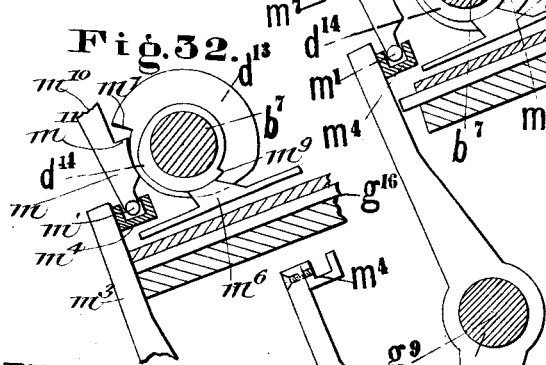
Figure 33:
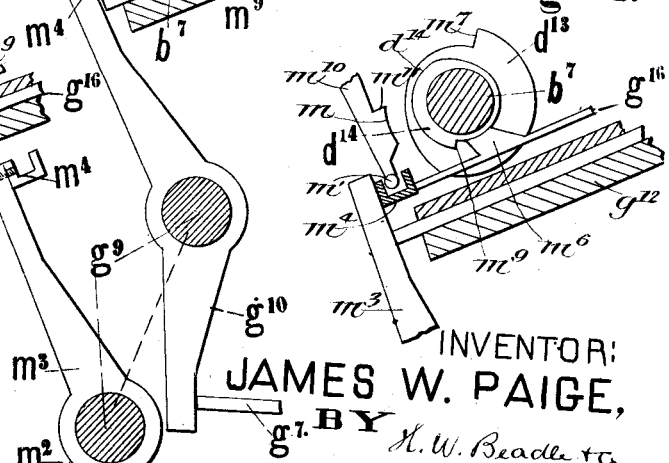
Figure 34:
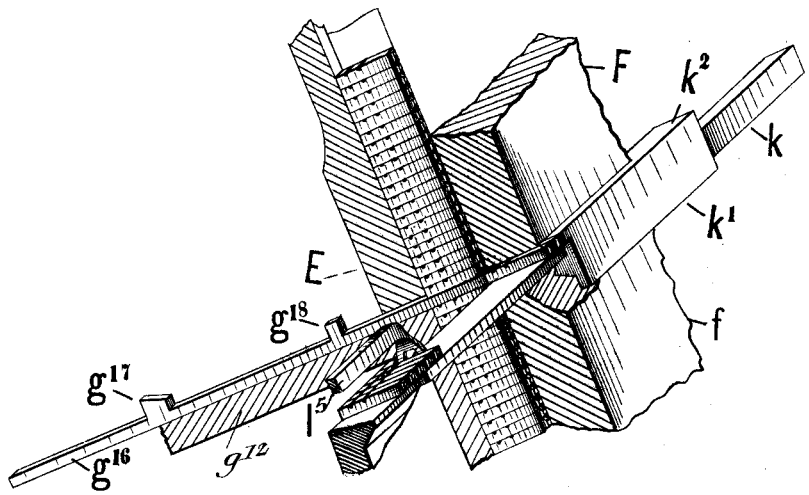
Figure 82:
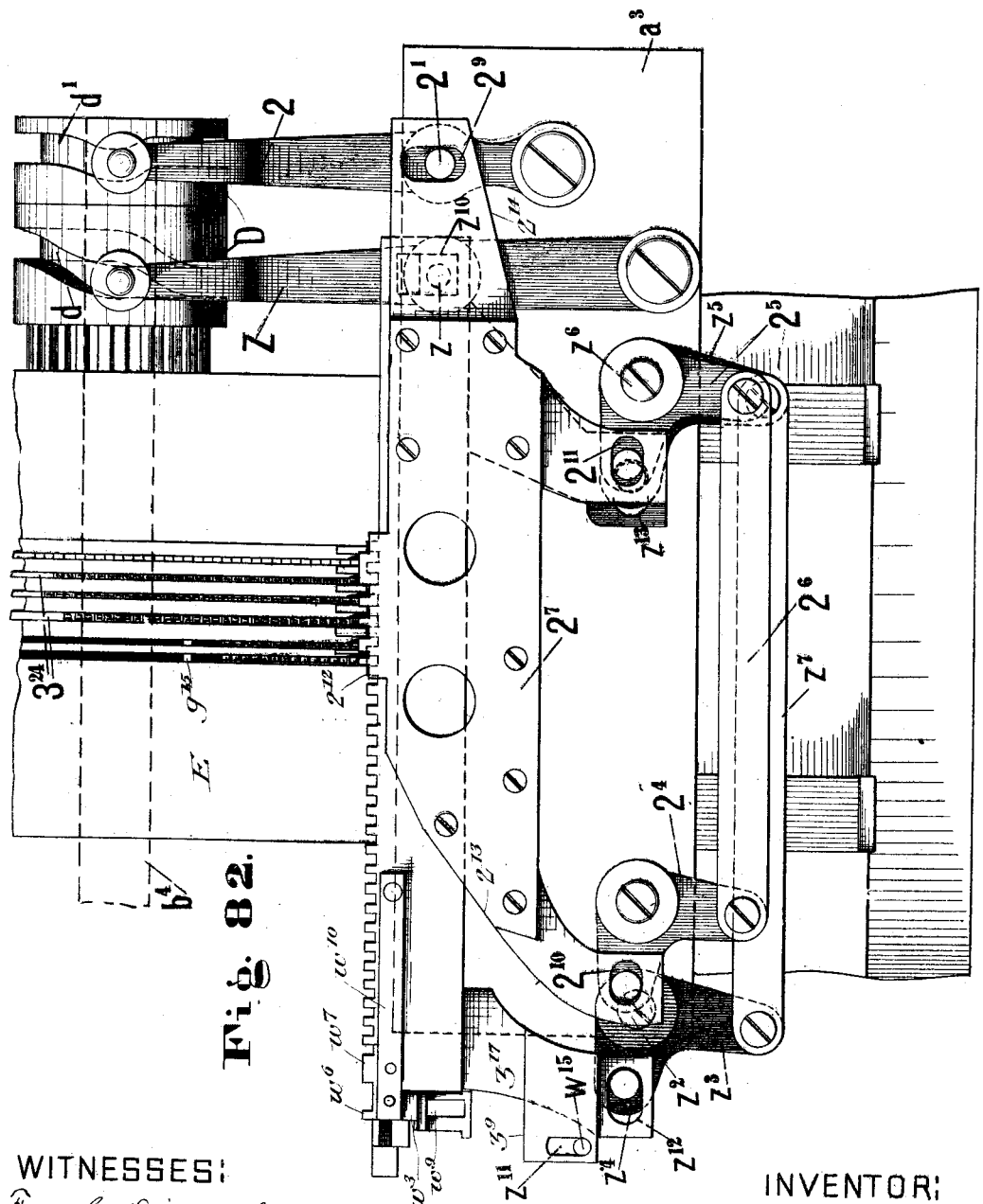
Figure 132:
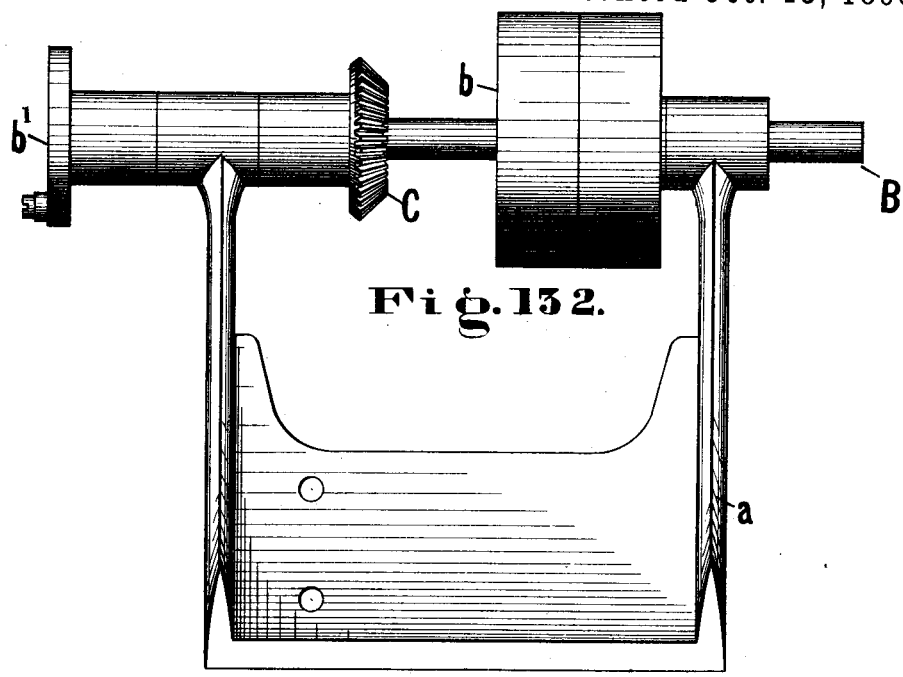
Figure 133:
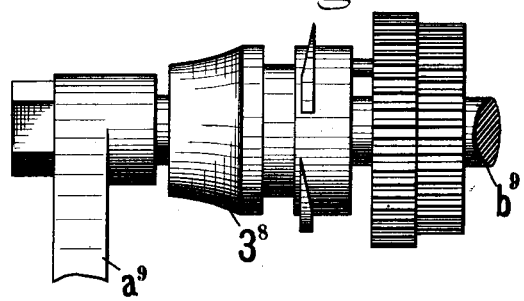

In the drawings, Figure 1 represents a plan view of the framework of the machine; Fig. 2, a plan view of the shafts, gearing, and cams which lie in a lower horizontal plane next the base-plate, the parts above them being removed for the purpose of exposing them to view; Fig. 3, a plan view of the shafts, gearing, and cams which lie in an upper horizontal plane above those shown in Fig. 2; Fig. 4, a side elevation of the vertical plate $a^2$, taken on the right-hand side, and the gearing and shafts supported thereby; Fig. 5, a side elevation of the vertical plate $a'$, taken on the left-hand side, and the gearing and shafts supported thereby; Fig. 6, a front elevation of the type-case; Fig. 7, a side elevation of the same; Fig. 8, a side elevation of one of the division-strips of the type-case; Fig. 9, a plan view of the type-case and bar $e^{16}$ reversed; Fig. 10, a view of the lower end of a type-channel enlarged; Fig. 11, a partial plan view of a forcer-plate $g^{12}$; Fig. 12, a partial view of the lower end of the type-case, showing the means employed to secure the lower ends of the division-strips in place; Fig. 13, a vertical sectional elevation showing the means employed to select the type and eject them from the case into the race. Fig. 13$^a$ is a like view, in detail, showing the type-forcer in position to be actuated by the forwarding carrier-plate. Fig. 13$^b$ is a similar view showing the type-forcer in position to be returned by the returning carrier-plate. Fig. 13$^c$ is a detail view showing the type-forcer advanced; Fig. 14, a front elevation of the entire machine; Figs. 15 and 16, a plan view and side elevation, respectively, of the forcer-plate $g^{12}$; Fig. 17, a plan view of the keyboard and its immediate connections detached from the machine; Fig. 18, a front end elevation of the forcer-plate $g^{12}$; Fig. 19, a rear end elevation of the parts shown in Fig. 17; Fig. 20, a side elevation of the guard-plate $j^2$. Fig. 20$^a$ is a like view showing the guard-plate in a different position; Fig. 21, a rear elevation of the same; Fig. 22, a front elevation of the type-driver; Fig. 23, a cross-section of the supporting-block $f$ with the type-driver $k'$ $k^2$ in full elevation; Figs. 24, 25, 26, 27, 28, 29, and 30, various views of the auxiliary type-driver mechanism by means of which the type which have been gathered by the main driver are removed into the line of composition; Figs. 31, 32, and 33, various views of the time-lock mechanism; Fig. 34, a perspective view representing the relation of the type-forcer, the type-case, the main driver, and the auxiliary driver to each other; Fig. 35, a front elevation of the distributing-galley and the mechanism for advancing the dead-matter column therein. Fig. 35$^a$ is a front elevation of the distributing-galley as it appears when detached. Fig. 35$^b$ is a front elevation in detail of a portion of the distributing-galley as it appears when the column is advanced; Fig. 36, a central sectional elevation of the same. Fig. 36$^a$ is a similar view to that shown in Fig. 36, the gate O being shown as withdrawn. Fig. 36$^b$ is a like view showing the returning carrier-blade in engagement with the gate; Fig. 37, a bottom plan view of the frame-plate $a^7$ and its attachments; Fig. 38, a plan view and sectional elevation of the gate O detached; Fig. 39, a sectional elevation and plan view of the line-follower bar. Fig. 39$^a$ is a detail view in plan of a portion of the line-follower and the lever and ratchet mechanism for advancing the same; Fig. 40, a plan view of the line-follower pawl. Fig. 40$^a$ is a front view of the line-follower pawl. Fig. 40$^b$ is a view representing in detail the respective parts of said pawl; Fig. 41, a plan view of the frame-plate $a^7$ and its attachments; Fig. 42, various views of the lifting-box of the cut-off mechanism; Fig. 43, various views of the removable plate $q^{13}$; Fig. 44, various views of the abutment plate $q^{26}$; Fig. 45, various views of the cut-off block $q^3$; Fig. 46, a side and rear elevation of the plate $q^{89}$; Fig. 47, various views of the cover-plate $q^{16}$; Fig. 48, a front and side elevation of the abutment-plate $q^{28}$; Fig. 49, various views of the hook-plate and its attachments; Figs. 50, 51, 52, 53, 54, 55, 56, 57, and 58, various views illustrating the operation of the cut-off mechanism which separates the individual type from the line. Fig. 58$^a$ is a front view in detail and partly in section of a portion of the cut-off mechanism; Fig. 59, views of the mechanism for clamping the line-follower bar; Fig. 60, a view illustrating the delivery of a type from the cut-off mechanism to the mechanism for adjusting the type longitudinally upon the raceway; Fig. 61, various views of the mechanism for adjusting the type longitudinally upon the raceway; Figs. 62, 62$^a$, and 63, various views of the first or special conveyer or driver; Fig. 64, a plan view of the main conveyer or driver and some of the parts immediately connected therewith; Fig. 65, various views of the special conveyer or driver; Fig. 66, various views of the friction mechanism for preventing the type from being carried beyond their proper position by the inertia of a rapid movement; Fig. 67, a transverse vertical sectional elevation of the main driver, Fig. 64; Figs. 68, 68$^a$, 69, and 71, side elevations of the mechanism for selecting and ejecting those characters in the "matter" which are not provided for in the type-case; Fig. 70, a front elevation illustrating the position of a type when presented to the first or special conveyer or driver; Figs. 72 and 73, various views of the mechanism for moving the ejected type into the "regular pi" line; Fig. 74, a plan view, and Fig. 75, a side elevation, of the cam and lever for actuating the movable portion of the mechanism for accurately guiding the type in their movements across the machine; Figs. 76, 77, 78, 79, 80, and 81, various views of the mechanism proper by means of which the type are guided; Fig. 82, a front elevation of the mechanism for actuating the main driver or conveyer and the lifter; Figs. 83, 84, and 85, various views of the cams and levers by means of which vertical movement is imparted to the driver and lifter. Fig. 86 includes six partial detached views illustrating the successive movement of the main conveyer. Fig. 86$^a$ is a diagram view showing the movement of the special conveyer; Fig. 86$^b$, a diagram illustrating the movement of the main driver or conveyer; Fig. 87, a side elevation of the mechanism for selecting the type and ejecting the same from the distributer raceway to the lifting mechanism. Fig. 87$^a$ is a detail view representing a portion of the auxiliary frame-plate with the studs thereon in plan and elevation, respectively; Figs. 88 and 89, rear elevations of the mechanism for initially actuating the ejecting-forcers; Fig. 90, a side elevation, and Fig. 91, a plan view, of the lifting mechanism; Fig. 92, a side elevation of the supporting-bar $e^{16}$; Figs. 93, 94, 95, 96, 97, and 98, views illustrating the action of the lifting mechanism; Figs. 99, 100, and 101, various views of the rock-shaft $3^5$ and its immediate connections; Fig. 102, a front elevation, and Fig. 104, a side elevation, of the cross-bar 3' and its immediate connections; Fig. 103, a side elevation of the clutch mechanism for arresting the movement of the distributer whenever any one of the type-channels is full. Fig. 103$^a$ is a detail view of the rock-shaft $3^5$ viewed in an opposite direction from that shown in Fig. 99; Fig. 105, a side and end elevation of the clutch-sleeve $3^8$; Figs. 106, 107, 108, 109, 110, and 111, various views of certain portions of the clutch mechanism; Fig. 112, a diagram illustrating the movement of the type; Figs. 113 and 114, front elevation and plan of a portion of the type-setter raceway; Fig. 115, an end elevation of the same; Fig. 116, a detached view of the adjusting-block $4^3$ and the finger-plate $4^4$; Figs. 117 and 118, various views of the setter galley and frame; Fig. 119, various views of the galley-block; Figs. 120 and 121, views illustrating the movement of the type-line into the galley; Fig. 122, a side elevation of the justifying mechanism; Fig. 123, an enlarged view illustrating the action of the space-ejecting forcer; Fig. 124, views of the supporting-block $6^3$; Fig. 125, a front elevation of the space-holders and galley; Fig. 126, various views of the space-holders detached; Fig. 127, a plan view of the space-box detached; Figs. 128, 129, and 130, perspective views of the cut-off mechanism which separates the individual type from the line; Fig. 131, a perspective view illustrating the operation of the mechanism for adjusting the type longitudinally upon the raceway; Fig. 132, a side elevation of the bracket $a$ for supporting the main shaft, and Fig. 133 a side elevation of the shaft $b^9$ and the parts supported thereby.

To enable others to more readily understand my invention, I will first give a brief general description of its operation, after which I will describe the respective coacting mechanisms in the order of their operation, commencing with the distributing mechanism as the primary source of supply, following next with the type-case common to both distributing and setting mechanisms and constituting an intermediate reserve for the latter, next the setting, and finally the justifying mechanism.

The matter to be distributed or the dead-matter column, having been placed in the distributing-galley, which constitutes an essential part of the machine, it is advanced therein by proper mechanism in such manner as to bring its upper line into operative proximity to a reciprocating line-forcer, which by a forward movement ejects the line from the column into a contiguous raceway. An intermittently-moving line-follower then advances this line upon the raceway to a "cut-off" or separator, by means of which the type are removed, one at a time, from the end of the line and are delivered to a special conveyer or forwarder having an intermittent movement. During the intermission of this movement the type are adjusted longitudinally to bring them in proper line for presentation to special selecting mechanism, which, operating upon the type with reference to certain nicks therein, selects those special characters in the matter not provided for in the type-case, when they are acted upon by special ejecting mechanism which ejects the same from the special conveyer into a contiguous raceway.

The ordinary characters provided for in the type-case are delivered by the special conveyer to the main conveyer, and by this they are conveyed preferably along the front of the machine for a greater or less distance, according to their respective positions in the type-case, the line of movement being located below the type-channels, and by preference in the rear of the same, a little more than the length of one type. The conveyer has an intermittent movement, and at each rest in the same each type which has been advanced within the range of its action is tried in the place it may happen to be by suitable selecting mechanism, and those which have reached their proper places at this time are ejected out of the distributing-race onto lifting mechanism located beneath the type-channels, by which they are elevated into the type-channels through an opening in the bottom thereof. The respective type which have not yet reached their proper places are conveyed another step by the next movement of the conveyer and tried again, the operation being continued until their respective places are found, or until, if they do not belong to the font, they are delivered into any suitable receptacle at the farther end of the machine.

The type-case serves as a connecting-link between the distributing and setting mechanisms and is common to both. It serves not only as a receptacle into which the type may be distributed and separated in their order; but its contents constitute a reserve fund from which the setting mechanism may draw, thereby compensating for variations in supply and demand at a given time of individual type as contained in the dead matter column or needed for composition.

In view of the fact that both distributing and setting mechanisms are driven from a common source of power and are arranged so that the former may be actuated automatically with each impulse of the machine, while the latter, being dependent for its initial movement upon the operator, may or may not do so, it follows that when the distributing-galley is kept supplied with dead matter, a larger number of the type will be distributed into the type-channels by the distributing mechanism than are likely to be removed therefrom by the setting mechanism, and hence the type-channels will be kept constantly full or nearly full of type. When any one of the type-channels is completely full, the action of the distributer is automatically arrested until one or more type are drawn from the channel by the action of the setter, when the same is automatically thrown into action again.

The type are set as follows: Upon the depression by the operator of a selecting-key a type-forcer is advanced within the range of movement of a continuously-revolving carrier-plate. By the movement of the carrier-plate the forcer initially moved by the key is carried completely forward and caused to eject a type from that channel of the type-case which is located in the same vertical plane with it and to deliver the same into a raceway immediately in front of the case. A continuously-moving type-driver reciprocating in this raceway then sweeps the ejected type forward a given distance, from which point they are carried on, by means of an auxiliar driver, into the line of composition, where they are justified as follows: The line of composition is "broken" up successively into short lines corresponding in length, as nearly as convenient, with the width of the galley. The first of these, being moved into the galley, is justified or made tight therein by substituting for one or more of the spaces set by the machine one or more wider or narrower ones, as may be necessary. The removal of the spaces and the substitution of others is accomplished by means of a space-holder arranged to swing in the arc of a circle and provided with a forcer, which, when brought to a proper point in the line, is caused to insert a space of the proper width into the line, which action simultaneously causes the ejection of the space first set by the machine. As each line is justified within the galley it is moved downwardly sufficiently to enable its top surface to form a continuation of the race for the next succeeding line, and so on until the galley is full.

It will thus be seen that the operation of the machine is a continuous one from the automatic removal of the line from the dead-matter galley until the type are swept into the line of composition ready for justification, and that the machine as a whole is an entirety harmonious in the coaction of its parts and serving as a mechanical substitute for the human compositor in the continuous distribution and setting of the type.

As before stated, I will now give a detailed description of the various mechanisms in the machine in the order referred to.

*The framework.*—Referring to the drawings, A, Figs. 1 and 2, indicate a base-plate of proper size and suitable material, which may be supported in any well-known way, and which, with the bracket $a$, the vertical plates $a'$ $a^2$, frame-plate $a^3$, brackets $a^4$ $a^5$ $a^6$ $a^7$, and other analogous parts, hereinafter referred to and preferably constructed substantially in the manner indicated, constitute the framework of the machine, the form of which it is unnecessary to describe in detail, as it may be varied indefinitely.

*The distributing mechanism.*—Mounted in proper bearings upon the bracket $a$ is the main shaft B, which is provided with a suitable pulley $b$ and a bevel-gear C, Fig. 3, which latter is arranged to engage with a corresponding gear upon the auxiliary shaft $b^2$, mounted in bearings in the plates $a'$ $a^2$. A gear-wheel $c'$ (see Fig. 4) upon the shaft $b^2$ engages with a secondary gear $c^2$ upon a shaft $b^3$. The gear $c^2$ engages with gears $c^3$ $c^4$, the former of which $c^3$ is mounted upon a shaft $b^4$, while the gear-wheel $c^4$ meshes into a gear $c^6$, loosely mounted upon a shaft $b^5$, which latter gear is arranged to drive a gear-wheel $c^7$, loosely mounted upon a shaft $b^6$. The shafts $b^5$ $b^6$, respectively, are mounted in suitable bearings in the plates $a'$ $a^2$, as clearly shown in Figs. 2 and 4; and with a shaft $b^8$, Figs. 3 and 41, one end of which is mounted in a suitable bearing in the vertical plate $a'$, and the other in a bearing in an upright support $a^{15}$. Figs. 1, 3, and 41 constitute the main driving parts of the distributing mechanism. The shaft $b^8$ is provided with a gear $c^{14}$, which is driven by an intermediate gear $c^{13}$, mounted upon a stud $b^{11}$, attached to the plate $a'$, which gear meshes into and is driven by a gear $c^{12}$ upon the shaft $b^5$, as clearly shown in Fig. 5. The various cams upon said shafts and the respective functions performed thereby, as well as the respective elements connected and coacting therewith, will be hereinafter described and explained in consecutive order. Commencing with the distributing-galley, I will now proceed with said description.

*Mechanism for advancing the dead matter column.*—Rigidly attached to the plate A is a bracket $a^6$, Figs. 1, 2, 35, and 36, which is adapted to support the distributing-galley $n^6$, Fig. $35^a$, which consists of a metallic plate having side pieces $n^7$. The galley is arranged to slide loosely between side pieces $n^{11}$, Figs. 35 and 36, between which last-named parts, at the base of the bracket, is located a block N, provided with three longitudinal bores, clearly indicated in dotted lines, for the reception of rods $n$ $n'$, loosely inserted therein and attached to a follower $n^2$. The rod $n$ is surrounded by a spiral spring $n^3$, arranged as shown in Fig. 36, which is adapted to elevate the follower in the manner and for the purpose hereinafter stated. A detachable block $n^8$, Figs. 35, $35^a$, and 36, is placed loosely in the galley $n^6$ to serve as a support for the type $n^{12}$, said block being limited in its downward movement by means of pins $n^9$, Fig. $35^a$, and being provided upon its front face with pins $n^{10}$ to serve as stops in limiting its upward movement, so that it may not interfere with that of the line-forcer hereinafter referred to. A spring-catch $n^4$, Fig. 35, of any convenient construction, is arranged to engage with the follower-plate $n^2$ and hold the same in a depressed position during the adjustment of the galley, which latter is detachably secured in position by means of a spring-catch $n^5$ upon one of the side pieces $n^{11}$, which catch engages with a bore in one of the side pieces $n^7$ of the galley.

*Mechanism for removing the type from the column.*—Lying loosely against and parallel with an inclined frame-plate $a^7$, Figs. 1, $36^a$, and 37, and arranged in suitable guides, is a flat movable plate or line-forcer O, which is guided through an opening at the top of the plate $a^6$ so as to force forward the uppermost line of type in the galley, which line is pressed against the frame-plate $a^7$ by means of the spring $n^3$. The line-forcer is provided with slots or openings $o^3$ $o^5$ therein, as clearly shown in Figs. 36, $36^a$, $36^b$, 37, and 38, into which revoluble carrier-plates $o^2$ $o^4$, rigidly attached to sleeves upon the shafts $b^5$ $b^6$, respectively, are projected, one or the other of said carrier-plates being arranged to engage with bearing-faces within the slots $o^3$ $o^5$ of said line-forcer, according to its relative position in relation thereto, as controlled by other mechanism hereinafter described. The shafts $b^5$ $b^6$ are driven in opposite directions, as indicated by the arrows shown in Figs. 36 and $36^a$, and hence the line-forcer is reciprocated in one or another direction, according to the movement of the particular carrier-plate by which it may at a given time be engaged, but not continuously, inasmuch as it is necessary to dispose, one by one, of the type of an entire line before another line can be forced out, and as each of said shafts is required to make a complete revolution in the selection of each type it follows that the line-forcer should be actuated only at corresponding intervals, as hereinafter described.

When the line-forcer O is in the position shown in Fig. $36^b$, it is engaged by the carrier-plate $o^2$, acting against the working face of the recess $o^3$, and moved back to the position shown in Fig. $36^a$, when, the forward end of the forcer-plate being sufficiently withdrawn, the type in the galley is lifted by means of the spring $n^3$ until the upper line is in the same plane with that of the forcer-plate. The working face of the slot $o^5$ is then in position to be engaged by the carrier-plate $o^4$, which forces it forward, thereby projecting the upper line of type into a contiguous raceway communicating with a cut-off or separator-block $q^3$, hereinafter described. By means of an abutment $q^{26}$, Fig. 36, the forcer is prevented from moving the type too far.

A slight interval of time elapses between the action of the rear carrier and that of the front one, so that the line-forcer, after receiving its rearward movement, is caused to wait an instant before being carried forward again, during which time the dead-matter column is advanced in the manner described. It is obvious that the line-forcer should have a forward longitudinal movement somewhat greater than that imparted by the returning-plate; otherwise when moved to one extreme position it would be immediately returned and thus be caused to reciprocate back and forth. The required additional movement is clearly indicated in Fig. 36, where the line-forcer is shown in its extreme forward position, and the carrier-plate $o^2$ is free to revolve without engaging it. Hence a slight backward movement is required to bring the bearing-face of the slot $o^3$ into the path of the carrier $o^2$. I accomplish this by means of a spring $o'$, attached to the frame-plate $a^7$, more clearly shown in Fig. $36^b$, which engages a pin $o$ upon the rear of the line-forcer O. The throw of the forward carrier is greater than that of its fellow to the extent of this extra movement; but it is obvious that the line-forcer cannot be allowed to reciprocate continuously with the revolution of the shafts $b^5$ $b^6$, as above suggested, because the lines would thereby be forced out of the dead-matter column much faster than the type could be taken care of by the selecting mechanism. Hence it is necessary that the movement of the line-forcer should be arrested until the type in the line forced out are properly disposed of, one by one. To accomplish this I lock the line-forcer with each forward movement, in which position it is retained until automatically released, as hereinafter stated.

A latch T, secured loosely in guides upon the bottom of the frame-plate $a^7$, is arranged to engage with a notch $o^6$, Fig. 38, in the line-forcer O when the latter is in a forward position. The latch is caused to thus engage the notch by the action of a lever $t$, pivoted upon the frame-plate $a^7$, one end of which is loosely connected with said latch, while the other is in engagement with a spring $t'$, which presses against the short end of said lever, thereby holding the latch in engagement with the line-forcer until released by the action of a line-follower, which is adapted to move the line of type in the contiguous raceway, into which it is pushed by the line-forcer by a step-by-step movement, until all of the type of a given line are disposed of, when it is withdrawn to make room for another line. The line-follower $p^{11}$ is shown in Figs. 37, 39, and 39ª, and consists of a flat bar the width of which corresponds substantially to the length and the thickness to the depth or gage of the type. Said bar is located in a suitable groove or guideway in the bottom and at the front of the frame-plate $a^7$, and is held in any position in which it may be moved longitudinally by the frictional action of a spring $p^{13}$, Fig. 39, attached to the bottom of the plate $a^7$. The movement of said line-follower is directly across the path and in the same plane with the line of type when forced out by the line-forcer O, and is provided upon its front edge with ratchet-teeth $p^{14}$, Figs. 37 and 39ª, which are adapted to be engaged by a pawl $p^3$, pivotally attached, as shown, to the free end of a lever P, which is centrally pivoted, as shown in Fig. 41, to the top of the frame-plate $a^7$, and is provided with a pin $p$, Figs. 39 and 40, and indicated in dotted lines in Fig. 41, which is adapted to engage with a groove in a cam $d^{11}$ upon the shaft $b^8$. The pawl $p^3$ is held into engagement with the ratchet-teeth by means of a spring $p^9$. The peculiar construction of the pawl $p^3$ is for a special purpose, to be referred to hereinafter.

The line-follower bar $p^{11}$ is provided with a notch upon its inner edge, as indicated in dotted lines in Fig. 37, into which notch is loosely inserted a pin $u^6$, rigidly attached to the end of a lever $u^2$, which is pivotally attached, as clearly shown, to the plate $a^7$. An elbow-lever $u$ $u'$ is also pivoted to said plate $a^7$, having upon one arm a cylindrical end $u^7$, which is in loose engagement with a notch $u^8$ in the short arm of the lever $u^2$. Upon the end of the arm $u$ of said elbow-lever is a pin $u^9$, which is in operative proximity to the shoulder $o^7$, Figs. 37 and 38, upon the line-forcer O, so that the backward movement of the latter causes said shoulder to engage with the pin $u^9$.

A bar $u^5$ is adjusted to slide in a groove in the plate $a^7$, as shown in Fig. 37, at right angles to the line-follower $p^{11}$, which bar is provided with an enlarged head, (indicated in dotted lines,) which is normally in the position shown in the drawings, but is capable of being thrust forward so as to disengage the pawl $p^3$ from the ratchet-teeth, said pawl being of the thickness of the line-follower and bar $u^5$ combined, so that it may be engaged by either in turn. A lever $u^3$, pivoted to the frame $a^7$, has one end connected with the bar $u^5$ by means of a pin $u^{10}$, while the other is adapted to engage with a notch $o^8$, Figs. 37 and 38, in the line-forcer O. A spring $u^4$ is arranged to bear against said lever and force it back a limited distance at the proper time.

The operation of said mechanism is as follows: The lever P, being actuated by the cam $d^{11}$, is caused to vibrate with each revolution of the shaft $b^8$, and thus, through the pawl $p^3$ and ratchet $p^{14}$, to impart a step-by-step movement to the line-follower $p^{11}$, thereby moving the type forward, one at a time, to the cut-off, hereinafter described, until the entire line is disposed of. In the meantime the line-forcer O is locked by the latch T, as above stated, and the levers $u^2$ and $u$ $u'$ are moved, through the agency of the line-follower with which the pin $u^6$ is in engagement, to the positions, respectively, as shown in Fig. 37. At this time the short arm of the lever $t$ is brought into engagement with the end of lever $u^2$ and is actuated thereby against the action of the spring $t'$, thus withdrawing the latch T and unlocking the line-forcer O. Thereupon the spring $o'$ throws the forcer back slightly to the position shown in Fig. 36ᵇ, when it is engaged by the carrier-plate $o^2$ and thrust back to the position shown in Fig. 36ª. This movement causes the shoulder $o^7$, Fig. 37, of the line-forcer to engage the pin $u^9$, and thus, through the action of the elbow-lever $u$ $u'$ and the lever $u^2$, the line-follower is driven back to its initial position; but it is obvious that to enable this to occur the pawl $p^3$ should first be thrown out of engagement with the ratchet. This is accomplished by the backward movement of the forcer O upon the lever $u^3$, assisted by the slight movement of the spring $u^4$, which lever is thrown back before the shoulder $o^7$ reaches the pin $u^9$, and thus, forcing the bar $u^5$ forward, the end of the latter is pushed out flush with the ends of the teeth $p^{14}$, thereby holding the pawl $p^3$ out of engagement therewith. Upon the forward movement of the line-forcer another line of type is thrown into the raceway and the line-forcer is again locked until the mechanism described is given time to act and dispose of that line, letter by letter, as specified. Thus the action is repeated until all of the lines in the dead-matter column are exhausted. While the line-forcer is in its extreme rearward position the lever $u^3$ is retained in proper position to hold the bar $u^5$ against the pawl $p^3$ by the action of the spring $u^4$; but when the line-forcer moves forward to its extreme position the lever $u^3$ is returned to its normal position, thus permitting the pawl $p^3$ to again engage the ratchet-teeth upon the line-follower bar. As the line-forcer is cut away a considerable distance back from the shoulder $o^7$, said forcer in its forward movement does not come in contact with the pin $u^9$ of the line-follower-bar returning mechanism, but leaves the latter to be gradually returned to its normal position by the action of the follower-bar itself.

In conveying the type by the line-follower to the cut-off mechanism it is essential that the movement of the line-follower should be not only intermittent, but yielding as well, so as to conform to the varying widths of type. In order to meet this difficulty, I have provided that the throw of the lever P, which actuates the pawl $p^3$, should slightly exceed in length the width of the widest type, so that when one of these is removed at any time from the line by the action of the cut-off separator the line-follower in its next movement will be advanced by the pawl the full distance occupied by the removed type, thereby causing the new type to be forced squarely against the abutment of the cut-off hereinafter described, which abutment limits the movement of the line and hence renders it essential that mechanism should be employed to vary said movement to meet the requirements of narrower type this result being accomplished by the peculiar construction of the pawl $p^3$, which is made in two parts, as shown in Figs. 37, 40, 40$^a$, and 40$^b$—viz., a hub portion $p^4$ and an independent nose portion $p^5$—the latter being provided with a side plate or plates $p^6$, having a slot $p^7$, by means of which slotted plate and the pin $p^8$ the two parts are united. A spring $p^9$, connected at one end with the hub portion and at the other with the nose portion, tends to elongate the pawl, while a secondary spring $p^{10}$ serves to hold it normally into engagement with the ratchet.

When a narrower type is removed by the cut-off, the type-line is advanced by the action of the pawl until its movement is arrested by the contact of the end type with the abutment, as before; but as the length of this movement does not equal the throw of the lever the remaining distance is taken up by the spring $p^9$ of the pawl, the hub portion $p^4$ having the full movement, while the nose portion $p^5$ is rigidly held by its contact with the arrested follower-bar. By means of this device I am enabled to bring each new end type squarely against the stationary abutment of the cut-off mechanism, in which position it is ready for removal in its turn.

*Mechanism for cutting off or separating the individual type from the line.*—Inasmuch as the type differ from each other in dimensions and in special markings or nicks, it is essential, in order that they may be properly selected for distribution or rejection, that they should be separated from the line to enable them to be afterward dealt with individually.

In Figs. 41, 45, 57, and 128 is represented a block $q^3$, having a vertical portion $q^4$, Fig. 45, provided with a central slot $q^5$, side projections $q^6$, a horizontal portion $q^7$, parallel plates $q^8$ $q^9$, and the side plate $q^{10}$ at right angles thereto, as shown, the whole constituting a case within which the type are to be separated.

It is necessary that all the type whether thin or thick should be held firmly in a fixed relative position in order to be properly actuated by the parts intended to move them and to be acted upon by the separating mechanism. For this reason I prefer to adopt as a standard the thinnest type to be received and acted upon by the separating mechanism, and to provide means whereby said separating mechanism may adjust itself to type of greater thickness, as hereinafter stated.

Within the vertical portion $q^4$ of the block $q^3$, arranged to move accurately in suitable guides, as shown, is a sliding plate $q^{19}$, Figs. 42, 50, and 53, adapted to move vertically and to be reciprocated in the manner hereinafter stated. Upon the lower end of said bar is a block $q^{18}$, which block is provided with openings $q^{22}$ $q^{23}$, the latter of which is adjusted to register with the line-follower $p^{11}$, so that the type as they are moved laterally by the line-follower may be caused to enter said opening $q^{23}$, when the plate $q^{19}$ is pushed down, as hereinafter shown. The plate $q^{19}$ is provided with pins $q^{20}$ and $q^{21}$, the latter of which is caused to project loosely through a slot $q^5$ in the plate $q^3$, while the former projects in an opposite direction through a slot $q^{17}$ in a faceplate $q^{16}$. A spring $q^{27}$, one end of which is rigidly attached to the block and the other end of which bears against the pin $q^{20}$, serves normally to lift the block or plate $q^{19}$ for the purpose of lifting the separated type to a higher plane, as hereinafter stated. A lever Q, pivoted upon a bracket $q'$, rigidly attached to the frame-plate, Figs. 41, 57, and 129, is provided with a pin $q^2$ upon one arm, which is in operative proximity to a surface-cam $d^9$ upon the shaft $b^8$, the opposite end of said arm being in engagement with the pin $q^{21}$ of the plate $q^{19}$. A stationary abutment $q^{28}$ (shown in Figs. 48, 51, 56, 58, and 58$^a$) is rigidly attached to the frame and serves as a stop to limit the movement of the type when pushed forward by the line-follower, as clearly shown in Fig. 56, said abutment being adapted to partially project into the opening $q^{22}$ in the block $q^{18}$. When a type is pushed against the abutment, it rests wholly or partially within the opening or slot $q^{23}$ of the plate $q^{19}$, as shown in Figs. 50 and 51. The extent of the inclosure of the type in the block $q^{18}$ depends upon the thickness of the type. Should it chance to be the thinnest type in the font it is wholly inclosed, thus permitting the plate $q^{19}$ to be raised by the action of the spring $q^{27}$, which action is modified by the movement of the lever Q and cam $d^9$, the latter being so constructed as to first permit a slight upward movement of the plate $q^{19}$, which enables the type to be properly separated, after which the full upward movement is permitted at a moderate rate of speed, thus lifting the type with it to the full limit of the movement of the block $q^{18}$, as shown in Figs. 54 and 55, when it is raised even with the top of the abutment-block $q^{28}$, which forms the bottom of a short raceway, as clearly shown in Figs. 58 and 58$^a$, in the same plane with and in operative proximity to a plunger $r^3$, Figs. 56, 58, and 70, which I designate as the "cut-off" or "separating" type-driver, and which is adapted to move the type previously separated from the line laterally in the manner and for the purpose hereinafter stated. An upper raceway-plate $q^{40}$ is arranged above and parallel with the block $q^{28}$.

As a type other than the thinnest cannot be lifted when the block $q^3$ is in its normal position the horizontal portion of said block is arranged in suitable guides upon the frame, so that it may be moved laterally away from the abutment and thus provide space for a wider type to be raised. The following-described means are provided for the accomplishment of this movement: Attached to the part $q^{19}$ and projecting through the slot $q^5$ is an arm $q^{38}$, Figs. 46, 52, and 53, on which is formed a plate $q^{39}$, having a depending lip $q^{41}$ in operative proximity to a hook $q^{36}$ upon the end of a bar $q^{35}$, Figs. 49, 51, 52, 53, and 54, arranged to slide loosely within a suitable guide formed within a block $q^{34}$, rigidly attached to the plate $a^7$, as shown in Fig. 41. A notch $q^{87}$, Fig. 49, is formed in the plate or bar $q^{35}$. A lever $q^{30}$, Fig. 41, is pivoted to the frame $a^7$, one end of said lever being provided with a pin $q^{32}$, which is passed loosely into a bore formed in the plate $q^{35}$, while upon the other end is a similar pin $q^{31}$, which engages with a groove in a cam $d^{10}$ upon the shaft $b^8$. A slot $q^{33}$ in the block $q^{34}$, Fig. 41, permits a slight movement of the pin $q^{32}$. With each revolution of the shaft $b^8$ the lever $q^{30}$ is actuated and with it the hooked plate $q^{35}$. It follows, therefore, that when the block $q^{18}$ is sufficiently depressed to enable the lip $q^{41}$ to engage with the hook $q^{36}$ the block $q^3$ will be moved horizontally a distance equal to the movement of the plate $q^{35}$ unless sooner released, the lower part $q^{13}$ of the raceway being secured to the block $q^3$, so as to be moved horizontally therewith. When any type other than the thinnest is pushed into the opening $q^{28}$ of the block $q^{18}$, the block cannot be lifted by the pressure of the spring $q^{37}$, because of the impingement of the wider type upon the upper edge of the raceway, as shown in Fig. 53. As soon, however, as the part $q^3$ is moved laterally by the action of the bar $q^{35}$ a sufficient distance to enable the type to be wholly inclosed within the block $q^{18}$, as indicated in Fig. 54, the block $q^{18}$ is lifted by the action of the spring $q^{27}$ and the type carried with it to an upper plane. By this means it will be seen that type of varying widths may be separated from the line with the utmost accuracy, while each is at the same time properly supported and maintained in the desired position. The block $q^3$ is returned to its normal position through the action of the cam $d^{10}$ upon the lever $q^{30}$ and bar $q^{35}$.

*Mechanism for ejecting the individual type from the cut-off.*—The cut-off type-driver $r^3$, heretofore referred to, is loosely adjusted in a recess $r^5$ in the frame-plate $a^7$, Fig. 39, by which it is guided longitudinally. A slot $r^4$, Fig. 58, in the plate $r^3$ enables it to be projected into the cut-off box without interference with the vertical plate $q^{12}$, Figs. 45 and 58. A continuous reciprocating movement is imparted to the cut-off type-driver $r^3$ by means of a lever R, Fig. 41, which is pivoted to the frame-plate at $r$, one end of said lever being loosely attached to the plate $r^3$ by means of a pin $r^2$, while a similar pin upon the other end is arranged to engage with a groove in a cam $d^{12}$ upon the shaft $b^8$. The movement of said lever is so timed as to cause the driver $r^3$ to enter the cut-off box and eject a type at a time when the block $q^{18}$ is in an elevated position and to return before said box descends. Thus as each type is elevated it is forced out laterally by the cut-off type-driver, as shown in Figs. 58 and 60, into a contiguous raceway.

*Mechanism for clamping and releasing the line-follower.*—In moving the cut-off box laterally against the line of type in order, as described, to permit any but the thinnest type to enter the box, it is desirable that the line-follower should be clamped temporarily in order to prevent a backward movement of the type-line with that of the cut-off box. This is accomplished by means of a circular block S, Figs. 37 and 59, which is adjusted in proper bearings in the frame-plate $a^7$ and is capable of a partial revolution. Said block is provided with a flat or cut-away portion $s^6$, which is normally parallel with the line-follower. A pin $s'$ is rigidly attached to the part S and arranged to project upwardly through the frame-plate, to which pin is attached an arm $e^2$, which is in operative proximity to an elastic finger $s^3$, Figs. 41, 49, and 59, which is rigidly attached to the rear end of the hook-plate $q^{35}$, adapted to actuate the cut-off box, as hereinbefore set forth. The free end of said finger is provided with a head $s^4$, having an inclined face, as shown, which normally lies in contact with the bearing-face of the arm $s^2$, as shown in Figs. 41 and 59. As the hook-plate is rearwardly reciprocated by the action of the lever $q^{30}$ the head $s^4$, bearing against the arm-piece $s^2$, is caused to partially rotate the stud or block S in its bearings and to cause the corner 1, Fig. 59, to impinge upon the line-follower $p^{11}$ and so cramp the latter as to prevent it from being moved. As the movement of the finger $s^3$ exceeds in length that of the arm $s^2$, the movement of the latter being necessarily limited by the contact of the stud with the line-follower bar, the head $s^4$, after imparting a full movement to the arm $s^2$, slips by the same by reason of its elasticity, and upon its return restores the stud to its normal position and in turn releases the line-follower from its clamping action in time to enable the latter to be moved forward when the cut-off block is in its depressed position ready to receive another type.

*Mechanism for adjusting the type longitudinally in the distributing-raceway.*—It is essential that the type should be in proper alignment in the raceway, and for this purpose I provide the following mechanism: A forcer V, Figs. 37 and 61, is arranged in such a position that by its forward movement it may serve to thrust each type forward from the position in which it is left by the cut-off line-forcer $r^3$, last above described, so that they may be further actuated by suitable mechanism for advancing them upon the raceway. The forcer V is arranged to slide longitudinally in proper bearings in the frame-plate $a^7$. A stud $v$, Fig. 61, is formed upon the upper side of said forcer and is so adjusted that when the latter is in its normal position it is in range of the movement of a revoluble carrier $v'$, Figs. 41 and 61, located upon the cam-shaft $b^8$, as shown. The forcer is held in a normal position by means of a spring $v^3$, (better shown in Fig. 37,) which is attached to the rear of the frame-plate $a^7$. A friction-block $v^5$ is arranged immediately over the raceway at the point where the type is ejected from the cut-off box, and is held by means of a spring $v^6$ and caused to bear with a slight friction upon each type as it is forced thereunder.

As the type is ejected from the cut-off box by the type-driver $r^3$ onto the contiguous raceway, as shown in Figs. 60 and 61, the adjusting-forcer V is advanced at the proper time by its carrier and caused by the contact of its front end with the foot of the ejected type to impart to the latter a slight longitudinal movement against the resistance of the friction-block $v^5$. By the action of the latter the forward movement of the type is instantly arrested, when the positive movement of the forcer ceases, and as a result each type is adjusted longitudinally to precisely the same point before it is caused to begin its lateral movement along the main distributing-raceway. The bearing-surface $v^2$, Fig. 61, is sufficiently extended so that the forcer V is held for a short time in its forward position against the action of the spring $v^3$ for the purpose of supporting the foot of the type until it is engaged by the special conveyer next described. The dotted lines shown at 2, Fig. 112, indicate the position in which the type is left after the action of the adjusting-forcer V, in which position it is retained and guided by means of a rib hereinafter described.

*Mechanism for conveying the type from the cut-off box to the main conveyer.*—A stationary plate $w^{16}$, Fig. 64, is rigidly attached to the framework with a series of other plates $z^8$, Figs. 62 and 64, arranged parallel therewith, said plates together constituting a stationary support for the type in the main raceway. Spaces are provided between the plates for the reception of movable conveyers, as hereinafter stated. The part $w^{16}$, Figs. 64 and 70, is projected into close proximity to the cut-off box, and thus serves with the abutment-block $q^{28}$ as a raceway upon which to support the type as the latter is projected thereon by the driver $r^3$. A block W, Figs. 62ª and 65, is provided with a groove in the top for the reception of the supporting-plate $w^{16}$, said block W being rigidly attached to the left-hand end of the main conveyer or driver plate $z^9$, Figs. 62 and 64, which is intended to convey the type lengthwise of the machine for distribution. The construction and operation of said conveyer-plate will be hereinafter more fully described. The part W is capable of a longitudinal and vertical movement upon the plate $w^{16}$. A frame-piece $w^3$, Figs. 62, 63, and 65, is arranged to slide longitudinally upon said block W, and is provided with interior projections $w^5$, Fig. 65, adapted to fit loosely in recesses $w^3$, formed in said part W, and also with vertical teeth $w^6$ $w^7$, Figs. 62, 63, and 65, as shown, the former of which is adjusted to enter and rest normally in the recess $q^{24}$, Fig. 60, of the cut-off box, as shown in Fig. 70, so that it is in position to be brought into engagement with each type as it is projected into the distributing-raceway. The distance between the teeth $w^6$ $w^7$ slightly exceeds in extent the width of the widest quad or type used in the font, and the object of employing the frame $w^3$, which constitutes a special type-driver, is to obtain a larger movement at the beginning of the raceway than is imparted to the main driver in order that characters of extra width may be provided for, so that those for which no provision is made in the type-case may be ejected at the beginning of the raceway. A plate $w^{10}$, Figs. 62 and 65, is rigidly attached at one end to the frame-piece $w^3$, and is provided with a pin $w^{11}$, which enters the slot $w^{12}$, Fig. 62, of the front plate of the main conveyer $z^9$, as shown. While the frame-piece $w^3$ is thus secured to the block W it is free to move in a longitudinal direction thereon. A lever $w^{13}$, Figs. 62, 63, and 70, is pivotally attached at one end to an auxiliary frame-plate $a^{14}$, Fig. 62, the free end of said lever being provided with a pin $w^{14}$, which rests loosely in a slot $w^9$, formed in a depending portion of the frame-piece $w^3$. A pin $w^{15}$ upon said lever is projected loosely into a slot $z^{11}$, formed in the main driver-plate $z^9$, so that by the action of the latter a longer reciprocatory movement is imparted to the frame $w^3$ than is given to said main driver, the movements of both being in unison. The main driving-plate $z^9$ is given a five-motion movement, as indicated in the diagram, Fig. 86ᵇ—that is, it is moved first upward, then forward, then backward, then downward, and, lastly, backward to the first position. As the part $w^3$ is attached directly to the main driver it must move up or down with it, being independent thereof only in its longitudinal movement, which is increased in proportion to the effective length of the lever $w^{13}$, the greater movement of the auxiliary driving-plate being indicated in the diagram shown in Fig. 86ª. A type having been ejected from the cut off box into the contiguous raceway and having been adjusted longitudinally, as described, and the frame-piece $w^3$ being at this time in its normal position with the teeth $w^6$ in the recess $q^{24}$, as shown in Fig. 70, it is first moved upwardly, as shown in illustration 2 of Fig. 63, until the teeth project above the ledge $w^{16}$, upon which the type rests, and is in position, as shown, to engage the type 1 when it is given a forward movement, as indicated in dotted lines in illustration 2, Fig. 63, thereby moving the type laterally to the full extent of its movement. In order to clear the type, the frame-piece is then moved slightly in a backward direction, then downwardly to its full limit, and finally backward to its first position, as shown in illustration 3, Fig. 63. The type, after having been moved in the position described, remains for an instant until tried by a special mechanism, hereinafter set forth, for the purpose of ascertaining whether it belongs to the font or not. If it does it will by the next impulse be moved by the action of the tooth $w^7$, as indicated by illustration 4, Fig. 63, in range of the first tooth of the main conveyer, but if it does not belong to the font it is ejected onto a special raceway, as hereinafter specified. In this way provision is made, as above suggested, for removing from the main raceway all characters of special size not provided for in the type-case.

*Mechanism for trying the type and ejecting therefrom characters not provided for in the type-case.*—As before suggested, the various type are selected by means of nicks formed upon the edge thereof, the location of the nicks varying with the different type. It is important, therefore, that the selecting mechanism for testing such type as are not provided for in the type-case should be located next to the cut-off box, so that said special type may be disposed of at the outset. Pivoted to a standard $x$, attached rigidly to the frame $a^7$, Figs. 41, 68, 69, and 71, is a lever X, the rear of which is bent downwardly, as shown, so as to project over the frame-plate $a^7$. In one side of said downwardly-projecting portion is formed a notch or recess having edges $x'$ $x^2$ and inclined faces $x^3$ $x^4$, as clearly shown at the left in Fig. 68, which notch or recess is in line with and is adapted to receive the rear end of a plunger or type-forcer $x^{15}$, intended to eject the special type referred to. A ward or tumbler plate $x^5$, Figs. 41 and 68, is arranged to slide loosely in a groove formed in the side of the block $v$, said ward being provided with a recess (shown in Fig. 68) having an upper face $x^6$ and a lower face $x^7$, into which recess the short arm of the lever X, which is bent downwardly, is projected, so as to bear upon the face $x^7$ of the recess. A spring $x^{10}$, attached to the plate $a^7$, is arranged to press upwardly against the rear end of the lever X. The ward-plate is provided with a pin $x^8$, which is projected downwardly through a bore in the frame-plate and is provided with a projection $x^9$, corresponding in form and relative position with a certain nick which is formed in those characters designed to be ejected from the distributing-race at this point, as stated. The ward-plate is actuated in the following manner: A rock-shaft $x^{11}$, Figs. 41, 68, 71, and 88, is supported in proper bearings in the main plates $a'$ $a^2$, to one end of which shaft is rigidly attached an arm $x^{12}$, the free end of which extends into the central recess of the ward or tumbler plate and bears against the upper face $x^6$ thereof, as shown. An arm $x^{13}$, Fig. 71, is rigidly attached to said rock-shaft, the free end of which is slightly bent upwardly, as shown, and is in operative proximity to a cam $d^6$ upon the shaft $b^8$, against which it is held by the pressure of a spring $x^{14}$, attached to the framework. By means of said arm and spring the rock-shaft $x^{11}$ is oscillated with each impulse of the machine, the cam serving to actuate the arm $x^{13}$ against the action of the lever X and spring $x^{10}$. As the free end of the arm $x^{13}$ is raised into the recesses of the cam, the lever X forces the ward $x^5$ downwardly, thereby bringing the part $x^9$ of the pin $x^8$ into contact with the type, as shown in Fig. 68, the action of the cam by which the ward is lifted being positive, while that by which the ward is depressed is yielding. The rear end of the forcer $x^{15}$ is provided with shoulders $x^{16} x^{17}$, (better shown in Figs. 68 and 68ª,) which are adapted to engage with the parts $x'$ $x^2$ in the recess upon the end of the lever X, according to the position of said lever. It will be observed that the recesses in the cam $d^6$ are of sufficient depth to permit the lever X to rise sufficiently high so that the shoulder $x^{16}$ may engage with the point $x'$, the result of which is that when no type is in position the ward descends to its full limit, thus leaving the rear end of the lever elevated and the shoulder $x^{16}$ in engagement with the point $x'$, as shown in illustration 1, Fig. 68ª, which prevents the plunger from being thrown forward. If, however, a type is in place having a nick therein which is adapted to register with the extension $x^9$ of the ward-pin, the latter descends to a sufficient depth to bring the shoulders $x^{16}$ $x^{17}$ of the plunger midway between the points $x'$ $x^2$, thus leaving the plunger free to be forced forward in the manner hereinafter stated. On the other hand, if a type is in position having a nick which does not register with the ward-pin, the rear end of the lever X is held down by the intervention of said type beneath the ward-pin, and the shoulder $x^{17}$ is engaged by the point $x^2$, which in like manner arrests the movement of the forcer. Thus it will be seen that the forcer cannot act to eject a type unless it be one the special nick of which registers with the ward-pin.

The following means is provided for ejecting the type: A rock-shaft $x^{22}$, Fig. 71, is mounted in suitable bearings in the frame-plates $a'$ $a^2$, which shaft has rigidly attached thereto an arm $x^{23}$, the free end of which is held against a cam $d^7$ on the shaft $b^6$ by means of a spring $x^{36}$, attached to the frame. A secondary arm $x^{24}$ is also attached to said shaft, against which is arranged a spring $x^{25}$, the free end of which is normally in contact with the plunger $x^{15}$. The revolution of the cam oscillates the rock-shaft, thus tending to impart an initial movement to the plunger.

A carrier-plate $x^{20}$, Fig. 68, is attached to a sleeve which is located upon the rear carrier-shaft $b^5$, while a similar carrier-plate $x^{21}$, Figs. 2 and 68, is located upon a sleeve upon the shaft $b^6$. Projections $x^{18}$ $x^{19}$ are formed upon the type-plunger in operative proximity to the carrier-plates $x^{20}$ and $x^{21}$, respectively. If a special type is in position having a nick that registers with the ward-pin, the plunger $x^{15}$ is thereby brought into such a position that it is free to be moved forward without causing the shoulders upon its rear end to be brought into contact with either of the points $x'$ $x^2$. Hence upon the movement of the rock-shaft $x^{22}$ the forcer $x^{15}$ is given an initial movement forward sufficient to enable the projection $x^{19}$ to be brought into engagement with the carrier-plate $x^{21}$, by which it is driven forward, thereby forcing out the type into an auxiliary raceway designed to receive it. It will be observed that the type-forcer $x^{15}$ is driven forward by means of two distinct movements—first, the initial movement imparted thereto by the spring $x^{25}$, and, second, that imparted by the carrier-plate $x^{21}$. Hence the single backward movement must equal both of the forward ones in order to return the forcer to its initial position. This is accomplished by making the projection $x^{18}$ longer than the projection $x^{19}$, so that the carrier $x^{20}$ will remain in engagement therewith for a longer time, or the same result may be accomplished by lengthening the returning carrier-plate. It is obvious that the movement of the cam $d^6$ should be so timed as to cause the ward-plate to be lifted before the plunger is thrust forward, thereby avoiding conflict between the parts. The auxiliary type-race, before referred to, for receiving the type thus ejected is formed upon a bar or extended portion $x^{26}$, Figs. 14, 41, and 72, of the plate $e^{16}$, Fig. 9, located beneath the type-case, the upper surface of which forms the lower surface of the auxiliary raceway. A reciprocating type-driver $x^{32}$ is mounted loosely upon said raceway and connected by means of a link $x^{33}$ to a lever $w^{13}$, one end of which is pivotally attached to the frame, while it is connected intermediately with the front plate of the main conveyer $z^9$ by means of a pin $w^{15}$, which projects into a vertical slot $z^{11}$, (more clearly shown in Figs. 62 and 82,) the lever being actuated by said main driver-plate, which in turn is reciprocated in the manner hereinafter set forth.

The upper surface of the auxiliary raceway is formed by means of a plate $x^{27}$, Fig. 72, which has a portion $x^{28}$ formed at right angles thereto, which portion is rigidly attached to the bar or raceway $x^{26}$. A friction-plate $x^{29}$, which is loosely adjusted in an opening in the plate $x^{27}$, so as to project slightly through the same, but limited in its downward movement by means of a suitable flange, is arranged to be held in position and depressed by means of a spring $x^{30}$, said friction-plate being intended to press slightly upon and prevent the type from moving too far when thrust out. A friction-block $x^{31}$ is located in the race for the purpose of properly supporting the end type. This auxiliary raceway, which may be designated as the "regular pi" line, is designed to receive quads and other characters not provided for in the type-case, as I prefer to limit the size of the regular type-channels and to so construct the main type-conveyer that it will receive and convey all type up to and including a certain standard, while those of larger dimensions may be rejected. The same mechanism is adapted to select and reject into this regular pi raceway any characters which it may be desired to reject.

*Mechanism for conveying and guiding the type across the machine and presenting the same individually to the selecting mechanism.*—For the purpose of supporting the type in its movement toward the distributing-channels I provide a supporting-frame, which consists of a series, preferably four or more in number, of parallel plates $z^8$, Figs. 62, 64, and 67, which are separated from each other by means of suitable space-plates between the lower parts thereof and all rigidly attached to the frame-plate $a^3$, Fig. 87, in such a manner that the upper surfaces of the same form a permanent raceway for supporting the type, as stated, said raceway being in the same or substantially the same plane with and forming a continuation of the contiguous raceway above described. A series of intermediate plates $z^9$, preferably corresponding in number to the plates $z^8$, are attached together at their ends by means of intermediate spacing material and are loosely inserted in the spaces between the plates $z^8$, said plates $z^9$ being provided with teeth upon their upper edges, as clearly shown in Figs. 62 and 64. The relation of said parts to the cut-off box is shown in Fig. 70. Rigidly attached to the serrated plates $z^9$, at the respective ends thereof, are projecting plates $z^{17}$ $z^{18}$, the former of which extends downwardly therefrom, while the latter extends outwardly from the end and downwardly, as shown in Figs. 62 and 82. A rectangular slot $z^{10}$ is formed in the plate and an oblong slot $z^{18}$ in the lowermost portion thereof. A similar slot $z^{12}$ is formed in the lower end of the part $z^{17}$. A block (indicated in dotted lines in Fig. 82) is loosely attached to a pin $z$, attached to a lever Z, and arranged to rest loosely in the slot $z^{10}$. One end of the lever Z is pivotally attached, as shown, to the plate $a^2$, while a pin upon the opposite end is adapted to engage with a groove $d$ in a cam D, mounted upon the right-hand end of the shaft $b^4$. The movement of the lever Z causes the conveyer to be reciprocated longitudinally; but it is preferable in order to actuate the type as desired that a five-motion movement should be imparted to the conveyer. The remaining motions are obtained as follows: Bell-crank levers $z^3 z^5$ are pivotally attached to the frame-plate $a^3$, both of which are clearly shown in Fig. 82 and the former of which is also shown in Figs. 83 and 85. The depending arms of said levers $z^3 z^5$ are loosely connected by means of a link $z^7$, while the opposite arms are provided with pins, as shown, which are loosely inserted in the slots $z^{12} z^{13}$ of the plates $z^{17} z^{18}$. The bell-crank lever $z^3$ is pivotally mounted upon a rock-shaft $z^2$, having its bearing in the frame $a^3$, to which shaft is rigidly secured a lever-arm $z'$, located at the back of the plate $a^3$, which lever is provided with a pin which engages with a groove $d^3$ in a cam $d^2$, mounted upon the shaft $b^6$. The movement of said rock-shaft, received from the cam, imparts a vertical movement to the conveyer through the elbow-levers $z^3 z^5$, the movement of the levers Z $z'$ being timed with reference to each other so that one shall be idle while the other is in action. In other words, the movement given by the cams D and $d^2$, respectively, alternate with each other, so that when the conveyer is moving in a horizontal direction it does not move vertically, and when moving in a vertical direction it does not move horizontally.

The following five-motion action is imparted to the conveyer from the movements of the two cams: first, forward the entire distance, then backward slightly, then downward, then backward the remaining distance, and then upward to the point of beginning, this movement being indicated in the diagram shown in Fig. 86$^b$.

The slight backward movement of the conveyer is intended for the purpose of removing the teeth of the conveyer from contact with the type before it descends, this movement being imparted by the proper recess in the groove $d$ of the cam D.

The ordinary type of the font delivered to the main conveyer by the special conveyer above referred to are moved along the raceway by the teeth of the main conveyer in a series of regular movements, as follows: A type having been advanced onto the race by the special conveyer, as before described, the first tooth of the main conveyer rises on the left-hand side thereof, as shown in illustration 1, Fig. 86, at a little distance therefrom, and moving forward advances the type along the race the entire length of the movement, as indicated in dotted lines, illustration 1, and in full lines, illustration 2. The tooth then moves backward slightly, as shown in illustration 3, thence downwardly, as indicated in dotted lines, illustration 3, and full lines, illustration 4, thence backward the remaining distance, as indicated in dotted lines, illustration 4, and in full lines, illustration 5, then upward again, as indicated in dotted lines, illustration 5, and full lines, illustration 6. By means of the forward movement of the first tooth the type has been advanced within the range of movement of the second tooth, by which it is taken and conveyed within range of movement of the third tooth and so on along the raceway. The conveyer does not lift the type from the race, but simply advances it thereon by contact with one side of the same.

In order to prevent a lateral displacement of the type and to maintain them temporarily in the positions, respectively, in which they are left after a given forward movement of the conveyer, so that they may be actuated thereby during the next movement, it is essential that some means should be provided for exerting a yielding pressure upon the type. One means of accomplishing this result is shown in Figs. 66 and 67, in which a metal plate $z^{14}$, located in the central recess of the raceway, serves as a stationary support for a series of inclined springs $z^{15}$, one end of each of which is rigidly attached to the upper edge thereof in any suitable way. Blocks $z^{16}$ are rigidly attached to the free ends of said springs in such a way that the upper faces thereof are parallel with the raceway. The plate $z^{14}$ is so adjusted in the raceway that the upper faces of the blocks are caused to project slightly above the plane of the raceway, as shown in Fig. 67. These blocks serve as friction-blocks to hold the type positively in the precise position in which they are moved by the teeth of the conveyer, so that no matter how rapid may be the movement of the machine they cannot be advanced beyond the proper point by the inertia of the movement. At each rest in the intermittent movement of the conveyer and while the type are so held they are tried individually by means of selecting mechanism hereinafter described.

It is obvious that the type in their progress along the raceway should be prevented from longitudinal as well as lateral displacement. The devices for accomplishing this purpose are described as follows: Rigidly attached to the framework and flush with the upper surface of the raceway is a plate $y^{11}$, Figs. 76, 79, and 81, which extends from the beginning of the raceway upon the left to the beginning or left-hand side of the type-case, the lower edge $y^{12}$ of which is rounded, said rounded portion projecting below the upper surface of the raceway. Said edge forms a guiding-rib, which projects into a nick formed in the upper edge of the type and enables the latter to be accurately guided in the raceway without longitudinal displacement. The usual manufacturers' nick may be employed for this purpose. A similar guiding-rib is required in front of the type-case; but as it is necessary that the type should be projected longitudinally from the main distributing-raceway in order to be inserted into the type-case it is obvious that a stationary guiding-rib could not be there employed. Hence it is necessary to provide a supplemental or movable guiding-rib in that portion of the raceway opposite the type-case, and also to provide means for lifting said rib at the proper time to allow a type to be driven out, and then to replace said guiding-rib. This I accomplish as follows: A flat plate $y^4$, Figs. 41, 76, 78, 79, and 80, is loosely adjusted in a dovetailed groove in the part $g^{13}$ of the framework. Rigidly attached to the plate $y^4$ are two plates $y^6$, having obliquely-formed ends $y^7$, Fig. 76. A plate $y^8$, having inclied portions $y^9$, better shown in Figs. 76 and 77, is loosely inserted between the plates $y^6$, so that its lower portion $y^{10}$ may lie in the same plane with and form a continuation of the guiding-rib $y^{12}$. The distance between the parallel faces $y^7$ of the plates $y^6$ is greater than that between the parallel faces $y^9$ upon the plate $y^8$. A horizontal extension $y^{13}$ is adapted to fit into a recess or cut-away portion of one of the plates $y^6$, so as to limit the downward movement of the plate $y^8$. A slot is formed in the end of the plate $y^4$, into which is loosely inserted the end $y^3$ of a lever Y, Figs. 41, 74, and 75, which is pivoted at $y$ to a bracket rigidly attached to the frame-plate $a^7$. Upon the opposite end of said lever is formed a pin $y^2$, which is adjusted to engage with a groove in a cam $d^8$ upon the shaft $b^8$. As the lever is vibrated through the action of the cam, the plate $y^4$ is reciprocated. The movement of said plate in one direction causes the plate $y^8$, which is held against longitudinal movement, to slide upwardly upon one of the inclined faces $y^7$, thus lifting the guiding-rib $y^{10}$ high enough to clear the type beneath it, while the reverse movement causes it to descend, so that the rib $y^{10}$ may again enter the nick in the type and prevent longitudinal displacement. The movement of the lever Y through the continuously-revolving cam $d^8$ is so timed relatively to the movement of the forcers for ejecting the type longitudinally and the mechanism for advancing the type along the distributing-raceway that the plate $y^8$ is lifted before the forward movement of the forcers and depressed before the forward movement of the main conveyer. In consequence of this action the rib of the plate is elevated at the proper time to release the type, as well as to avoid interference with the forcers, and depressed at the proper time, as shown in Figs. 79 and 80, to guide the type as they are moved along the distributing-raceway by the main conveyer, as above set forth, said ribs causing the type to be guided along the raceway with absolute accuracy, and consequently to be presented with perfect precision to the selecting mechanism, as hereinafter described.

*Mechanism for selecting the type and ejecting the same at the proper place from the distributing-raceway to the lifting mechanism.*—
This mechanism is similar to that which has before been described for selecting and ejecting the special characters not provided for in the type-case.

Supported in suitable grooves in the vertical plates $a'$ $a^2$ is an inclined plate $l$, Fig. 87, which I term the "forcer-plate" of the distributer and which is on a plane below that of the plunger-plate $g^{12}$ of the type-setting mechanism hereinafter described. The bottom of the plate $l$ forms the upper face of the distributing-raceway. A series of levers $l'$ are pivotally attached to suitable lugs upon the plate $l$, the forward end of each of said levers being arranged to bear upon the lower face of a recess formed in a corresponding ward $l^5$, located in a line therewith and above the distributing-raceway. Each ward is provided with a stud $l^6$, extending through the plate $l$ to the type-raceway, said studs corresponding substantially in construction and function to the pin or stud $x^8$, hereinbefore described, and being intended to select the type in like manner, according to the relative position of the special nicks thereon. A plate-arm $l^{19}$, Figs. 87 and 88, is rigidly attached to the rock-shaft $x^{11}$, hereinbefore referred to, and is arranged to bear against the upper face of the recess formed in said ward. The manner of actuating said rock-shaft has been hereinbefore described and is clearly shown in Fig. 71. A series of springs $l^7$, attached to the plate $l$, serve to raise the rear and to depress the forward ends of said levers, so that when the end of the arm $x^{13}$, Fig. 71, enters the recesses of the cam $d^6$ the wards are depressed by the action of the springs $l^7$. The levers $l'$ are by preference bent downwardly at their rear ends and are provided with recesses therein having inclined faces with edges $l^3$ $l^4$, adapted to engage with shoulders $l^{10}$ $l^{11}$ upon type-forcers $l^9$, adjusted loosely in suitable guides upon the bottom of the plate $l$. The plungers $l^9$, when free to move forward, are initially actuated by a corresponding series of springs $l^{17}$, attached to a plate $l^{16}$, rigidly secured to the rock-shaft $x^{22}$, and arranged, respectively, in line with said forcers. Carrier-plates $l^{14}$ $l^{15}$, Figs. 2 and 87, mounted upon sleeves secured to the shafts $b^5$ $b^6$, respectively, are arranged to engage with projections $l^{12}$ $l^{13}$, and thus reciprocate the forcers. The projection $l^{12}$ upon each forcer is made longer than the projection $l^{13}$, so that the carrier $l^{14}$ may move the plungers back as far as they are moved forward by the two movements imparted thereto by the spring $l^{17}$ and the carrier $l^{15}$, respectively. The construction and action of the various parts referred to being substantially the same as that of the mechanism for selecting and ejecting the special type hereinbefore described and differing only in the fact that a series of wards and their actuating devices are placed side by side, an extended explanation of their operation is unnecessary. As the respective type are forced out they are accurately guided in their movement by means of vertical studs $l^{18}$ upon the upper edge of the auxiliary frame-plate $a^{14}$, as shown in Figs. 87 and 87ª, and arrested at the proper time in their longitudinal movement by means of the projection $e^{12}$ of the plate $e^{13}$, Figs. 12 and 87, which serves as an abutment therefor.

The operation of said mechanism may be briefly described as follows: The type, being moved along in front of the forcers by the main driver-frame in a series of intermittent movements, is tried at each interval of rest by the stud or projection of the ward-plate above it, these being depressed at this interval of rest by the action of the springs $l^7$. If the nick in the type does not correspond with the face of the stud which bears upon it, then the stud cannot descend, and hence the actuating-spring $l^7$ is not permitted to have its full movement. In consequence of this the rear end of the lever $l'$ is not raised sufficiently to disengage the edge $l^4$ from the shoulder $l^{11}$, and hence the forcer is not free to move when pressed at the proper time by the spring $l^{17}$. If the nick in the type does correspond with the face of the stud, the latter will descend into it, and thus cause the opening in the rear end of the lever to be centrally located with reference to the shoulders of the forcer, and consequently the latter will be free to move when acted upon at the proper time, and hence at such time will be carried forward by the spring $l^{17}$ within the range of movement of the carrier, by which it will be projected forward to eject the type from the race. When no type is presented for selection to the stud of the ward-plate, the spring $l^7$ will be permitted to make its full movement, by which the rear end of the lever will be elevated so far that its projection $l^3$ will be caught by the shoulder $l^{10}$, and the forcer will be thus prevented from moving in a forward direction. When tested and ejected, as stated, the type is lifted into the type-channels in the manner hereinafter described.

*Mechanism for lifting the selected type into the type-channels.*—In front of and parallel with the distributing-race is located a lifting-frame $2^7$, Fig. 82, 90, and 91, which consists of two parallel plates having a space between in which is inserted at the ends of said plates, respectively, extension-plates $2^{13}$ $2^{14}$, to which the side plates $2^7$ are rigidly attached. The part $2^{13}$ is extended downwardly and provided with an oblong slot $2^{10}$ therein, while the part $2^{14}$ is extended downwardly, and longitudinally as well, the former extension having a horizontal slot $2^{11}$ and the latter a vertical slot $2^9$ formed therein. A plate $e^{16}$, called the "ledge-plate," is rigidly attached to the auxiliary frame-plate $a^{14}$, Fig. 87, by means of studs extending through holes in the inner plate $2^7$ and so adjusted as to lie between the plates $2^7$. Pivotally attached to the frame-plate $a^3$ are elbow-levers $2^4$ $2^5$, Fig. 82, the depending arms of which are connected to each other by means of a link $2^6$. The elbow-lever $2^4$ is rigidly attached to a rock-shaft $2^3$, hav-ing a bearing in the frame $a^3$, to the opposite end of which is rigidly secured an arm $2^2$, Figs. 84 and 85, the free end of which engages with a groove $d^4$, formed in a cam $d^2$, upon the shaft $b^6$. The horizontal arms of the levers $2^4$ $2^5$ are provided with pins which engage, respectively, with the slots $2^{10}$ $2^{11}$. Thus it is obvious that the rotation of the cam and the consequent oscillation of the rock-shaft serve to impart a vertical movement to the lifter-frame, for the purpose hereinafter stated. A lever 2, Fig. 82, is pivoted at its lower end to the frame-plate $a^3$, while a pin upon the opposite end is adapted to engage with a groove $d'$ in the cam D. A pin $2'$ also engages with the slot $2^9$ in the extension $2^{14}$ of the lifter-frame. The movement of the cam D actuates the lever 2 and imparts a horizontal movement to the lifter-frame, said movement being so timed as not to interfere with the vertical movement of said lifter. The ledge-plate $e^{16}$, Fig. 91, is provided upon its upper face with a series of quadrangular projections $e^{17}$ of varying width, according to the width of the type in the type-channels of the type-case above them, which is hereinafter described and clearly shown in Fig. 6. These projections are located beneath the division-plates $e^6$, as shown in Fig. 10, but extend in a lateral direction beyond the side line of the type-channel far enough to form a ledge $e^{18}$ for the support of the type, as shown in Fig. 10 and Figs. 94 to 98, inclusive.

Upon the upper edge of each of the front and rear plates of the lifter-frame are formed teeth $2^{12}$, Figs. 90 and 91, between which teeth are formed recesses corresponding to the thickness of the respective type designed to be lifted plus such clearance as may be necessary for the easy entrance of the type. The sides of the teeth next the main conveyer or driver are inclined, as shown in Fig. 91, to permit the ready action of the type and to avoid conflict between that and the teeth as the former is thrust out by the action of the forcers.

The operation of said lifting mechanism is substantially as follows: The normal position of the parts is shown in Fig. 94, the recess below the type-channels being empty. At the proper time, however, in the operation of the machine a selected type $2^{13}$, Fig. 95, will be projected into this recess, as shown by the action of the proper distributing-forcer. This type $2^{13}$ will be raised bodily in a vertical plane, as shown in Fig. 96, by the lifter-frame $2^7$, the recess $e^{19}$ being provided in the division-plate to permit this movement, until the lower edge of the type shall have reached a point slightly above the bearing-surface of the ledge $e^{16}$, as indicated in Fig. 97. As the column of type in the channel overhangs the ledge $e^{18}$, it follows that the upward movement of the entered type will necessarily lift the column resting upon it, as shown in Fig. 96, in which the arrow indicates the movement of the frame. Upon reaching the extreme vertical position the lifter-frame is actuated by means of the mechanism before described to carry the entered type to the left against the wall of the type-channel, as shown in Fig. 97, in which position it is in line below the type-column, which now rests squarely upon it. When this movement is accomplished, the lifter-frame is actuated to lower the type upon the ledge $e^{78}$, as shown in Fig. 98. The downward movement of the lifter-frame, owing to the combined action of the cams, is in a diagonal direction, so that no contact occurs with the side of the type. The downward movement, however, is more rapid than that to the right, so that the type is deposited squarely upon the ledge before the lifter-frame moves out of contact with it. The complete movement of the lifter-frame is indicated by the diagram, Fig. 93, and is as follows: first upward, then forward to the left, then downward in a vertical plane a short distance, then downward in a diagonal direction to the point of beginning.

It is well known that where type are fed into a type-channel from the top they are liable, if rendered sticky from any cause, such as oil thereon, to adhere to the sides of the channel, thus preventing the tier from being compact and requiring the constant attention of an attendant to push them down. By lifting the type into the bottom of the channel I am enabled to take advantage of this adhesion or friction, as well as that of the weight of the type, to secure a compact line or tier of type, which causes each type to sustain a fixed relation to the bottom of the channel, thus enabling any given type to register with an ejecting type-forcer placed opposite the same, whether it be at the bottom of the channel or at any point above.

Thus it will be seen that the channels of the type-case receive their supply from the distributing mechanism, the dead-matter column serving as the direct source from which they are fed; but, as the action of the distributing mechanism is continuous, while the quantity of type set in a given time may vary according to the volition or speed of the operator at the keyboard, as hereinafter explained, it is important that some automatic means should be provided for controlling the action of the distributing mechanism, so as to conform to the speed with which type are set, thus preventing an overflow of the type-channels, or either of them, and establishing harmonious complementary action between the two departments of the machine. For this purpose I have provided mechanism for arresting the movement of the distributer when any one of the type-channels is full.

As the entire distributing mechanism is actuated by the revolution of the shafts $b^5 b^6$, it follows that any means for automatically throwing said shafts out of gear when any one of the type-channels is full, and for throwing and maintaining them in gear at all times when said channels are less than full, may serve to establish the desired complementary relation of type supply and demand in the act of distributing and setting type. The means which I have adopted for accomplishing this result, and which may obviously be varied, is as follows: Pivoted in bearings in lugs $e$, formed upon the main frame-plate E of the type-case, as shown in Figs. 6, 7, 13, 102, and 103, is a rock-shaft $b^{12}$, having arms 3 at the respective ends, which are rigidly attached thereto, and to which is secured a cross-bar 3', located immediately above the channels of the type-case. A spring $3^{23}$, Figs. 103 and 104, serves to depress said cross-bar, so that it rests normally within a certain distance of the upper ends of the type-channels and in operative proximity to the upper ends of the gravity-bars $3^{24}$, Figs. 102 and 103, which are placed loosely in the type-channels to depress the type. As the type are lifted into the channels, the bars are elevated, so that when the channels are substantially full one or more of said gravity-bars is brought into contact with the cross-bar 3', thereby lifting the same in the manner and for the purpose hereinafter set forth. An arm $3^2$ is rigidly attached to and extended rearwardly from said rock-shaft, which is connected by means of a link $3^3$ to an arm $3^4$ of an elbow-lever pivoted at $3^5$ to a bracket $a^{12}$, rigidly attached to the frame-plate $a^2$. The free arm $3^6$ of said lever is provided with a pin $3^7$, Figs. 99, 100, 101, and 107, which is adapted to engage with lips or flanges $3^{25}$, formed upon the bracket $a^{12}$, which serves to limit the movement of said pin as the lever is oscillated. A sleeve $3^8$, Figs. 3, 103ª, 105, 106, and 107, is mounted loosely upon the shaft $b^9$, but provided with a pin $3^{26}$, Fig. 105, which is fitted loosely into a bore in the gear-wheel $c^5$, rigidly attached to said shaft, so that said sleeve $3^8$ is free to move longitudinally upon said shaft, while it is caused to revolve continuously therewith. Said sleeve is provided with peripheral cams $3^{10} 3^{11}$, having faces which are inclined obliquely to the axis of the cam and in opposite directions. Said cams are in operative proximity to the pin $3^7$, as indicated in dotted lines in Fig. 103ª, so that as said sleeve is revolved it will, through the action of one or the other of said cams, be moved longitudinally upon its shaft in one or another direction, according as said pin is located in one or the other of two extreme positions, against one or the other of the lips $3^{25}$, as shown in Fig. 101, said lips serving as ledges to support and brace said pin while the inclined face of the cam is in contact therewith. Said sleeve is provided with a groove $3^9$, which is arranged to engage with a pin $3^{13}$ upon one arm of a lever $3^{12}$, Figs. 103, 106, and 107, which is pivotally mounted upon a bracket $a^{10}$. The opposite arm $3^{14}$ of said lever is provided with a slot $3^{29}$, (shown in Figs. 106 to 108, inclusive,) which is in engagement with a pin $3^{18}$ upon the end of an arm $3^{17}$, said pin lying in a groove $3^{19}$, formed in a sleeve $3^{27}$ upon the shaft $b^5$. A similar sleeve is mounted upon the shaft $b^6$. Said sleeves are keyed to their respective shafts, but are capable of longitudinal movement thereon, and are provided with pins $3^{32}$, adapted to project loosely into grooves in the sides of the gears $c^6 c^7$, which revolve continuously and are loosely mounted upon said shafts, one of which is shown in Fig. 111. Pins $3^{29}$ are rigidly inserted in said grooves and are adapted to engage normally with the pins $3^{32}$. The sleeves $3^{27}$ and $3^{28}$ are adapted to move longitudinally upon their respective shafts a sufficient distance to throw said pins $3^{20}$ and $3^{22}$ out of engagement with each other. Attached to or formed upon the ends of the sleeves $3^{27}$ and $3^{28}$ are gears $c^8 c^9$, which mesh into each other, but are not connected directly with the driving-gears, and hence receive their motion, if any, through the sleeve $3^{27}$. A rock-shaft $3^{16}$ is mounted in bearings upon the bracket $a^5$, which shaft is preferably provided with three rigid arms $3^{17}$, having pins $3^{18}$ in the ends thereof, which engage with the slots formed in the sleeves $3^{27}$ and $3^{28}$. Said shaft is rocked through the action of the lever $3^{12}$, the arm $3^{14}$ of which is in engagement with the pin $3^{18}$, as stated. The effect of this action is to move the sleeves $3^{27}$ and $3^{28}$ simultaneously in a longitudinal direction upon their respective shafts, thereby throwing them into or out of gear with the continuously-revolving gears $c^6 c^7$. The mechanism described is so adjusted that when the cross-bar $3'$ is in its normal position, as shown in Fig. 103, the pins $3^{20}$ and $3^{22}$ are in engagement, and hence the gears $c^8 c^7$ are revolved, and with them the shafts $b^5 b^6$. It will thus be seen that as the type are lifted in the type channels until a channel has received its full number of type, less one, the insertion of an additional type will cause the weight $3^{24}$, Figs. 82 and 104, of that channel to be brought into contact with the cross-bar $3'$, and raise the same against the action of the spring $3^{23}$, as shown in Fig. 104. This movement is communicated through the arm $3^2$, link $3^3$, lever-arm $3^4$, and pin $3^7$ to the cam $3^{10}$ upon the continuously-revolving sleeve $3^8$, thus moving said sleeve to the right upon its shaft, and through the lever $3^{12}$, having its pins $3^{18}$ in engagement with the groove $3^9$, the arms $3^{17}$ of the rock-shaft are tilted, carrying with them the sleeves $3^{27} 3^{28}$ and throwing the shafts $b^5 b^6$ out of gear with the wheels $c^6 c^7$, which continue to rotate. The movement of the entire distributing mechanism is thus automatically arrested. When, however, a type is withdrawn from the channel, the cross-bar $3'$ is depressed by the spring $3^{23}$ to its normal position, which reverses the action of the parts directly connected therewith, and causes the pin or stud $3^7$ to engage the oblique face of the cam $3^{11}$, and thus, through the action of the remaining parts described, the distributing mechanism is again thrown into gear and continuously actuated until the rock-shaft $b^{12}$ is again tilted.

The condition of the type-channel of the letter "e" practically controls the action of the distributing mechanism, inasmuch as that letter is more frequently used than any other in the alphabet. While but a limited number of type-channels are shown in the drawings, it is obvious that in the general adaptation of my invention any number of channels may be employed.

*The type-setting mechanism.*—I have previously referred to the type-case into the bottom of which the type are distributed and which forms the reservoir for the setting mechanism. Said case consists of a frame E, preferably inclined in a rearward direction, as shown in Fig. 103, the same being provided with suitable side plates $e^3$, Figs. 6, 7, and 8, between which are inserted metallic division-plates $e^6$, which are secured in position in grooves $e^2$, formed in the frame-plate, the fastening of said division-plates in position being accomplished in any approved manner.

Below the type-case is located a keyboard G, Fig. 14, which consists of a case or box having a bottom plate $g^5$, Fig. 13, rigidly attached to the frame-plate and which extends back toward the rear of the machine between the plates $a' a^2$. Keys $g^2$, Figs. 13, 17, and 19, extend upwardly through the keyboard, being mounted upon or forming a part of bent levers $g$, pivoted at $g'$ and provided with counterpoise extensions $g^4$, which serve to normally elevate the keys. The lower ends of said levers are provided with shoulders $g^3$, which are adjusted to bear against the ends of rods $g^7$, laid loosely in a series of grooves or recesses in the bottom plate $g^5$. Mounted so as to turn freely upon a fixed shaft $g^9$, secured at its ends in the plates $a' a^2$, are a series of levers $g^{10}$, Figs. 13 and 31, the lower ends of which rest in the recesses $g^{11}$, which separate and form guides therefor, while the upper ends rest loosely against a movable cross-bar $m^4$, Figs. 3, 13, and 31, which is attached to arms $m^3$, loosely mounted upon the shaft $g^9$, the levers $g^{10}$ being located between said arms, one of which is more clearly shown in detail in Fig. 31. A shaft M is pivotally secured in bearings in the plates $a' a^2$ and is provided with an arm $m^{10}$, rigidly attached thereto, (see Figs. 3, 31, 32, and 33,) the lower rounded end $m'$ of which is in engagement with a groove in the top of the bar $m^4$. The arm $m^{10}$ is provided with a forward projection $m$, having an inwardly-curved face and a shoulder $m^{11}$, said projection being located in operative proximity to a cam $d^{18}$ upon the shaft $b^7$. The cam $d^{13}$, during a portion of its revolution, is adapted to engage the projection $m$, thereby forcing the arm $m^{10}$ back and with it the bar $m^4$, which pushes back such of the levers $g^{10}$ as have been moved into abnormal positions, and through them the corresponding rods $g^7$ and the levers and keys connected therewith. The arm $m^{10}$ is thus positively moved and held by the cam $d^{18}$, which is continually revolved during the passage of said cam in its revolution from the point $m^8$ to the point $m^7$ of the concentric portion thereof, as shown in Fig. 31, for the purpose hereinafter stated. At the cut-away portion of the cam, as shown, said arm is free to be moved forward. A spring $m^5$ is attached to the plate $g^{20}$, which lies parallel with and is secured to the forcer-plate $g^{12}$. Said spring is provided with a projection $m^6$ in operative proximity to the cam $d^{14}$. The rear end of the spring $m^5$ is adapted to abut against the cross-bar $m^4$ when permitted to do so by the cam $d^{14}$. Said cam is so constructed and arranged upon the shaft as to depress the spring $m^5$ shortly before the shoulder $m^7$ of the cam $d^{13}$ passes the shoulder $m^{11}$, Fig. 32, of the projection $m$, and to hold it in that position for a short time, in order to insure harmonious action between the type-ejecting and type-lifting mechanisms, as hereinafter stated. It will thus be seen that the bar $m^4$ is locked in position during the greater portion of the revolution of the shaft $b^7$, thus locking the levers $g^{10}$, and with them the keys. When the shaft has reached that portion of its revolution indicated in Fig. 32, it is obvious that the keys may be depressed; but as soon as the projection $m^6$ of the spring has slipped off from the shoulder $m^9$ of the cam $d^{14}$ it rises in front of the bar $m^4$, as shown in Fig. 33, and locks the keys, which cannot be again depressed until the shaft shall have nearly completed another revolution. This feature I term the "time-lock", the object of which is to prevent the depression of the keys except at such time as it is desirable and safe to do so.

A plate $g^{12}$, Figs. 13, 15, and 16, which I prefer to designate as the "forcer-plate," is secured in proper grooves in the vertical plates $a'$ $a^2$, being arranged at right angles to the plane of the type case. Said forcer-plate is provided with a right-angled extension $g^{13}$, which forms a part of the type-case and is provided with a series of grooves $g^{14}$, forming a continuation of the type-case grooves before referred to. The forcer-plate $g^{12}$ is provided with a series of longitudinal grooves $g^{15}$ in its upper face, which are adapted to receive and serve as guides for forcers $g^{16}$, consisting of straight bars provided upon their upper sides with studs $g^{17}$ $g^{18}$. Said forcers are properly secured in place by means of covering-plates $g^{19}$ $g^{20}$, Fig. 15.

Mounted rigidly upon the shafts $b^3$ $b^4$, between the vertical plates $a'$ $a^2$, are sleeves, to which are rigidly attached carrier-plates H I, respectively, Figs. 3, 13, and 20, the former of which is arranged in operative proximity to the stud $g^{17}$ and the latter to the stud $g^{18}$. Said shafts are caused to revolve in opposite directions, as indicated by the arrows shown in Fig. 20, and are so placed with reference to each other as to engage the studs $g^{17}$ and $g^{18}$ alternately—that is to say, the stud $g^{17}$, having been engaged by the carrier H, is thrust forward to its full limit and the carrier released therefrom, when the stud $g^{18}$ is engaged by the carrier I and thrust back. It is essential that either the carrier I or the stud $g^{18}$ should be made longer than the carrier H or the stud $g^{17}$, in order that a longer return-thrust may be given to the forcer to compensate for the initial movement given thereto by the lever $g^{10}$ when a key is depressed.

As the forcers are loose in their respective grooves and are liable to slide back after having received an initial movement, or as one or more keys are liable to be depressed unintentionally, it is essential that both contingencies should in some way be met. I have therefore provided what I term a "guard-plate," which serves not only to hold such forcers as have received an initial movement at the proper time in the desired positions, respectively, but to return such as are not sufficiently advanced to their respective normal positions.

A shaft J, Figs. 20 and 21, is pivotally mounted between the vertical plates $a'$ $a^2$. Rigidly attached to said shaft are arms $j'$, to which is secured a curved metal plate $j^2$. A spring $j^3$, one end of which is attached to the shaft J and the other to a stud $j^4$, serves to hold the plate $j^2$ in a normal position, as indicated in dotted lines in Fig. 20, which position is such as to permit the passage of the forcer-stud $g^{17}$ beneath with proper clearance when the forcer has received its initial movement through the depression of a key; but as said guard-plate $j^2$ lies in the path of movement of the carrier-plate H the latter in its revolution forces said guard-plate back, which depresses its lower edge below the top of the stud $g^{17}$, and hence intercepts any backward movement of such stud or studs as may be in front of it, as shown in Fig. 20ª, while any such in the rear that have received a partial initial movement are forced back to a normal position.

The forward movement of the carrier-plate H is designed to take place when the type-lifter frame, hereinbefore referred to, is depressed and the type are at rest in the channels.

The grooves $g^{15}$ are directly in line with the type-channels into which the forcers $g^{16}$ are arranged to project, as shown in Figs. 6, 13, 79, and 82, and more clearly illustrated in Fig. 34, in which the forcer is shown in its extreme forward position against the foot of the type which has been driven into the raceway. The raceway is formed by the metal plates F $f$, Figs. 13 and 14, located in front of the type-case, the lower edge of the plate F forming the upper surface of the raceway, while the upper edge of the latter forms its lower surface. The distance between the two plates corresponds to the height of the type.

The operation of selecting and ejecting the desired type into the raceway at a given time is accomplished as follows: When a key upon the board is depressed, at the proper time the lever $g$ is tilted upon its pivot, and the end $g^8$ is thrust backward to actuate the rod $g^7$. Through said rod the lower arm of the lever $g^{10}$ is forced back and its upper end forward against the rear end of the forcer $g^{16}$, which is given an initial movement forward sufficient to place the stud $g^{17}$ into the path of movement of the carrier H. The guard-plate being forced down by the carrier said forcer is prevented from backward movement and held in operative proximity to said carrier, by which it is driven forward against the foot of the type, which is thereby forced out, the initial movement of the plunger being sufficient to cause the next movement of the carrier H to force the type out into the race. The front carrier, by means of the longer plate I or longer stud $g^{18}$, as the case may be, imparts to the forcer a single rearward movement equal to the two former movements imparted thereto by the selecting-key and the rear carrier. It will thus be seen that the depression of the keys does not of itself set the type, but merely indicates to the machine the special characters to be set, which are thereupon thrust into the raceway by separate and positive acting mechanism. This being true, inefficient action or errors on the part of the machine are wholly obviated. The type having been ejected into the raceway is swept therein to the delivery end of the machine by means of the following-described mechanism: Located upon the main shaft, Figs. 3, 14, and 22, is a disk $b'$, to a wrist-pin upon which is attached one end of a connecting-rod K, the other end of which is attached to a horizontal bar $k$. A special recess $f'$, Figs. 13, 22, and 87, is formed in the plate $f$ to serve as a proper means for holding and guiding the type-driver bar in its movement. The type-driver $k'$ consists of a right-angled plate, Figs. 22 and 23, which is attached to the end of said bar, the part $k^2$ thereof being adjusted to move loosely in the raceway. A cap-plate $k^3$, Fig. 14, is provided for holding said parts in place. Through the disk $b'$, which is continuously revolved, is imparted a reciprocating movement to the type-driver, said movement being in harmony with that of the type-ejecting mechanism.

Figure 25:
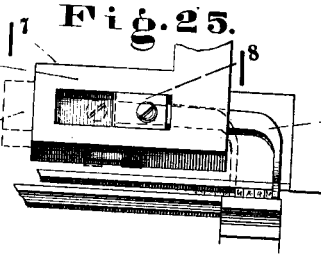
Figure 26:
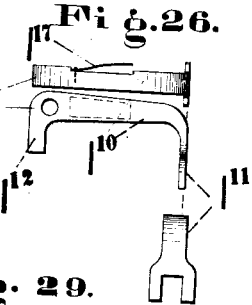
Figure 27:
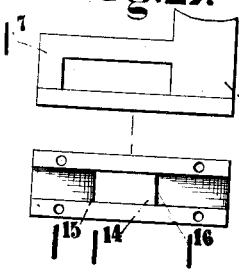
Figure 28:
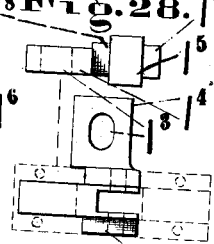
Figure 29:
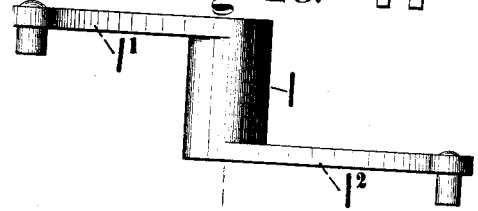
Figure 30:
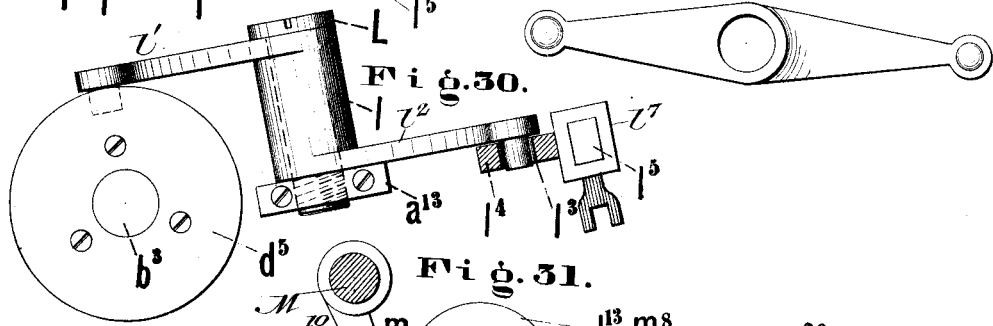

*The auxiliary type-driver.*—In order that the main type-driver may not be required to push forward too large an accumulation of type, and especially that the end type may not be displaced by its own momentum, caused by the rapid movement of the main driver, I have provided an auxiliary type-driver, which I regard as one of the most important of the novel features of the setting mechanism. Said auxiliary driver is so actuated as to be driven backward rapidly for the purpose of engaging the type, after which it is given a comparatively slow forward movement in order, without displacement, to convey the type that have been swept out by the main driver along the raceway. Attached in any convenient way to the frame is a guide-frame $l^6$, Figs. 14, 24, 25, and 27, which is provided with a longitudinal recess in the part $l^7$, adapted to receive and guide a block $l^5$. Said block is provided with a rearwardly-extended arm $l^7$, Fig. 30, having an opening $l^9$ therein, into which is loosely inserted a pin upon the arm $l^3$ of a lever $l$, which is pivoted to a bracket $a^{13}$, Fig. 1, said bracket being in turn rigidly attached to the frame. A pin upon the arm $l'$ of said lever is adjusted to engage with a groove in a cam $d^5$, Figs. 3 and 30, mounted upon the shaft $b^3$. By means of said cam and lever the block $l^5$ is reciprocated in harmony with each movement of the main type-driver. An extension $l^8$ upon the block $l^5$ serves as an additional guide therefor. Pivotally mounted in said block is an arm $l^{10}$, having a finger $l^{11}$ upon its extremity, and a depending arm $l^{12}$, which is arranged to project through a slot $l^{14}$, Figs. 24 and 27, the length of which is less than that of the movement imparted to the block $l^5$. A friction-spring $l^{17}$, Fig. 26, causes the arm $l^{10}$ to remain in the position in which it is last placed by the positive action of the mechanism until said position is changed or reversed by positive means. The result is that as the block is reciprocated the arm $l^{12}$ is brought into contact with the right-hand end $l^{16}$ of the slot $l^{14}$, and, assuming the arm $l^{10}$ to be in the position shown in dotted lines in Fig. 24, it is forced downwardly to a horizontal position, as shown in full lines therein. This causes the finger $l^{11}$ to be carried over and to be finally brought into engagement with the type which has been swept forward by the main driver, as shown in Fig. 25. The arm $l^{10}$, remaining in its lowered position, is moved forward until the arm $l^{12}$ is brought into contact with the left-hand end $l^{15}$ of the slot, when the finger $l^{11}$ is thereby raised, so as to pass over the accumulated type in its backward movement. Thus it will be seen that the type that is swept forward with each movement of the main driver and deposited at a given point is carried on in the raceway by a slower movement of the auxiliary driver before the next movement of the main driver. The type is thus conveyed by a comparatively slow movement toward the galley in which it is to be finally placed.

*The justifying mechanism.*—A bar 4, Figs. 14, 113, and 118, is arranged horizontally at the front of the machine, one end being attached to the framework $e^4$ of the type-case, while the other is secured to a galley-frame 5', which is rigidly secured to a supporting-bracket $a^8$. The upper surface of the bar 4 forms a continuation of the type-setter raceway, a bar $4^2$ being arranged parallel therewith, as shown in Figs. 113 and 114, to form the upper surface. A block or bracket $4^3$, Figs. 113 and 116, is arranged to slide loosely upon the bar 4 and is provided with a movable finger-plate $4^4$, arranged to be projected into and to be moved laterally within the raceway. The finger-plate $4^4$ may be partially withdrawn by hand, inserted between the type at any point in the raceway, and the type at the left thereof may be moved along thereby, as desired, and swept into the galley. The galley $5^3$ consists of a back plate $5^4$ and flanges or side plates $5^5$ $5^6$, as shown, the latter of which is beveled at the top to conform to the beveled portion $4'$ of the bar 4. The galley is arranged to fit accurately within the frame $5'$, Fig. 118, the bottom being supported by means of pins $5^2$, projecting through said frame-plate and attached to a spring 5 upon the back thereof. A galley-block $5^9$, Figs. 117 and 119, is arranged to slide within the galley and is supported at the bottom thereof by means of pins $5^8$. Bearing-blocks $5^{10}$ are arranged to slide in recesses formed in the sides of the galley, being acted upon by means of a spring $5^{11}$, as shown in Fig. 119, which imparts to the block a frictional resistance against movement, and thereby holds the galley-block at any height at which it may be placed in the galley. The galley-block when raised to its extreme limit is on a line with and forms a continuation of the raceway, as shown in Fig. 120, and serves as a support for the type placed in the galley.

At the end of the raceway and adjacent to the galley is a movable division-plate $5^{16}$, mounted in a supporting-bracket $5^{15}$, Figs. 118 and 120, which when moved downwardly serves to separate the type in the galley from that in the raceway and also as a stop against which the type in the galley may abut for the purpose of being justified. The following-described mechanism is employed for justifying the line: A swinging frame $6^3$ is pivotally mounted upon an arm 6 of the bracket $a^4$, as shown in Figs. 1, 14, and 122. Space-holders $6^7$, consisting of two or more sets of parallel plates, are removably attached to the frame $6^3$ and so adjusted that the bottoms of said holders may swing in front of and register with the top line of the galley. Forcers $6^{10}$, Fig. 126, are arranged at the bottom of said holders, respectively, and are provided with springs $6^{11}$, by which they are normally withdrawn from beneath the columns of spaces. As the type are set in the raceway from the type-case, spaces are set with them between the words, and when the raceway is full a sufficient number of words to approximate to the length of a line are by means of the movable slide $4^3$ placed in the galley and the division-plate lowered. In case the line requires justification space-holders are then swung into position and one of the forcers $6^{10}$ pushed back, thereby driving out the original space, as shown in Fig. 123, and inserting a new one of a different width. When all of the spaces, or such as are necessary, are thus changed, and the line is found to be justified or of such a length as to be tight in the galley, the line is forced down in the following manner: A bar $5^{12}$, Fig. 117, is arranged to slide in a groove formed in the side of the galley. A pin $5^{14}$ enables the same to be raised and lowered. An extension $5^{13}$ is formed at right angles to the main bar and arranged to extend across above the top of the galley. A notch $5^{17}$ is formed in the top of the galley-frame to receive the part $5^{13}$ and limit its downward movement. The bottom of the notch is in the same plane with the supporting-surface of the raceway, and hence when the arm $5^{13}$ is depressed its lower edge lies in said plane. The arm $5^{13}$ is normally in the position shown in Fig. 117, thus enabling the type to be pushed into the galley. When, however, a line is completed and justified, the pin $5^{14}$ is pushed down by the operator, thus lowering the arm $5^{13}$, which forces down the line of type and the galley-block, as shown in Fig. 121. The arm is then raised to its normal position, when a new line may be pushed in upon the other, which is lowered just enough to form a continuation of the raceway. Thus the top of each line when depressed forms a proper surface for the support of the new line as it is swept into the galley.

*General operation.*—Having thus described the various parts of my improved type-composing machine, I will now explain its operation as a whole. The distributing mechanism being in gear with the proper driving shafts, as hereinbefore explained, and the distributing-galley being supplied with "dead matter," the operation is as follows: The line-forcer being in the position shown in Fig. $36^a$, the upper line of the dead-matter column is advanced by the upward movement thereof into the space directly in front of the line-forcer, and by the forward movement of the latter is ejected into a contiguous raceway, as shown in Fig. 36, which raceway forms a portion of the cut-off or separator mechanism. The movement of this line of type, apart from the mechanism, is indicated at 1, Fig. 112. The type-line then being advanced at proper intervals, the end type is cut off or separated from the line and lifted by the cut-off box to an upper plane, as shown in Figs. 51 and 52. The elevated type is then, by means of a reciprocating driver, swept out of the cut-off box in a lateral direction into a contiguous raceway, as shown in Fig. 58, within the range of movement of a special conveyer. (Shown in Fig. 70.) The position of the type, after receiving its vertical and lateral movement, is indicated, apart from the mechanism, in full lines at 2, Fig. 112. Before being taken by the special conveyer, however, the type are moved slightly in a longitudinal direction by means of a reciprocating plunger, Fig. 61, for the purpose of bringing each in turn into accurate line for presentation to the selecting mechanism. This longitudinal movement is indicated by dotted lines at 2, Fig. 112. After having been adjusted longitudinally the type are moved by the special conveyer, Fig. 63, into position to be tried by the selecting mechanism, Fig. 68, which is adapted to select and eject those special characters not provided for in the type-case. The special conveyer, by means of its widely-separated teeth and longer movement, is adapted to receive and move these wide characters that could not be disposed of by the general conveyer. The wide or other special characters which are selected when tried are then ejected upon a contiguous raceway. The position of the ejected quad or type, apart from the mechanism, is illustrated at 3, Fig. 112. The ordinary characters which are not selected at this point are taken from the special conveyer by the main conveyer, Figs. 64 and 86, and are conveyed along the front of the machine for a greater or less distance, according to the position of the character in the type-case, the line of movement being below the type-channels and slightly more than the length of a type in the rear thereof. An intermittent movement being imparted to the conveyer, each type is tried during the rest of said conveyer by proper selecting mechanism. The type which have reached their proper places at a given time are ejected from the distributing-race onto the lifting mechanism directly beneath the type-channels. The position of a type which has been ejected from the distributing-race is indicated, apart from the mechanism, at 4, Fig. 112. By means of the lifting mechanism the ejected type are then elevated into the type-channels through an opening in the bottom of the latter, the relative position of a type as it would appear when elevated by but apart from the lifting mechanism is indicated in full lines at 5, Fig. 112. Those type remaining upon the conveyer and which have not arrived at their proper places are conveyed another step by the next movement of the conveyer or driver and are then tried again, the operation being continued until their respective places are found. If they are improperly nicked they are passed forward into a continuation of the raceway and delivered into any suitable receptacle at the farther end of the machine. This action is continued until one or more of the type-channels is full, when the action of the distributing mechanism is automatically arrested, as hereinbefore set forth, until a type is withdrawn from the full channel or channels, when said mechanism is again set in motion. The distributing mechanism having been operated a sufficient length of time to insure a supply of type in all the type-channels, the operator may proceed with the setting. As above suggested, both the distributing and setting mechanisms are arranged to operate in harmony with each other. The time-lock mechanism described is provided, among other things, for the purpose of preventing the initial movement of a type-setting plunger, except in harmony with the revolving carriers and lifting mechanism. In setting the type the proper keys are depressed by the operator in a series of impulses—one, two, three, or more keys being depressed at each impulse, according to the relation existing between the characters to be set and the position of the keys upon the keyboard. Owing to the rapid revolution of the time-lock shaft, one or more keys may be depressed at almost any instant, thus actuating the initial plungers and causing the type to be set with absolute certainty and without danger either to the type or machine. In consequence of the action of the time-lock mechanism, the initial movement of the type-forcers, caused by the depression of the keys, occurs in harmony with the movement of the continuously-revolving carrier, so that by the action of the latter the initially-moved forcers are at once carried completely forward to eject the respective type from the case into the race. The guard-plate, in conjunction with the forwarding-carrier, insures certainty of action on the part of the plungers, prevents any conflict with those which chance to be temporarily displaced and causes them to be returned to their respective normal positions. The front carrier by one impulse returns all the plungers which have been forced completely forward to their normal positions. The type which rest upon their edges in the dead-matter column remain so during their entire passage through the machine from the distributing to the setting galley. As they are ejected into the setting-race they are swept sidewise by the main type-driver toward the delivery end of the machine. At the end of this movement they are gathered into the line of composition by the auxiliary type-driver, as shown in Fig. 34, in which the relation of the parts mentioned is clearly indicated. The movement of the main and auxiliary type-drivers are in harmony with the other parts. The former moves forward to gather the type and deliver them to the auxiliary driver only after they have been completely ejected into the race, and it completes its return movement in time to permit the next series of type to be ejected as before, and also to permit that which has been swept forward in the race to be carried on by the auxiliary driver. The selecting-keys, which are moved at any one impulse, are, with their corresponding forcers, returned to their respective normal positions during that impulse or revolution, so that the same keys may be used successively, if desired. If in the rapid manipulation of the keys one is unintentionally moved and only partially depressed, the corresponding forcer will receive but an incomplete initial movement, and consequently, not passing beyond the guard-plate, will be inevitably returned to its normal position by the rearward movement of the latter. The action of the cam $d^{13}$, Fig. 31, which returns the upper ends of the levers $g^{10}$ to their normal position, precedes slightly the movement of the guard-plate, which returns the incompletely-moved forcers to their normal positions, respectively, and hence the possibility of improper contact between the levers and forcers is entirely removed.

From the foregoing it will be seen that with each revolution of the main shaft type may be distributed into the case, while one or more type may be withdrawn therefrom, according to the demands of composition and the skill of the operator; but it is obvious that the speed of the machine may be such as to enable the distribution to keep pace with the most skillful operator. The case serves as a common reservoir into which to distribute and from which to draw the type. The type being fed into the case at the bottom and withdrawn during the interval of rest of the lifter, it is obvious that the point above the bottom at which they may be withdrawn may be varied indefinitely; but I prefer to place the point of discharge quite near to the bottom in order that there may always be a considerable reserve supply of type in the channels, as it often occurs that the type in the dead-matter column do not conform to the special demands of composition at a given time, and hence if no reserve fund were provided the type in certain channels might become exhausted. After being carried into the line of composition by the auxiliary driver, the type are forwarded to the galley and justified by hand through the aid of the justifying mechanism, as set forth.

Some of the more prominent advantages of my improved machine are as follows: By the employment of a type-case which is common to both the type distributer and the setter it is possible to return the type, automatically, after the same have been used, to the precise place from which they are taken, when of course they may be used again. The only manual labor required in performing this act—that is, in distributing the dead-matter type directly into the setter-channels—is the placing of the dead matter into the distributing-galley. By combining the distributer and type-setter with proper clutch mechanism, it is possible when the distributing-galley is kept supplied with dead matter to set type continuously without the possibility of exhausting the type-case. The type are positively moved at each step just the proper distance to accomplish the desired result.

It is obvious that the construction may be more or less varied without departing from the principle of my invention. For example, the type-case adapted for the double purpose of receiving the type when distributed and of holding the same for ejectment may be employed, if desired, in combination with other mechanism for inserting the type therein and other mechanism for ejecting the type.

The distributer and type-setter may be combined, if desired, with other clutch mechanism for controlling the action of the distributer.

*Prominent features.*—Among the many features hereinafter claimed by me, to which I attach special importance, are the following: First, the uniting in one organization of the three main groups of instrumentalities—viz., (a) mechanism for receiving and automatically and positively distributing the type to a common receptacle or case, (b) a type-case so constructed and interposed between distributing and setting mechanism that it may serve as a receiver for the one and a magazine for the other, whereby type may be both injected and ejected during a single impulse of the machine, and (c) setting mechanism arranged to act in unison with the distributing mechanism and to receive its supply of type therefrom; second, positively-actuated mechanism for advancing and lifting the distributed type into the bottom of the case; third, automatic controlling or locking mechanism adapted to harmonize the respective movements of the distributing and setting mechanism, whereby one may serve as an automatic and positive feed for the other, while each may be enabled to complete its work without conflict during a single revolution of the main shaft; fourth, means for causing the rejection before reaching the type-case in the act of distribution of type or spaces not provided for therein; fifth, means for slowly advancing the type from the point of delivery of the main driver, into the line of composition; sixth, means for securing accurate alignment, and, seventh, means for accurately guiding the type upon the raceway.

Having thus described my invention, I claim—

1. In a machine for distributing and setting type, the combination of a distributing race-way, means for conveying the type thereon, a type setting race-way, a type case common and in operative proximity to said distributing and setting race-ways, respectively, means for positively and automatically distributing the type into said type case and means for ejecting the type from said type-case at points relatively constant to those at which it is injected, substantially as specified.

2. A machine embodying and combining in a single organism type distributing and type setting mechanisms, respectively, of which a single type-case forms a part; said type-case being so adjusted and arranged with respect to said active or movable distributing and setting portions that the type may be fed into the bottom of the case by the former and ejected from said case by the latter, substantially as described.

3. A machine embodying and combining in a single organism type distributing and type setting mechanisms, of which distributing and setting type-races, respectively, and a single type-case form parts; said type races being arranged in substantially parallel planes in operative proximity to the type-case, and said type distributing mechanism being provided with means for positively delivering the type from the distributing raceway to said type-case, while said setting mechanism is provided with positive means for delivering the type from the type-case into said setting race way, substantially as specified.

4. A type setting and distributing machine in which is combined a source of power, distributing and setting type-races arranged in substantially parallel planes in operative proximity to a stationary type-case common to both, appliances for positively delivering the type from the distributing race-way into the bottom of said type-case, means for supporting it therein, and positive means for delivering the same in turn from said type-case to said setting race-way, substantially as specified.

5. A type setting and distributing machine in which is combined a type-case common to both and forming a part thereof, positive means for feeding the distributed type into the bottom of said case, positive means for setting it from said case into a race-way, and means for harmonizing the action of said distributing and setting mechanisms with respect to each other whereby they may alternate in their movements during a single impulse of the machine, substantially as described.

6. The combination in a single machine of type distributing and type setting mechanisms having a common source of power said setting mechanism being provided with selecting keys, intermediate mechanism for imparting an initial movement to the type ejecting forcers, and appliances for positively withholding the action of said intermediate mechanism for an instant during each impulse of the machine, substantially as set forth.

7. The combination in a type distributing and setting machine of type distributing and setting mechanisms having a common source of power, a common type-case, positive appliances forming a part of said distributing mechanism for lifting the type into the type-case at the bottom, means for supporting the same therein when inserted, type-key mechanism, forming a part of said setting mechanism, intermediate mechanism in operative connection with the keys and type ejecting forcers, respectively, for imparting an initial movement to the latter, and means for withholding the action of said intermediate mechanism during the movement of said lifting appliances, substantially as described.

8. In a type setting and distributing machine, the combination of a type-case common to the distributing and setting mechanisms of which it forms a part; said distributing mechanism being provided with means for feeding the distributed type to said type-case by positive action from the bottom and said setting mechanism having means for ejecting said type into a setting race-way at a point between the bottom and top of the case, substantially as shown and described.

9. A machine in which is combined type distributing and setting mechanisms, means for actuating the same in harmony from a common source of power, a type-case common to and forming a part of said distributing and setting mechanisms, and appliances for automatically arresting the movement of the distributing mechanism when the channels of the type-case become full, substantially as shown and described.

10. A machine in which is combined type distributing and setting mechanisms arranged to be actuated in harmony from a common source of power, a type-case common to said distributing and setting mechanisms and forming a part thereof, appliances for automatically arresting the movement of the distributing mechanism when one or more of the type channels become full, and means for automatically throwing said distributing mechanism into action upon the withdrawal of one or more of the type from said full channel or channels, substantially as described.

11. The combination in a single machine of type distributing and type setting mechanisms—the latter having a time-lock to automatically control its action with reference to the former, whereby the type may be set only at safe intervals with relation to the action of the distributing mechanism during each impulse of the machine, substantially as described.

12. In combination with the line forcer O and the carrier $O^2$, the spring $O'$, for giving the line forcer an initial movement to bring it within range of the carrier's action.

13. In combination with a spring block for advancing a column of type, a line forcer O having recesses $O^3$ $O^5$, and carrier plates $O^2$ $O^4$ adapted to give the line forcer its forward and backward movement.

14. In combination with the line forcer O, the spring $O'$, the carrier $O^2$ and the levers $u^2$, $t$ and bolt T for unlocking the line forcer, the construction being such, that when the line forcer is unlocked, it will be moved by the reaction of the spring within the range of the carrier's action.

15. In combination with the line forcer O, and the levers $u^2$ $t$, and bolt T for unlocking the same; the spring $o'$ for moving the line forcer, when unlocked, within range of action of the carrier $o^2$, the carrier $o^2$, for giving the line forcer its complete rearward movement, to bring it within the range of action of the carrier $o^4$, and the carrier $o^4$ adapted to carry forward the line forcer, and move the upper line of type in the galley, from the galley, into the raceway.

16. In combination with the line follower $p^{11}$, and the levers $u^2$ $t$ and bolt T for unlocking the line forcer, at the end of the forward movement of the line follower, the spring $o'$, for giving the rearward movement to the line forcer, and the lever $u^3$ and bar $u^5$ actuated by the line forcer for moving the line feeding pawls out of engagement with the line follower.

17. In combination with the line follower $p^{11}$, and the levers $u^2$ $t$ and bolt T for unlocking the line forcer, at the end of the forward movement of the line follower, the carrier for giving a rearward movement to the line forcer, the lever $u^3$ and bar $u^5$ for moving the pawls out of engagement, and the lever $u$, $u^2$ for returning the line follower bar.

18. In combination with the line follower $p^{11}$, and the levers $u^2$, $t$ and bolt T for unlocking the line forcer, and giving it rearward movement, the line forcer O having the recess $O^7$, and the levers $u$, $u^2$ actuated by the shoulder of the recess for moving back the line follower bar to its normal position.

19. In combination with the line follower $p^{11}$ the lever $u^2$ having its upper end attached to the bar, the lever $t$ pivoted to the frame plate, the latch T and the line forcer O, the construction being such, that the line follower through the intermediate parts described, is adapted, at the proper time, to unlock the line forcer.

20. In combination with the line follower $p^{11}$, the line-forcer O, the co-acting parts for unlocking the same, and the lever $u^3$ bar $u^5$ and notch $o^6$ for throwing out the pawls.

21. In combination with the line follower $p^{11}$, the line forcer O, the co-acting parts for unlocking the same, and the lever $u^2$, bell-crank lever-arms $u$ $u'$ and shoulder $o^7$ for returning the line follower.

22. The combination of the following elements; a follower bar for advancing the type line, a cut off for removing the end type, and for lifting the same to a higher plane, and a driver for moving the lifted type out from the cut off, onto a contiguous race-way.

23. In combination with the block $q^{18}$ having the plate $q^{89}$ and the spring for giving the block vertical movement, the hook $q^{35}$ held in proper support, and the lever for giving it longitudinal movement.

24. In combination with the abutment $q^{28}$ the line follower $p^{11}$ and the block $q^{18}$ the construction being such, that the end type is brought by the line follower $p^{11}$ against the abutment $q^{28}$ into position to be lifted by the block $q^{18}$.

25. In combination with a type line follower bar having an intermittent movement, a clamp for holding the same, during its interval of rest and means for positively actuating said clamp.

26. In combination with the type-line follower $p^{11}$, the stud S, in juxtaposition to the follower-bar, having a flat portion and intermediate parts connected to the stud, substantially as described, for imparting to the stud a partial rotation.

27. In combination with the follower bar $p^{11}$, the stud S, with tappet $s^2$ and the hook plate $q^{35}$ having the elastic finger $s^8$.

28. In combination with the follower bar $p^{11}$, the stud S with tappet, the hook plate $q^{85}$ with elastic finger $S^8$, the lever $q^{30}$ and the cam $d^{10}$.

29. In combination with the clamp and intermediate connecting parts for unclamping the same, the follower-bar in juxtaposition to the clamp for advancing the type-line when it is free to move, substantially as described.

30. In combination with a proper support for the type, forming a part of a continuous race-way, a guide to engage the type nick and a forcer adapted to successively adjust each type in a longitudinal direction into its proper registering position upon said support, whereby the type nick may be engaged by the guide thereon.

31. In combination with a cut-off of a driver for moving the separated type out of the range of action of the cut off, a forcer, adapted to adjust the type so moved, to bring it accurately into the registering position.

32. In combination with a cut-off and conveyer of a driver, for moving the type separated from the line, by the cut off, within the range of action of a conveyer, a forcer adapted to move the type into registering position upon the raceway so as to be further acted upon by the conveyer.

33. The combination of the following elements: a driver for moving the separated type, within the range of action of a conveyer, a forcer for moving the type into registering position upon the raceway, and a conveyer adapted to give the adjusted type further movement upon the raceway.

34. In combination with a forcer for moving the type into their proper registering position, a guide adapted to engage with a nick in the type for maintaining them in this position, when given further movement.

35. In combination with a forcer for moving the type into their proper registering position, and a guide for maintaining them in this position, a conveyer for giving the type an intermittent movement.

36. The combination of the following elements: a cut off for separating the end type from the line, and for moving it to another plane, a driver for moving the type from the cut off onto a contiguous raceway, a forcer for adjusting it longitudinally thereon and a conveyer for giving it movement in a lateral direction.

37. The combination of the following elements: a follower bar for advancing the type line, a cut off, for separating the end type from the line and moving it to another plane, a driver for moving the type from the cut off, onto a contiguous raceway, and a forcer, for adjusting it longitudinally thereon.

38. The combination of the following elements: a follower bar for advancing the type line, a cut off for separating the end type from the line and moving it to another plane, a driver for moving the type from the cut off, onto a contiguous raceway, a forcer for adjusting it longitudinally thereon, and a conveyer for moving the type in a lateral direction.

39. The combination of the following elements: a cut off for separating the end type from the line: a driver for moving the separated type within the range of action of a conveyer, a forcer for moving the type into the proper registering position; a conveyer for giving it further movement upon the raceway; and a guide for maintaining the type in proper registering position during the movement.

40. The combination of the following elements: a follower bar for advancing the type line, a cut-off for separating the end type from the line; a driver for moving the separated type within the range of action of the conveyer, a forcer for moving the type into the proper registering position, a conveyer for giving it further movement upon the raceway, and a guide for maintaining the type in proper registering position during the movement.

41. The combination of the following elements: a column lifting block for advancing the column in the galley, a line forcer for removing the upper line from the column, a follower bar for advancing the line, a cut-off for separating the end type from the line, and moving it to another plane, a driver for moving the separated type from the cut-off onto a contiguous race-way, and a forcer for adjusting it longitudinally upon the race-way.

42. The combination of the following elements: a column lifting block for advancing the column in the galley, a line forcer for removing the upper line from the column, a follower bar, for advancing the line, a cut-off for separating the end type from the line and moving it to another plane, a driver for moving the separated type from the cut-off into a contiguous race-way, a forcer for adjusting it longitudinally upon the race-way, and a conveyer for moving it in a lateral direction.

43. In combination with a reciprocating forcer V, a revolving carrier V' having an extended bearing surface $V^2$, for holding the forcer against return movement.

44. In combination with the reciprocating forcer V, and the revolving carrier having an extended bearing surface, the spring $V^3$ for giving the forcer its return movement.

45. In combination with the forcer V, the friction block $V^5$ and spring $V^6$, for preventing an excess of movement of the type, by inertia.

46. In combination with an adjusting forcer, for moving the type longitudinally upon the race-way special conveyer mechanism W, $w^3$ $w^{13}$ for moving the type in a lateral direction.

47. In combination with a fixed distributer race-way, a conveyer, as described, having a five motion action for moving the type along the race-way.

48. In combination with the rigid plates $z^8$ $z^8$, the parallel movable plates $z^9$ $z^9$, having teeth, and means for actuating the same, substantially as described.

49. In combination with the fixed race way plates $z^8$ $z^8$, having intervening spaces, the toothed conveyer plates $z^9$ $z^9$, alternating with the race-way plates, and intermediate parts for communicating to the conveyer plates, the proper movements for advancing the type upon the race-way.

50. In combination with the fixed race-way, the conveyer plates alternating with the plates of the race-way, and the cams and lever connections by means of which horizontal and vertical movements are given to the conveyer plates.

51. In combination with the conveyer plates having a series of teeth adapted to move a number of type, the plate $z^{14}$ with the series of springs $z^{15}$ and blocks $z^{16}$ as described.

52. In combination with the main conveyer having a longitudinal movement for transferring type to the selecting mechanism, an adjacent independent conveyer having a greater longitudinal movement than the main conveyer for delivering the type to the main conveyer.

53. In combination with the frame piece $w^3$ and the lever $w^{13}$ adapted to give the type a more extended movement, the fixed race-way for receiving the type from the frame piece, and the conveyer plates $z^9$ $z^9$, for giving the type still further movement upon the fixed race-way as described.

54. In combination with a fixed race-way, and a conveyer for moving the type upon the same, a guide for maintaining the type during their movement, in their proper registering position by engagement with a nick formed in said type.

55. In combination with a supporting race-way, and a conveyer for advancing the type upon the race-way, the vertically moving plate $y^8$ having the rib $y^{10}$ for guiding the type in its movement.

56. In combination with a continuous race-way for supporting the type in its movement, the fixed plate $y^{11}$, having a guiding rib, and a movable plate $y^8$, having a guiding rib as described.

57. The cam $d^8$ lever Y bar $y^4$ having the blocks $y^6$ $y^6$ in combination with the block $y^8$.

58. The combination of an adjusting forcer adapted to move the type longitudinally into the proper registering position, with a conveyer adapted to move the adjusted type, within the range of action of a trying stud or ward, and a trying stud or ward adapted to bear upon the adjusted type, and try the same.

59. In combination with a race-way for supporting the type, a reciprocating trying stud or ward, and an ejecting forcer adapted at the proper time, to move the selected type off from said race-way.

60. In combination with a raceway for supporting the type, and an ejecting forcer for moving the selected type off from said race-way, a trying stud or ward, and intermediate parts for giving to the same an upward and downward movement.

61. In combination with a reciprocating forcer, for moving the type longitudinally, from beneath the trying stud or ward, and intermediate parts for giving the stud an upward and downward movement, an auxiliary type-race for receiving the type ejected by the forcer.

62. In combination with the co-acting parts for giving the stud of the selecting ward an upward and downward movement, a reciproecting forcer, for moving the selected type from beneath the stud, an auxiliary race-way for receiving the ejected type, and an auxiliary driver for moving the type in the race-way.

63. The combination of the following elements: a cut off for separating the end type from the line, a conveyer for giving an intermittent movement to the type upon the race-way, a trying stud or ward, and an ejecting forcer, adapted at the proper time to move the selected type off from the race-way.

64. The combination of the following elements: a special conveyer adapted to advance the separated type upon the race-way with an intermittent movement, a series of special trying studs or wards, and forcers, adapted to select and eject from the main race-way, the quads, spaces and other characters not provided for in the type case.

65. In combination with a special conveyer having an extended movement, adapted to take the wide type, quads, spaces and all other characters not provided for in the type case, trying studs, or wards, selecting levers, and ejecting forcers, for selecting and ejecting these characters from the race-way, and a main conveyer, for further advancing the type not ejected.

66. In combination with the lever X spring $X^{16}$, and ward plate $X^5$, the rock shaft $X^{11}$ having the arm $X^{12}$, as described.

67. In combination with the lever X having the bent end with passage way as described, and a ward-plate having a ward adapted to engage the type, the forcer $X^{15}$ with end having shoulders as described.

68. In combination with a lever X adapted to depress a ward or trying stud upon the type, and provided at its rear end with contact points $x'$ $x^2$ the forcer $x^{15}$ having the shoulders $x^{16}$ $x^{17}$ adapted to engage with the contact points $x'$ $x^2$ of the lever as described and a ward or trying stud.

69. In combination with the lever X and the forcer $x^{15}$ having the shoulders $x^{16}$ $x^{17}$, the actuating arm $x^{24}$ with spring $x^{25}$, as described and a ward or trying stud.

70. In combination with the shaft $x^{11}$ having the arm $x^{12}$ and the ward plate $x^5$, the lever X, having the shoulders $x$ $x'$, the forcer $x^{15}$ having the shoulders $x^{16}$ $x^{17}$ and the spring arm $x^{24}$.

71. The combination of the lever X having the shoulders $x$ $x'$, and forcers $x^{15}$ having the shoulders $x^{16}$ $x^{17}$, the carriers $x^{20}$ $x^{21}$, and studs $x^{18}$ $x^{19}$, as described.

72. In combination with the lever X, having a double movement, substantially as described, the forcer $x^{15}$, having the shoulders $x^{16}$, $x^{17}$, and connecting parts for giving it movement, in harmony with the movements of the lever.

73. In combination with the series of trying studs or wards, selecting levers and ejecting forcers of the main distributer, the special trying studs or wards, selecting levers and ejecting forcers located relatively to the type case, in such position, that the special characters not provided for in the type case are ejected and not permitted to enter the type case.

74. In combination with a special conveyer having an extended movement capable of conveying quads, &c., special trying studs or wards, selecting levers, and ejecting forcers, for selecting and ejecting the quads and other characters not provided for in the type case, and a main distributer, for acting upon the characters provided for in the type case.

75. The combination of the following elements: a conveyer adapted to impart an intermittent movement to the type along the raceway, a forcer adapted to impart a longitudinal movement to the types off from the race-way, in proximity to the type-case, and a lifter adapted to elevate the inserted type into position in the case.

76. The combination of the following elements: a conveyer for moving the type along the race-way: a guiding rib for maintaining it in its proper registering position, trying studs or wards and selecting levers, for selecting the type, ejecting forcers for removing the selected type from the race-way at the proper point, in proximity to the type-case, and a lifter for raising the inserted type into position in the channel.

77. The combination of the following elements: a forcer for adjusting the type longitudinally upon the race-way, a conveyer for moving the type along the race-way, a guiding rib for maintaining it in its proper registering position, trying studs or wards and selecting levers, for selecting the type, ejecting forcers for removing the selected type from the race-way at the proper point, and inserting the same into a lifter, and a lifter for raising the inserted type into position in the type channel.

78. The combination of the following elements: a cut off for separating the end type from the line, a forcer for adjusting the type longitudinally upon the race-way, a conveyer for moving the type along the race-way, a guiding rib for maintaining it in its proper registering position, trying studs or wards and selecting levers for selecting type, ejecting forcers for removing the selected type from the race-way at the proper point, and placing the same into proximity to the type case, and a lifter for raising the type into position in the type channel.

79. The combination of the following elements: a follower bar for advancing the type line, a cut off for separating the end type from the line, a forcer for adjusting the type longitudinally upon the race-way, a conveyer for moving the type along the race-way; a guiding rib for maintaining it in its proper registering position, trying studs or wards and selecting levers for selecting the type, ejecting forcers for removing the selected type from the race-way at the proper point and placing the same into proximity to the type-case, and a lifter for raising the type into position in the channel.

80. The combination of the following elements: a column feed-block, a gate, a follower bar for advancing the type line, a cut off for separating the end type from the line, a forcer for adjusting the type longitudinally upon the race-way, a conveyer for moving the type along the race-way, a guiding rib for maintaining it in its proper registering position, trying studs or wards and selecting levers for selecting the type, ejecting forcers for removing the selected type from the race-way at the proper point and placing the same into proximity to the type-case, and a lifter for raising the type into position in the channel.

81. A type channel adapted to contain a tier or line of type in combination with a lifter for placing the type therein from the bottom, whereby said tier or line may be rendered compact, and a forcer for removing the type therefrom, substantially as specified.

82. The combination of the type-case channels with openings between their ends for the ejection of the type into the type race-way, and openings at or near the ends for the injection of type into the channels, ejecting forcers for ejecting the type from the type-case into the race-way, and a type lifter for lifting the type into the channels of the type-case, and the connecting mechanism whereby the continuous operation of the parts alternately injects and ejects type into or out of the type-case channels without conflicting, substantially as described.

83. In combination with a type channel having an opening between its ends for the ejection of the type into the typesetter race-way, and an opening at its lower end for the injection of the type, a forcer for ejecting the type into the setter race-way and a forcer for inserting the type into the lower end of the type channel, a lifter for raising the type in a channel and a ledge for supporting the type in the channel, as described.

84. In combination, a type-case provided with channels having openings between their ends for the ejection of type and openings at one end for injection of the type, forcers for ejecting the type from the channels of the type-case, and forcers for injecting the type into the type-case, as described.

85. The combination of setting and distributing mechanisms, a clutch interposed between the distributing mechanism and a main driving power, type channel weight-plates and a movable cross-bar held in position over the same in operative connection with said clutch and suitable intermediate connecting parts, the construction being such that when the filling of any channel by the action of the distributer advances a weight-plate into contact with the cross-bar, the clutch, by means of the intermediate connecting parts, is moved out of its engaging position to cause a stoppage of the distribution of type.

86. In a type setting and distributing machine, the combination of the following elements: a type channel, a forcer for placing the type into proximity to the channel, a lifter for advancing the type in the channel, a movable bar located over the channel, a clutch interposed between the distributing mechanism and the main driving power, and suitable intermediate connecting parts adapted for actuation by the bar to move the clutch out of its engaging position to stop the distribution of type.

87. A combined machine having a type setting portion and a distributing portion united by means of a clutch device operated by the distributed type to connect or disconnect the parts, as described.

88. The combination with type setting and distributing mechanism of a main source of power in operative connection with the type setting train and an idle distributer train, of gears connected by means of intermediate gear wheels $c^4$ $c^5$ and an automatically controlled clutch operated by the distributed type, and intermediate mechanism, to connect or disconnect the distributer train from the setting train, as described.

89. In combination with a race-way, a moving space holder, substantially as described, adapted to present the spaces to the line of composition.

90. In combination with the race-way, a space holder located before the line of composition, having an ejecting forcer, adapted to deliver the spaces from the holder into the lines.

91. In combination with the race-way and the arm 6, the block $6^3$, and the removable space holder $6^7$, as described.

92. In combination with the race-way, and the swinging space-holder, the forcer $6^{10}$ having a spring $6^{11}$, as described.

93. In combination with the bars 4 and $4^2$ the block $4^3$ and finger plate $4^4$, as described.

94. In combination with the galley $5^3$ having recesses, the galley block $5^9$ with bearing blocks $5^{10}$ having ribs and the spring $5^{11}$, as described.

95. The main setting portion of the machine having type-case channels with openings between the ends for the ejection of the type, and with openings at the ends for the insertion of the type, in combination with the auxiliary distributing portion operated simultaneously with the setting portion, adapted to select type and place them into their proper channels in the type-case through the openings at the ends, as described.

96. A type-case channel open at both ends and having an opening between said ends for the removal of type, means for causing said removal and means for distributing the type therein for composition, substantially as described.

97. A type-case provided with character channels, having openings at their lower ends for permitting the introduction from below of the distributed types, against the reacting resistance of the tiers or lines of the types in the channels, and with openings between the ends of the channels for permitting the ejection of the types from the case for composition and a forcer for removing the type therefrom.

98. The combination of the following elements: the type channel case adapted to hold the type edge to edge and provided with an opening through its walls between the ends, a power actuated forcer for removing the type therefrom, a race-way located at a point between the ends of the type-channel case, adjacent to the opening, and a driver adapted to sweep the type upon the race-way in the position of composition, that is, upon the edges, to the delivery point.

99. A type-channel having an opening through its walls between its ends, in combination with a power actuated forcer adapted to act through the opening to eject the type from the channel upon a race-way located between the ends and in a plane at right angles to that of said channel.

100. In combination with a type-channel case, a type forcer for removing a type therefrom, and a race-way located adjacent to the type-channel case at a point between its ends for receiving the types removed, substantially as specified.

101. The combination of the following elements: a type-channel case, a type forcer for removing the type therefrom, a race-way located adjacent to the type-channel case at a point between its ends, and a driver for moving a selected type in the line of composition upon the race-way.

102. The combination of the following elements: a type-channel case adapted to hold the type in the position of composition, and provided with an opening between its ends, a power actuated forcer for removing the type therefrom, a race-way located at a point between the ends of the type-channel case, a driver adapted to move in the position of composition the type upon the race-way to the delivery point, and an auxiliary driver adapted to advance the line being composed, toward the point of justification.

103. In combination with a type-case having an opening through its walls between its ends, race-way plates adjacent to the type-case above and below the opening adapted to prevent the ejection of more than one type at a time from the opening to the race-way and a forcer for removing the type therefrom.

104. In combination with a type-case having an opening through its walls between its ends, the raceway-plates F $f$, as described, and a forcer for removing the type therefrom.

105. In combination with the portion $e'$, of the type-case E, having a series of vertical grooves $e^2$ of equal width and depth, the division strips $e^6$, of varying width, as and for the purpose set forth.

106. In combination with the portion $e'$, of the type-case E, having a series of vertical grooves $e^2$ of equal width, the plunger plate $g^{12}$ $g^{13}$, having a series of vertical grooves $g^{14}$ of equal width, the parts coinciding to form continuous grooves, as described.

107. In combination with the portion $e'$ of the type-case E, and the plunger plate $g^{12}$, both having a series of coinciding vertical grooves, a series of division strips lying in the continuous grooves formed by the union of the parts as described.

108. In combination with a revolving carrier, a guard plate J, $j^2$ having a return spring, as and for the purpose described.

109. In combination with a type driver, for sweeping the type to the point of delivery, a race-way and an auxiliary driver for removing them into the line of composition.

110. A race-way, an auxiliary driver arranged to move in the same direction and in a continuation of the path of the main driver, and means for imparting a slow forward and rapid backward motion thereto, in the time required to complete the regular forward and backward movement of the main driver whereby the line may be advanced without displacement toward the point of justification, substantially as specified.

111. In combination with a race-way or conduit, adapted to sustain the type in their movement, a type driver interposed between the main delivery point and the point of justification, which is adapted to advance the line being composed in the same direction in which the types are delivered, toward the point of justification.

112. The combination of the following elements: a type-case adapted to hold the type in the position of composition, a race-way or conduit for sustaining the characters in their movement, and an auxiliary type driver adapted to advance the line being composed in the same direction in which the type are delivered, toward the point of justification.

113. In combination with a race-way of a main driver or forwarder for giving the type characters a principal movement toward the line of composition at a high rate of speed, an auxiliary driver for giving them a further movement in the same direction, at a less rate of speed, toward the point of justification.

114. In combination with the driver piece $l^2$ the right angled box or frame $l^5$, suitably secured to any proper point of support, the intermediate lever connections, and the cam $d^5$, substantially as described, adapted to give the driver piece a more rapid movement in a forward direction than in a rearward, as described.

115. In combination with the supporting frame of the machine, the box $l^5$ having the opening $l^{14}$ with end walls $l^{15}$ $l^{16}$, the pivoted driver $l^2$ having the pendent arm $l^{12}$, the construction being such, that when the driving piece is reciprocated by the action of the cam, the same is oscillated on its pivot by the contact of its arm with the end walls.

116. In combination with the time lock shaft $b^7$ having the cams $d^{13}$ $d^{14}$, the bar M, arm $m^3$, and the spring bar $m^5$, as described.

117. In combination with the key plates $g$, the rods $g^7$ the levers $g^{10}$, the cross bar $m^4$, bar M and cam $d^{13}$, as described.

118. In combination with the bar $m^4$ controlling the action of the levers $g^{10}$ the spring bar $m^5$ having the bearing projection $m^6$, and the cam $d^{14}$ as described.

119. In combination with the bar $m^4$ controlling the action of the levers $g^{10}$, the spring bar $m^5$ having the bearing projection $m^6$, and the cams $d^{13}$ and $d^{14}$ as described.

120. In combination with the series of levers $g^{10}$ adapted for actuation by the key plates, the bars $m^4$ M, the spring bar $m^5$ and the cams $d^{13}$ $d^{14}$.

121. In combination with the time-lock mechanism, the cross bar $m^4$, the levers $g^{10}$, the actuating rods $g^7$ and the key levers $g$ as described.

122. In combination with the key plate $g$ rods $g^7$, levers $g^{10}$, the time-lock mechanism substantially as described, and the forcers $g^{16}$ with the power mechanism for actuating them.

123. In combination with a galley $n^6$, and a galley block $n^8$, a plate $n^2$ having the rods $n'$ $n'$ and the spring $n^3$ as described.

124. In combination with the block N, the spring $n^3$, plate $n^2$, and spring catch $n^4$ as described.

125. In combination with the galley block $n^8$ and a spring block for advancing the same in a galley, the stop pins $n^{10}$ for arresting its movement at the proper point.

126. The combination with a line forcer for removing a line from the dead matter column, of a serrated line follower for advancing said line to a suitable separator, a lever and pawl for intermittently actuating said line follower, means for returning said line follower to its normal position when released from engagement with said pawl, and means for automatically disengaging said pawl at irregular intervals, substantially as specified.

127. The combination with a registering forcer for registering the type longitudinally upon a race-way, of means for producing a frictional action upon said type for preventing excessive movement by inertia, substantially as specified.

128. The combination of a race-way, mechanism for advancing the type laterally thereon, and means for producing a frictional action upon said type for preventing excessive movement by inertia, substantially as described.

129. The combination in a machine, of a type race-way, means for advancing the type thereon and a series of movable spring actuated blocks so arranged in said race-way as to impart a yielding pressure upon the type during their passage substantially as and for the purpose set forth.

130. A type distributing and setting machine in which is combined means for removing the type from the dead-matter column, means for advancing the same, side by side, in a substantially horizontal position upon a continuous horizontal distributing raceway, means for distributing the same edge upon edge into the bottom of the respective type-channels which are arranged in immediate and operative proximity to said distributing raceway, means for ejecting them directly from said type-channels and means for moving them laterally and side-by-side upon a continuous horizontal setting race-way, substantially as described.

This specification signed and witnessed this 28th day of November, 1882.

JAMES W. PAIGE.

Witnesses:
EDWARD D. ROBBINS,
WM. HAMERSLEY.